(12) United States Patent
Gardner et al.

(10) Patent No.: US 10,817,494 B2
(45) Date of Patent: Oct. 27, 2020

(54) SYSTEMS AND METHODS FOR PARSING DATA IN ORDER TO FORM STRUCTURED DATA TABLES

(71) Applicant: Riffyn, Inc., Oakland, CA (US)

(72) Inventors: Timothy S. Gardner, Oakland, CA (US); Lili Nader, Berkeley, CA (US); Cody Carr, Denver, CO (US); Ashley Quinn, Brooklyn, NY (US)

(73) Assignee: Riffyn, Inc., Oakland, CA (US)

( * ) Notice: Subject to any disclaimer, the term of this patent is extended or adjusted under 35 U.S.C. 154(b) by 280 days.

(21) Appl. No.: 15/774,399

(22) PCT Filed: Dec. 2, 2016

(86) PCT No.: PCT/US2016/064830
§ 371 (c)(1),
(2) Date: May 8, 2018

(87) PCT Pub. No.: WO2017/096308
PCT Pub. Date: Jun. 8, 2017

(65) Prior Publication Data
US 2020/0250165 A1    Aug. 6, 2020

Related U.S. Application Data

(60) Provisional application No. 62/263,346, filed on Dec. 4, 2015.

(51) Int. Cl.
*G06F 7/00* (2006.01)
*G06F 16/22* (2019.01)
(Continued)

(52) U.S. Cl.
CPC ........ *G06F 16/2282* (2019.01); *G06F 3/0482* (2013.01); *G06F 16/213* (2019.01);
(Continued)

(58) Field of Classification Search
CPC .. G06F 16/2282; G06F 16/213; G06F 40/284; G06F 3/0482; G06F 16/258;
(Continued)

(56) References Cited

U.S. PATENT DOCUMENTS 5,291,583 A * 3/1994 Bapat .................... G06F 16/284
717/137
5,343,388 A   8/1994 Wedelin
(Continued)

FOREIGN PATENT DOCUMENTS

EP    1784695 B1    7/2007

OTHER PUBLICATIONS

Im et al., "A Hypergraph-based Storage Policy for RDF Version Management System", ICUIMC'12, Feb. 20-22, 2012, Kuala Lumpour, Malaysia, 5 pages.
(Continued)

*Primary Examiner* — Mohammed R Uddin
(74) *Attorney, Agent, or Firm* — Morgan, Lewis & Bockius LLP

(57) ABSTRACT

Systems and methods for forming a data table are provided. A data construct comprising a plurality of tokens is obtained. Application of a configuration construct to the tokens labels a first subset of the tokens as header tokens and a second subset of the tokens as value tokens based on the positions of tokens in the first and second subsets in the data construct. Application of the configuration construct associates specific tokens in the first subset to tokens in the second subset based on the relative or absolute position of tokens and/or by delimiters between tokens in the first and second subsets in the data construct. The associating transforms the data construct into the data table in which each token in the first subset is a header and each token in the second subset is a data value in a single column in the data table.

37 Claims, 49 Drawing Sheets

(51) Int. Cl.
  *G06F 16/21* (2019.01)
  *G06F 3/0482* (2013.01)
  *G06F 40/205* (2020.01)
  *G06F 40/284* (2020.01)
  *G06F 16/25* (2019.01)

(52) U.S. Cl.
  CPC .......... *G06F 16/258* (2019.01); *G06F 40/205* (2020.01); *G06F 40/284* (2020.01)

(58) Field of Classification Search
  CPC .............. G06F 40/205; G06F 17/2247; G06F 17/2705; G06F 17/272
  See application file for complete search history.

(56) References Cited

U.S. PATENT DOCUMENTS

| | | | |
|---|---|---|---|
| 5,691,895 A | | 11/1997 | Kurtzberg et al. |
| 5,784,286 A | | 7/1998 | Hirose et al. |
| 5,970,490 A | | 10/1999 | Morgenstern |
| 6,112,209 A | * | 8/2000 | Gusack ................. G06F 16/284 |
| 6,243,614 B1 | | 6/2001 | Anderson |
| 7,096,210 B1 | * | 8/2006 | Kramer ................. G06N 5/025 706/45 |
| 7,318,066 B2 | * | 1/2008 | Kaufman .............. G06F 16/252 |
| 8,620,928 B1 | * | 12/2013 | Walton ................... G06F 40/16 707/748 |
| 9,910,936 B2 | | 3/2018 | Gardner |
| 9,977,862 B2 | | 5/2018 | Sadowski et al. |
| 10,339,546 B2 | * | 7/2019 | Dereszynski ...... G06Q 30/0204 |
| 10,546,295 B2 | * | 1/2020 | Davis .................. G06Q 20/401 |
| 10,586,015 B2 | | 3/2020 | Gardner et al. |
| 10,592,525 B1 | * | 3/2020 | Khante ................ G06F 16/258 |
| 2001/0032029 A1 | | 10/2001 | Kauffman |
| 2004/0064465 A1 | | 4/2004 | Yadav et al. |
| 2004/0119752 A1 | | 6/2004 | Beringer et al. |
| 2005/0065967 A1 | * | 3/2005 | Schuetze ................ G06F 16/88 |
| 2005/0171746 A1 | | 8/2005 | Thalhammer-Reyero |
| 2005/0182752 A1 | * | 8/2005 | Rojer .................... G06F 16/284 |
| 2005/0197875 A1 | | 9/2005 | Kauffman |
| 2005/0240943 A1 | | 10/2005 | Smith et al. |
| 2006/0288268 A1 | * | 12/2006 | Srinivasan ............ G06F 40/226 715/210 |
| 2008/0253283 A1 | | 10/2008 | Douglis et al. |
| 2008/0275585 A1 | | 11/2008 | Lin et al. |
| 2009/0089031 A1 | | 4/2009 | Sturrock et al. |
| 2010/0169758 A1 | * | 7/2010 | Thomsen ................ G06F 40/18 715/212 |
| 2010/0318963 A1 | | 12/2010 | Kajiya |
| 2011/0022192 A1 | | 1/2011 | Plache et al. |
| 2011/0066585 A1 | * | 3/2011 | Subrahmanyam ..... G06N 7/005 706/52 |
| 2012/0030647 A1 | | 2/2012 | Wang et al. |
| 2012/0036249 A1 | | 2/2012 | Chandrasekaran |
| 2013/0238351 A1 | * | 9/2013 | Burns .................... G16H 10/20 705/2 |
| 2014/0172503 A1 | | 6/2014 | Hammerstrom et al. |
| 2014/0214798 A1 | | 7/2014 | Nica et al. |
| 2015/0039651 A1 | * | 2/2015 | Kinsely ................. G06F 16/254 707/779 |
| 2015/0197875 A1 | | 7/2015 | Kim et al. |
| 2016/0034606 A1 | | 2/2016 | Gardner |
| 2016/0055143 A1 | * | 2/2016 | Goel ........................ H04L 63/08 715/229 |
| 2016/0103838 A1 | * | 4/2016 | Sainani ............... H04L 41/5012 707/725 |
| 2016/0247087 A1 | * | 8/2016 | Nassar ................... G06N 5/022 |
| 2017/0046329 A1 | | 2/2017 | Mirhaji |
| 2017/0371958 A1 | * | 12/2017 | Ganjam ................. G06N 7/005 |

OTHER PUBLICATIONS

Michelena, N.F. et al., "A hypergraph Framework for Optimal Model-Based Decomposition of Design Problems", Computational Optimization and Applications 8 (1997): 173-196. Retrieved from the Internet: <https://core.ac.uk/download/pdf/22876372.pdf>.
International Search Report for International Patent Application No. PCT/US2018/048174, dated Dec. 16, 2018, 18 pages.
International Search Report for International Patent Application No. PCT/US2018/048179, dated Dec. 23, 2018, 9 pages.
U.S. Appl. No. 15/690,128, filed Aug. 29, 2017.
U.S. Appl. No. 15/739,561, filed Apr. 27, 2018.
U.S. Appl. No. 16/530,242, filed Aug. 2, 2019; and.
U.S. Appl. No. 16/530,254, filed Aug. 2, 2019.
Barlow and Irony, 1992, "Foundations of statistical quality control" in Ghosh, M. & Pathak, P.K. (eds.) *Current Issues in Statistical Inference: Essays in Honor of D. Basu*, Hayward, California, Institute of Mathematical Statistics, pp. 99-112.
Gardner, 2014, "A swan in the making," Science, Retrieved from the Internet: http://www.sciencemag.org, accessed Aug. 21, 2014.
International Search Report for International Patent Application No. PCT/US2016/064830, dated Apr. 6, 2017, 13 pages.
Manufacturing Information Portal (MIP) Product Data Sheet; http://www2.emersonprocess.com/siteadmincenter/PM%20Syncade%20Documents/PDS_Syncade_Portal.pdf; Dec. 2008.
Paolo, F.B. et al., "Hypercharts: Extended Statecharts to Support Hypermedia Specification," IEEE Transactions on Software Engineering, vol. 25, No. 1, 1999, pp. 33-49.
Process Miner [PM] Syncade Product Data Sheet; http://www2.emersonprocess.com/siteadmincenter/PM%20Syncade%20Documents/PDS_Syncade_PM.pdf; Sep. 2013.
Recipe Authoring (RA) Product Data Sheet; http://www2.emersonprocess.com/siteadmincenter/PM%20Syncade%20Documents/PDS_Syncade_RA.pdf; Feb. 2014.
Robust and flexible processes with paperless manufacturing; http://www.industry.siemens.com/verticals/global/en/pharma-industries/Documents/neue-version/paperless/VRPH-B10002-00-7600_WS_Pharma_paperless_manufacturing_EN.pdf; 2015.
Saeys et al., 2007, "A review of feature selection techniques in bioinformatics," Bioinformatics 23, 2507-2517.
Schiettecat, Filip; SIMATIC IT R&D Suite; Driving Innovation Efficiency (PowerPoint); Apr. 2009.
SIMATIC IT R&D Suite (Brochure); http://w3.siemens.com/mcms/mes/en/mes_suites/rdsuite/Documents/brochure_simaticit_rd_suite_en.pdf, last accessed Jan. 6, 2016.
SIMATIC IT R&D Suite (Flyer); http://w3.siemens.com/mcms/mes/en/mes_suites/rdsuite/Documents/Flyer_RnD.pdf.
SIMITIC IT Unilab: Your Next Generation LIMS; http://w3.siemens.com/mcms/mes/en/mescomponents/simaticitlims/Documents/brochure_simaticit_unilab_en.pdf; 2015.
Syncade™ Smart Operations Management Suite Product Data Sheet; http://www2.emersonprocess.com/siteadmincenter/PM%20Syncade%20Documents/PDS_Syncade_SmartOpsSte.pdf; Mar. 2010.
Tibshirani, 1996, "Regression and Shrinkage and Selection via the Lasso," J. R. Statist. Soc B, pp. 267-288.
U.S. Appl. No. 15/690,134, filed Aug. 29, 2017; and.
U.S. Appl. No. 15/739,561, filed Dec. 22, 2017.
Campagna, D., "Product and Production Process Modeling and Configuration," Universia Degli Studi Perugia, Dissertation, Feb. 2012.
Kumar, A. et al., "Design and management of flexible process variants using templates and rules," Computers in Industry, Jan. 20, 2012, vol. 63, pp. 112-130.

\* cited by examiner

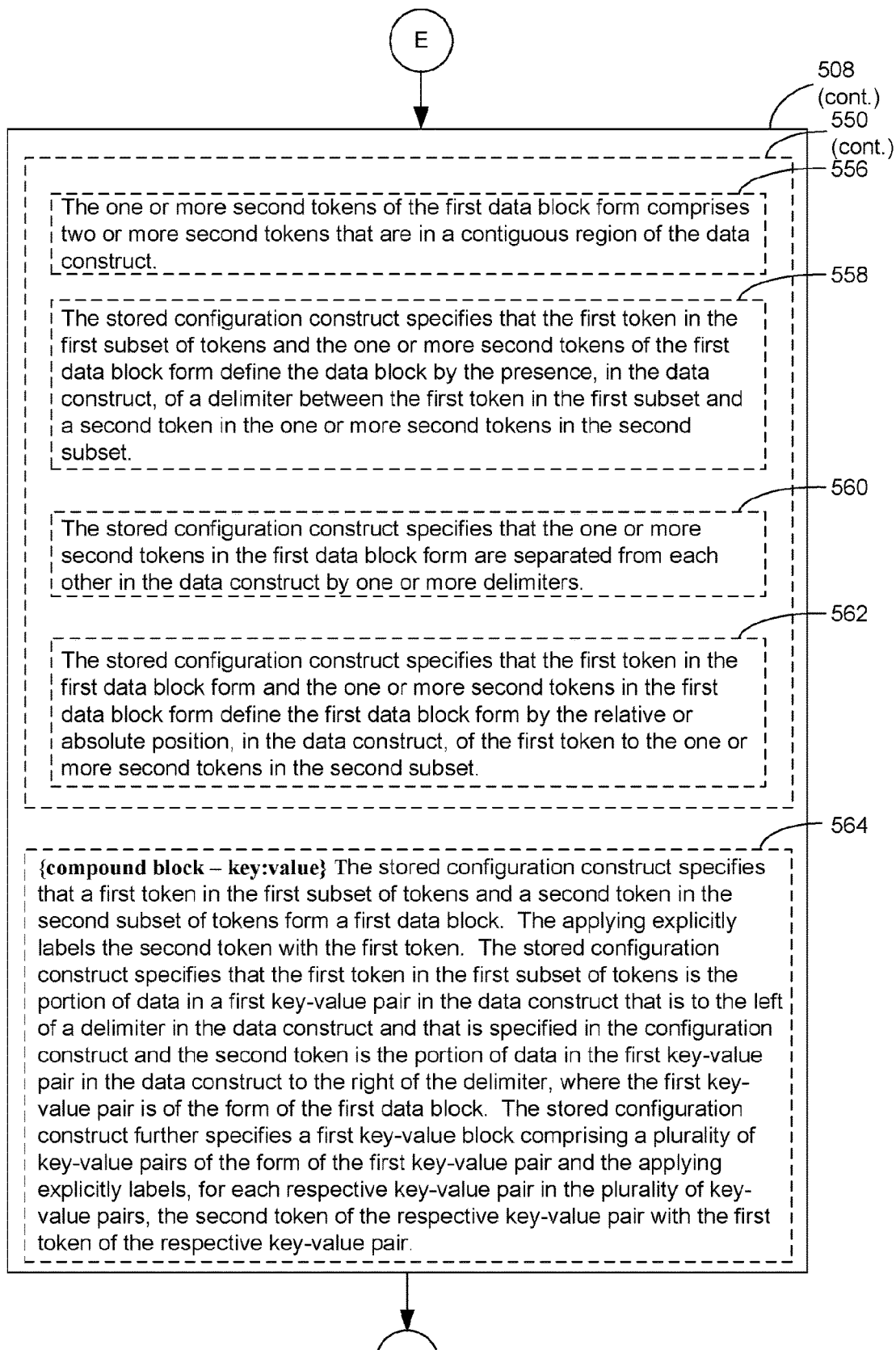

{superblock} The configuration construct specifies a first token in the first subset of tokens and one or more second tokens in the second subset of tokens form a first data block. The applying labels each such second token with the first token. The configuration construct further specifies a first superblock comprising one or more compound blocks of the form of a table, a matrix or a key:value block. The applying explicitly labels each compound block with an identifier unique to superblock.

Each compound block that is a table comprises a first table form comprising a first plurality of data blocks of the form of the first data block. Each data block in the first plurality of data blocks of the table (i) is adjacent to another data block in the first plurality of data blocks in the data construct (ii) is in the same orientation in the data construct, and (iii) separated from another data block by zero or more a null values, zero or more tokens, or zero or more blank spaces. The applying explicitly labels, for each data block in the first plurality of data blocks, each second token in the one or more second tokens with the first token of the respective data block.

Each respective compound block that is a matrix comprises a second data block of the form of the first data block and a plurality of tables of the form of the first table form. A first table in the plurality of tables is in a standard orientation and is positioned adjacent to the left or right boundary of the one or more second tokens of the second data block of the matrix, and a second table in the plurality of tables is in a transposed orientation and is positioned adjacent to the top or bottom boundary of the one or more second tokens of the second data block. The applying explicitly forms a tuple between (i) a respective first value token in the first table, (ii) a respective second value token in the second table and (iii) a respective third value token in the second data block based upon the relative or absolute position in the data construct of the respective first value token, the respective second value token, and the respective third value token.

Each compound block that is a key-value block comprises a plurality of key-value pairs of the form of a first key-value pair in the stored configuration construct, in which the one or more second tokens is a single second token, where the first key-value pair specifies that a first token in the first subset of tokens is the portion of data in the first key-value pair in the data construct that is to the left of a delimiter in the data construct and that is specified in the configuration construct and the second token is the portion of data in the first key-value pair in the data construct to the right of the delimiter. The applying explicitly labels, for each respective key-value pair in the plurality of key-value pairs, each second token in the second token of the respective key-value pair with the first token of the respective key-value pair.

| FILE CONFIGURATION | | | |
|---|---|---|---|
| | 1. DEFINE BLOCKS | | 2. HEADER IN |
| ▶ Input Resource COMPONENT | PROPERTY | Unit | Assign Data Label |
| seed inoculum | strain ID | | [ Select a label ◀▶ ] |
| microtiter plate | type | | [ Select a label ◀▶ ] |
| incubator shaker ~310 | temperature ~312 | °C | [ Temp ~240 ◀▶ ] |
| incubator shaker ~310 | Speed ~312 | rpm | [ Shaker speed ~240 ◀▶ ] |
| growth medium | volume | uL/well | [ Select a label ◀▶ ] |
| treatment | type | | [ Select a label ◀▶ ] |
| treatment ~310 | concentration ~312 | mM | [ Arabinose (mg/L) ~240 ◀▶ ] |
| treatment | volume | uL/well | [ Select a label ◀▶ ] |

FILE CONFIGURATION                                                                                                          ✕

| | 1. DEFINE BLOCKS | | 2. HEADER INFORMATION | | 3. MAP PROPERTIES | |
|---|---|---|---|---|---|---|

Plate Reader File 1

| | A | B | C | D | | HEADER INFORMATION |
|---|---|---|---|---|---|---|
| 1 | INSTRUMENT PARAMETERS | | | | | ⌄ INSTRUMENT |
| | | | | | | Type         Key:Value |
| | | | | | | Run Label Name |
| 2 | DATE/TIME: 2015-11-05T08:15:30-08:00 | —2604-1 | | | | Header |
| 3 | Manufacturer: TECAN | —240 | | | | DATE/TIME |
| | | —242 | | | | Alias         Date/Time |
| | | | | | | Type          String |
| | | | | | | Run label     – |
| | | | | | | Other label   – |
| 4 | Model: Infinite 200Pro | | | | | MANUFACTURER |
| | | | | | | Alias        Manufacturer |
| | | | | | | Type         String |
| 5 | Instrument serial number: 1302005848 | | | | | Run label    – |
| | | | | | | Other label  – |
| | | | | | | MODEL |
| | | | | | | Alias         Model |
| | | | | | | Type          String |
| 6 | Measurement Wavelength (nm) 660 | | | | | Run label     – |
| | | | | | | Other label   – |
| 7 | | | | | | INSTRUMENT SERIAL NUMBER |
| | | | | | | Alias         Instrument serial number |
| 8 | | | | | | Type          Number |
| 9 | | | | | | Run label     – |
| 10 | | | | | | Other label   – |
| 11 | | | | | | MEASUREMENT WAVELENGTH (NM) |
| 12 | | | | | | Alias         Measurement Wavelength (nm) |
| 13 | | | | | | Type          Number |
| 14 | | | | | | Run label     – |
| | | | | | | Other label   – |

(2606 indicates header region)

| INSTRUMENT SETTINGS | ABSORBANCE DATA | IGNORE |            | <PREV | NEXT > |

☐ Show hints and tips for data blocks configuration

FILE CONFIGURATION

| 1. DEFINE BLOCKS | | | 2. HEADER INFORMATION | | | 3. MAP PROPERTIES | | |
|---|---|---|---|---|---|---|---|---|
| Input Resource / COMPONENT | PROPERTY | UNIT Assign Data Label | | Output Resource / COMPONENT | PROPERTY | | Unit Assign a label | |
| Washed Cell Pellet | | | Select a label | Washed Cell Pellet | Elapse Time | | s | Select a label |
| microplate reader —310 | manufacturer —312 | | Select a label<br>instrument<br>Date/Time<br>Manufacturer<br>Model<br>Instrument serial number | Washed Cell Pellet | spectral absorbance | | AU | Select a label |
| microplate reader | model | 240 — | ▽ Measurement Wavelength (nm) | Washed Cell Pellet | ID | | | Select a label |
| microplate reader | wavelength | nm | spec data<br>—Values Block—<br>absorbance<br>—Label Top—<br>Replicate ID<br>Time (s)<br>—Label Left— | | | | | |

[<PREV]  [SAVE AS]

Fig. 29

BLOCK TYPE: 0
BLOCK TYPE NAME(S): token

| TOKEN TYPE | PATTERN | TOKEN DESCRIPTION | ATTRIBUTES | INPUT BY | ATTRIBUTE DESCRIPTION |
|---|---|---|---|---|---|
| header | *Header* | one or more adjacent cells in the file. If more than one cell, then cell contents should be concatenated with semicolon+space as delimiters. | name | auto | name as stored in the file |
|  |  |  | alias | user | name for header assigned by user |
|  |  |  | isRunLabel | user | "yes"/"no": determines if the values associated with a header are run labels |
|  |  |  | isSampleLabel | user | "yes"/"no": determines if the values associated with a header are sample labels (e.g. resource IDs) |
| value | *Value* |  | type | auto/user | string, float, integer, date, unknown |

240 (Header)
242 (Value)

Fig. 32

| BLOCK TYPE | 1 | | | | |
|---|---|---|---|---|---|
| BLOCK TYPE NAME | block | | | | |
| BLOCK TYPE | PATTERN | BLOCK DESCRIPTION | ATTRIBUTES | INPUT BY | ATTRIBUTE DESCRIPTION |
| value block | Header | Includes a header token, which does NOT need to be adjacent to values. Also includes one or more value tokens. Value tokens must be defined by a contiguous region, and may have blank (null) values within that region. | header_location | user | coordinates in the file for the header token of this value block |
| | Values | | values_location | user | coordinates in the file for the value token of this value block |

Fig. 33

BLOCK TYPE: 2
BLOCK TYPE NAME: compound block
COMPOUND BLOCK TYPE PATTERN

Note: data within a compound block will belong to a single eventgroup.

| | Header | Header | Header | Header | standard orientation |
|---|---|---|---|---|---|
| | Values | Values | Values | Values | |
| | Values | Values | Values | Values | |

| Header | Values | Values | Values | Values | transposed orientation |
|---|---|---|---|---|---|
| Header | Values | | | | |
| Header | Values | | | | |
| Header | Values | | | | | select in datablock
type
orientation
size overall
# of header rows
dataBlock typing / options

| ATTRIBUTES | INPUT BY | ATTRIBUTE DESCRIPTION |
|---|---|---|
| value_blocks | auto | array of value blocks |
| orientation | user | "standard" or "transpose"; defines orientation so that Parcely can automatically position value blocks |
| repeated | user | "yes","no" |

COMPOUND BLOCK DESCRIPTION

Includes one or more value blocks. Assume all tables are variable width and height, with boundaries defined by blank rows/columns. Note that key/value pairs are just tables with one value cell per header – so don't need a separate compound block type for those. If standard table selected by user is m cells width, then it is assumed to be m value blocks. If transposed table is n cells height, then it is assumed to be n value blocks.

Fig. 34

| BLOCK TYPE | 2 | | |
|---|---|---|---|
| BLOCK TYPE NAME | compound block | Note: data within a compound block will belong to a single eventgroup. | |
| | COMPOUND | | |
| BLOCK TYPE | PATTERN | | |

| | | | | |
|---|---|---|---|---|
| key:value | header/values | header/values | header/values | header/values | transposed orientation |

| |
|---|
| header/values |
| header/values |
| header/values |
| header/values | standard orientation

| ATTRIBUTES | INPUT BY | ATTRIBUTE DESCRIPTION |
|---|---|---|
| value_blocks | auto | array of value blocks. header tokens will be null. |
| orientation | user | "standard" or "transpose"; defines orientation so that Parsely can automatically position value blocks |
| delimiter | user | array of delimiter tokens |
| delimiter_cat | user | "yes", "no"; whether to treat consecutive delimiters as one |

Fig. 36

| Condition | Arabinose well volume | Dilution | Arabinose V | Shaker speed | Temp | Arabinose final (mg/L) |
|---|---|---|---|---|---|---|
| 1 | 50 | 300 | 82.33 | 3.64 | 1000 | 37.0 | 0.60 |
| 2 | 50 | 300 | 82.33 | 3.64 | 500 | 37.0 | 0.60 |
| 3 | 50 | 300 | 26.78 | 11.20 | 1000 | 37.0 | 1.80 |
| 4 | 50 | 300 | 26.78 | 11.20 | 500 | 37.0 | 1.80 |
| 5 | 50 | 300 | 82.33 | 3.64 | 1000 | 32.0 | 0.60 |
| 6 | 50 | 300 | 82.33 | 3.64 | 500 | 32.0 | 0.60 |
| 7 | 50 | 300 | 26.78 | 11.20 | 1000 | 32.0 | 1.80 |
| 8 | 50 | 300 | 26.78 | 11.20 | 500 | 32.0 | 1.80 |

Fig. 38

```
[
  {
    "name" : "Data block 1",
    "_id" : "N35KPiWbaeBqNH7zC",
    "blockIndex" : 0,
    "sheetIndex" : 1,
    "sheetName" : "Culture Data",
    "anchor" : {
      "r" : 0,
      "c" : 0
    },
    "blockGroup" : {
      "_id" : 0,
      "name" : "Data block 1",
      "orientation" : "standard",
      "blockType" : "table",
      "anchor" : {
        "r" : 0,
        "c" : 0
      },
      "blockGroup" : {
        "blocks" : [
          {
            "_id" : 1,
            "name" : "Run ID",
            "alias" : "Run ID",
            "blocks" : [
              {
                "blockType" : "header",
                "len" : 1,
                "width" : 1,
                "dimIfFixed" : {}
              },
              {
                "blockType" : "value",
                "len" : 8,
                "width" : 1,
                "dimIfFixed" : {}
              }
            ],
            "valueType" : "string",
            "isRunLabel" : true,
            "isSampleLabel" : false,
            "isInitialized" : true,
            "hasUpdatedHeader" : false
          },
          {
            "_id" : 2,
            "name" : "Condition",
            "alias" : "Condition",
            "blocks" : [
              {
                "blockType" : "header",
                "len" : 1,
                "width" : 1,
                "dimIfFixed" : {}
              },
```

S1-parselyBlocks.json

Fig. 39A

```
            {
                "blockType" : "value",
                "len" : 8,
                "width" : 1,
                "dimIfFixed" : {}
            }
        ],
        "valueType" : "number",
        "isRunLabel" : false,
        "isSampleLabel" : false,
        "isInitialized" : true,
        "hasUpdatedHeader" : false
    },
    {
        "_id" : 3,
        "name" : "Arabinose Volume",
        "alias" : "Arabinose Volume",
        "blocks" : [
            {
                "blockType" : "header",
                "len" : 1,
                "width" : 1,
                "dimIfFixed" : {}
            },
            {
                "blockType" : "value",
                "len" : 8,
                "width" : 1,
                "dimIfFixed" : {}
            }
        ],
        "valueType" : "number",
        "isRunLabel" : false,
        "isSampleLabel" : false,
        "isInitialized" : true,
        "hasUpdatedHeader" : false
    },
    {
        "_id" : 4,
        "name" : "Arabinose (mg/L)",
        "alias" : "Arabinose (mg/L)",
        "blocks" : [
            {
                "blockType" : "header",
                "len" : 1,
                "width" : 1,
                "dimIfFixed" : {}
            },
            {
                "blockType" : "value",
                "len" : 8,
                "width" : 1,
                "dimIfFixed" : {}
            }
        ],
        "valueType" : "number",
        "isRunLabel" : false,
        "isSampleLabel" : false,
        "isInitialized" : true,
        "hasUpdatedHeader" : false
    },
```

Fig. 39B

```
{
   "_id" : 5,
   "name" : "Shaker speed",
   "alias" : "Shaker speed",
   "blocks" : [
      {
         "blockType" : "header",
         "len" : 1,
         "width" : 1,
         "dimIfFixed" : {}
      },
      {
         "blockType" : "value",
         "len" : 8,
         "width" : 1,
         "dimIfFixed" : {}
      }
   ],
   "valueType" : "number",
   "isRunLabel" : false,
   "isSampleLabel" : false,
   "isInitialized" : true,
   "hasUpdatedHeader" : false
},
{
   "_id" : 6,
   "name" : "Temp",
   "alias" : "Temp",
   "blocks" : [
      {
         "blockType" : "header",
         "len" : 1,
         "width" : 1,
         "dimIfFixed" : {}
      },
      {
         "blockType" : "value",
         "len" : 8,
         "width" : 1,
         "dimIfFixed" : {}
      }
   ],
   "valueType" : "number",
   "isRunLabel" : false,
   "isSampleLabel" : false,
   "isInitialized" : true,
   "hasUpdatedHeader" : false
}
      ]
   }
  }
 ]
}
```

Fig. 39C

SYSTEMS AND METHODS FOR PARSING DATA IN ORDER TO FORM STRUCTURED DATA TABLES

CROSS REFERENCE TO RELATED APPLICATION

This application claims priority to U.S. Provisional Application No. 62/263,346, filed Dec. 4, 2015, entitled "Computer-Implemented Method for Designing, Recording and Analyzing Scientific Test Procedures and Data," and is a national stage filing of International Patent Application No. PCT/US16/64830, filed Dec. 2, 2016, entitled "Systems and Methods for Parsing Data in Order to Form Structured Data Tables," each of which is hereby incorporated by reference.

TECHNICAL FIELD

The present disclosure relates generally to systems and methods for parsing data in order to form structured data tables.

BACKGROUND

Unstructured data is generated by a wide range of applications such as various scientific measurement devices (e.g., incubators, scales, sensors, etc.), often as part of multi-stage processes that are relied upon in the research and manufacture of a wide range of products including biologics, pharmaceuticals, mechanical devices, electrical devices, and food, to name a few examples. For any of these processes, it is necessary to parse the unstructured data with the ultimate goal of obtaining a data table comprising a set of columns of data, where each column includes a header and one or more data values.

There are a number of techniques for parsing unstructured data in order to further structure the data. For example, special characters called delimiters can be used to indicate where, in the ordered data, one data field ends and another begins, are often relied upon.

What is absent in the art is the ability to automatically assign headers based on the unstructured data itself and to unambiguously assign data values to these headers based on the unstructured data itself. That is, the ability to recognize or learn structure in unstructured data, to decompose it into fundamental cells of key:value pairs, and to reconstruct these key:value pairs into a data table comprising a set of columns of data, where each column of data includes a header and one or more data values Thus, given the above background, what is needed in the art are improved systems and methods for parsing data in order to form structured data tables.

SUMMARY

The disclosed embodiments address the need in the art for systems and methods for parsing data in order to form structured data tables. The disclosed embodiments address this need by forming a data table from a data construct. The data construct comprises a plurality of tokens. A configuration construct is applied to the tokens thereby labeling a first subset of the tokens as header tokens and a second subset of the tokens as value tokens based on the positions of tokens in the first and second subsets in the data construct. Application of the configuration construct also associates specific tokens in the first subset to tokens in the second subset based on the relative or absolute position of tokens and/or by delimiters between tokens in the first and second subsets in the data construct. The associating transforms the data construct into the data table in which each token in the first subset is a header and each token in the second subset is a data value in a single column in the data table.

One aspect of the present disclosure provides a method for forming a data table comprising a set of columns of data. Each column of data includes a header and one or more data values. The method comprises, at a computer system comprising a memory and a processor, obtaining a data construct that comprises a plurality of tokens and applying a stored configuration construct to the plurality of tokens. The applying comprises labeling a first subset of tokens in the plurality of tokens as header tokens based on the position of each respective token in the first subset of tokens in the data construct. The applying also comprises labeling a second subset of tokens in the plurality of tokens as value tokens based on the position of each respective token in the second subset of tokens in the data construct. The applying also comprises associating specific tokens in the first subset to tokens in the second subset as a function of (a) the relative or absolute position of tokens in the first subset to tokens in the second subset in the data construct or (b) a presence of a delimiter specified in the configuration construct and that is present in the data construct between a token in the first subset and a token in the second subset. This associating is on a one-to-one basis, a one-to-many basis, or a many-to-one basis that is specified by the stored configuration construct. That is, a first token may be associated with one second token (one-to-one basis), a first token may be associated with several second tokens (one-to-many basis) or several different first tokens may be associated with a single second token (many-to-one basis) by the associating. In this way, the data construct is transformed into the data table in which each token in the first subset is a header and each token in the second subset is a data value in a single column in the set of columns of the data table. In some embodiments, the set of columns comprises two or more columns, three or more columns, ten or more columns, or 100 or more columns.

In some embodiments, the data construct is a flat file format.

In some embodiments, the delimiter is an alphanumeric character, a numeric character, a symbolic character, a computer-readable character, or a combination thereof. In some embodiments, the delimiter is a combination of alphanumeric characters, a combination of numeric characters, a combination of symbolic characters, a combination of computer-readable characters, or a combination thereof.

Parsing Data Blocks in the Data Construct.

In some embodiments, the stored configuration construct specifies that a first token in the first subset of tokens and one or more second tokens in the second subset of tokens form a first data block, and the applying explicitly labels each second token in the one or more second tokens with the first token. In some such embodiments, the one or more second tokens comprises two or more second tokens, and the two or more second tokens are in a contiguous region of the data construct. In some such embodiments, the stored configuration construct specifies that the first token in the first subset of tokens and the one or more second tokens in the second subset of tokens form the data block by the presence, in the data construct, of a delimiter between the first token in the first subset and a second token in the one or more second tokens in the second subset. In some such embodiments, the stored configuration construct specifies that the one or more second tokens in the second subset of tokens are separated from each other in the data construct by one or more delimiters. In some such embodiments, the stored configuration construct specifies that the first token in the first subset of tokens and the one or more second tokens in the second subset of tokens form the data block by the relative or absolute position, in the data construct, of the first token in the first subset to the one or more tokens in the second subset.

Parsing Key/Value Pairs in the Data Construct.

In some embodiments, the stored configuration construct specifies that a first token in the first subset of tokens and a second token in the second subset of tokens form a first data block, and the applying explicitly labels the second token with the first token. Further, the stored configuration construct specifies that the first token in the first subset of tokens is the portion of data in a first key-value pair in the data construct that is to the left of a delimiter in the data construct and that is specified in the configuration construct and the second token is the portion of data in the first key-value pair in the data construct to the right of the delimiter, where the first key-value pair is of the form of the first data block, and the applying explicitly labels the second token with the first token. In some such embodiments, the first token is displaced by one or more tokens or blanks spaces from the second token in the data construct. In some such embodiments the second token is a null value. In some such embodiments, the first token is absent in the data construct and is provided by the configuration construct.

In some embodiments, the first token is a name, an alias, a run identifier, or a sample identifier, and each token in the one or more second tokens is in the form of a string value, a floating point number, an integer, a date, or is in an undetermined form.

Parsing Compound Blocks (Table) in the Data Construct.

In some embodiments, the stored configuration construct specifies that a first token in the first subset of tokens and one or more second tokens in the second subset of tokens form a first data block and the applying explicitly labels each second token in the one or more second tokens with the first token. The stored configuration construct specifies a first table comprising a plurality of data blocks of the form of the first data block. Each respective data block in the plurality of data blocks is adjacent to another data block in the plurality of data blocks in the data construct. Each respective data block in the plurality of data blocks is in the same orientation in the data construct. The applying explicitly labels, for each respective data block in the plurality of data blocks, each second token in the one or more second tokens of the respective data block with the first token of the respective data block. In some such embodiments, a pair of data blocks in the first table is adjacent to each other and separated in the data construct by one or more null values or one or more blank spaces. In some such embodiments, the stored configuration construct specifies whether the first table is in a standard orientation or a transposed orientation.

Parsing Compound Blocks (Matrix) in the Data Construct.

In some embodiments, the stored configuration construct specifies a plurality of data block forms and a plurality of table forms comprising: (i) a first data block form comprising a first token in the first subset of tokens and one or more second tokens in the second subset of tokens, where the applying explicitly labels each second token in the one or more second tokens of the first data block form with the first token, (ii) a first table form comprising a first plurality of data blocks of the first data block form, where each respective data block in the first plurality of data blocks is adjacent to another data block in the first plurality of data blocks in the data construct, and each respective data block in the first plurality of data blocks is in the same orientation in the data construct, and each respective data block in the first plurality of data blocks is separated from another data block in the first plurality of data blocks by zero or more a null values, zero or more tokens, or zero or more blank spaces, and (iii) a matrix comprising a first data block of the form of the first data block form and a plurality of tables of the form of the first table form. A first table in the plurality of tables is in a standard orientation and is positioned adjacent to the left or right boundary of the one or more second tokens of the first data block of the matrix. A second table in the plurality of tables is in a transposed orientation and is positioned adjacent to the top or bottom boundary of the one or more second tokens of the first data block. The applying explicitly forms a tuple between (a) a respective first value token in the first table, (b) a respective second value token in the second table and (c) a respective third value token in the first data block based upon the relative or absolute position in the data construct of the respective first value token, the respective second value token, and the respective third value token. In some such embodiments, the first data block, the first table and the second table are offset with respect to each other by one or more spaces, null values, or ignored tokens in the data construct. In some such embodiments, each respective first value token in the first table is in the form of a string value, a floating point number, an integer, a date, or is in an undetermined form, each respective second value token in the second table is in the form of a string value, a floating point number, an integer, a date, or is in an undetermined form, and each third value token in the first data block is in the form of a string value, a floating point number, an integer, a date, or is in an undetermined form. In some such embodiments, the one or more second tokens of the first data block form comprises two or more second tokens that are in a contiguous region of the data construct. In some such embodiments, the stored configuration construct specifies that the first token in the first subset of tokens and the one or more second tokens of the first data block form define the data block by the presence, in the data construct, of a delimiter between the first token in the first subset and a second token in the one or more second tokens in the second subset. In some such embodiments, the stored configuration construct specifies that the one or more second tokens in the first data block form are separated from each other in the data construct by one or more delimiters. In some such embodiments, the stored configuration construct specifies that the first token in the first data block form and the one or more second tokens in the first data block form define the first data block form by the relative or absolute position, in the data construct, of the first token to the one or more second tokens in the second subset.

Parsing Compound Blocks (Key:

value) in the data construct. In some embodiments, the stored configuration construct specifies that a first token in the first subset of tokens and a second tokens in the second subset of tokens form a first data block and the applying explicitly labels the second token with the first token. The stored configuration construct specifies that the first token in the first subset of tokens is the portion of data in a first key-value pair in the data construct that is to the left of a delimiter in the data construct and that is specified in the configuration construct and the second token is the portion of data in the first key-value pair in the data construct to the right of the delimiter, where the first key-value pair is of the form of the first data block. In some such embodiments the stored configuration construct specifies a first key-value block comprising a plurality of key-value pairs of the form of the first key-value pair and the applying explicitly labels, for each respective key-value pair in the plurality of key-value pairs, the second token in the of the respective key-value pair with the first token of the respective key-value pair.

Parsing Superblocks in the Data Construct.

In some embodiments, the stored configuration construct specifies that a first token in the first subset of tokens and one or more second tokens in the second subset of tokens form a first data block, and the applying explicitly labels each second token in the one or more second tokens with the first token. In some such embodiments, the stored configuration construct specifies a first superblock comprising one or more compound blocks, where each compound block is a table, a matrix or a key:value block, and the applying explicitly labels each compound block with an identifier that is unique to the first superblock.

In such embodiments, each respective compound block that is a table comprises a first table form comprising a first plurality of data blocks of the form of the first data block, each respective data block in the first plurality of data blocks of the table is adjacent to another data block in the first plurality of data blocks in the data construct, each respective data block in the first plurality of data blocks of the table being in the same orientation in the data construct, and each respective data block in the first plurality of data blocks being separated from another data block in the first plurality of data blocks by zero or more a null values, zero or more tokens, or zero or more blank spaces. In such instances, the applying explicitly labels, for each respective data block in the first plurality of data blocks of the table, each second token in the one or more second tokens of the respective data block with the first token of the respective data block.

In such embodiments, each respective compound block that is a matrix comprises a second data block of the form of the first data block and a plurality of tables of the form of the first table form, where a first table in the plurality of tables is in a standard orientation and is positioned adjacent to the left or right boundary of the one or more second tokens of the second data block of the matrix, and a second table in the plurality of tables is in a transposed orientation and is positioned adjacent to the top or bottom boundary of the one or more second tokens of the second data block. In such embodiments, the applying explicitly forms a tuple between (i) a respective first value token in the first table, (ii) a respective second value token in the second table and (iii) a respective third value token in the second data block based upon the relative or absolute position in the data construct of the respective first value token, the respective second value token, and the respective third value token.

In such embodiments, each respective compound block that is a key-value block comprises a plurality of key-value pairs of the form of a first key-value pair in the stored configuration construct, in which the one or more second tokens is a single second token, where the first key-value pair specifies that a first token in the first subset of tokens is the portion of data in the first key-value pair in the data construct that is to the left of a delimiter in the data construct and that is specified in the configuration construct and the second token is the portion of data in the first key-value pair in the data construct to the right of the delimiter, and the applying explicitly labels, for each respective key-value pair in the plurality of key-value pairs, each second token in the second token of the respective key-value pair with the first token of the respective key-value pair.

General Embodiments

In some embodiments each token in the plurality of tokens is a string, an integer number, a floating point number, a binary number, a null value, a data object or a cell. In some embodiments, the method further comprises building the configuration construct at a time prior to the applying, where the building comprises (i) displaying all or a portion of the data construct (ii) receiving a first user selection of the first subset of tokens from the displayed data construct, (iii) receiving a second user selection of the second subset of tokens from the displayed data construct, (iv) computing the relative or absolute position between a first token in the first subset of tokens to a second token in the second subset of tokens in the data construct, and (v) including the relative or absolute position between the first token and the second token in the configuration construct. In such embodiments, the configuration construct is stored.

In some embodiments, the method further comprises associating the data table with a run hypergraph for a process that results in a product or analytical information, where the run hypergraph comprises (i) a plurality of nodes, (ii) a plurality of runs, each respective run in the plurality of runs being associated with a node in the plurality of nodes, and (iii) a plurality of run edges. In such embodiments, each respective node in the plurality of nodes is associated with: (i) a set of parameterized resource inputs to the respective node, wherein at least one parameterized resource input in the set of parameterized resource inputs is associated with one or more input properties, the one or more input properties including an input specification limit, and (ii) a set of parameterized resource outputs to the respective node, wherein at least one parameterized resource output in the set of parameterized resource outputs is associated with one or more output properties, the one or more output properties including a corresponding output specification limit. Further, each run edge in the plurality of run edges joins (a) a run in the plurality of runs associated with a parent node in the plurality of nodes and (b) a run in the plurality of runs associated with a child node in the plurality of nodes thereby specifying a set of parameterized resource outputs of the parent node that is included in the set of parameterized resource inputs of the child node. In such embodiments, each respective run in the plurality of runs comprises: (i) an index that uniquely identifies a corresponding node in the plurality of nodes and (ii) a run identifier that uniquely identifies a run in the plurality of runs. Further, in such embodiments, the method also comprises assigning the data table to a node in the plurality of nodes. In some such embodiments, the data table is an event series table and each respective token in the second subset of tokens is explicitly assigned by the event series table to a particular index and run identifier thereby assigning the respective token to a corresponding node in the plurality of nodes and a particular run in the plurality of runs. In some such embodiments, each respective run in the plurality of runs is further associated with a parameter combination identifier of a parameter combination in a plurality of parameter combinations. In some such embodiments, the plurality of nodes comprises five or more nodes.

In some such embodiments, the set of parameterized resource inputs for a node in the plurality of nodes comprises a first and second parameterized resource input, the first parameterized resource input specifies a first resource and is associated with a first input property, the second parameterized resource input specifies a second resource and is associated with a second input property, and the first input property is different than the second input property. In some such embodiments, the first input property is a viscosity value, a purity value, composition value, a temperature value, a weight value, a mass value, a volume value, or a batch identifier of the first resource.

In some such embodiments, the set of parameterized resource inputs for a node in the plurality of nodes comprises a first parameterized resource input, the first parameterized resource input specifies a first resource and is associated with a first input property and a second input property, where the first input property is different than the second input property. In some such embodiments, the first input property is a viscosity value, a purity value, composition value, a temperature value, a weight value, a mass value, a volume value, or a batch identifier of the first resource.

In some such embodiments, the set of parameterized resource inputs for a first node in the plurality of nodes comprises a first parameterized resource input, and an input property associated with the first parameterized resource input specifies a process condition associated with the corresponding node. In some such embodiments, the process condition comprises an intensive quantity, an extensive quantity, a temperature, a volume, time, a space, a quality, a type of equipment, an order, a state, or a batch identifier.

Another aspect of the present disclosure provides a computer system, comprising one or more processors memory and one or more programs for performing any of the methods disclosed in the present disclosure.

BRIEF DESCRIPTION OF THE DRAWINGS

FIGS. 5A, 5B, 5C, 5D, 5E, 5F, 5G, 5H, and 5I collectively illustrate a flowchart for forming a data table comprising a set of columns of data, were each column of data includes a header and one or more data values, in accordance with an embodiment of the present disclosure.

FIG. 21 illustrates how the selected data construct of FIG. 19 includes table data in the form of a compound block composed of six data blocks 2102, each with a header token 240 and a number of value tokens 242 in accordance with an embodiment of the present disclosure.

FIG. 22 highlights the "condition" data block 2102-2 within the compound block and shows how it is composed of a token that is a header token 240 and eight tokens that are value tokens 242 in accordance with an embodiment of the present disclosure.

FIG. 23 illustrates how the header token 240 from each data block 2102 in the compound block of FIGS. 21-22 is presented to a user to associate with the input 312 or output 318 properties of a respective parameterized resource input 310 or parameterized resource output 316 of a node 304 of a run hypergraph 204 in accordance with an embodiment of the present disclosure.

FIG. 26 illustrates a key:value block 2602 in the compound block within the data construct 230 selected in FIG. 25 that is composed of five key:value pairs 2604, within the compound block 2602 and how the compound block 2602 is given the name "INSTRUMENT" 2606 in accordance with an embodiment of the present disclosure.

FIG. 27 illustrates how one key:value pair 2604-2 in the key:value block 2602 of FIG. 26 is composed of a header token ("Manufacturer") 240 separated from a value token ("TECAN") 242 by a colon delimiter in accordance with an embodiment of the present disclosure.

FIG. 28 illustrates how another tab within the data construct 230 selected in FIG. 25 is a compound block of the matrix type 2802 and named "SPEC DATA" 2804. The compound block 2802 includes a column label table 2806 and a row label table 2808 and a table of value tokens 242 (2810) are shown. The table of values tokens 2810 and the row label table 2808 have no header tokens 240, only value tokens 242. The column label table 2806 has header token 240 ("Replicate ID" and "Time (s)") for each data block 2812 within it in accordance with an embodiment of the present disclosure.

FIG. 29 illustrates how the data from both the key:value and the matrix compound blocks collectively described in FIG. 25-27 are combined into a single super block and the resulting header tokens 240 are presented to the user to associate with input properties 312 and/or output properties 318 of respective resource inputs 310 and resource outputs 316 as can be seen in the drop down menu containing header tokens 240 from both the "instrument" and "spec data" compound blocks in accordance with an embodiment of the present disclosure.

FIG. 32 illustrates exemplary properties of value tokens 242 and header tokens 240 in accordance with some embodiments of the present disclosure.

FIG. 33 illustrates the properties of a data block in accordance with some embodiments.

FIG. 34 illustrates example properties of a compound block—table in accordance with an embodiment of the present disclosure.

FIG. 36 illustrates example properties of a compound block—key:value accordance with an embodiment of the present disclosure.

FIG. 38 illustrates the data construct 230 of FIG. 21 in higher resolution in accordance with an embodiment of the present disclosure.

FIGS. 39A, 39B, and 39C are collectively a JSON data object that describes the structure of the configuration construct 234 that is applied to the data construct 230 of FIG. 38 in accordance with an embodiment of the present disclosure.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
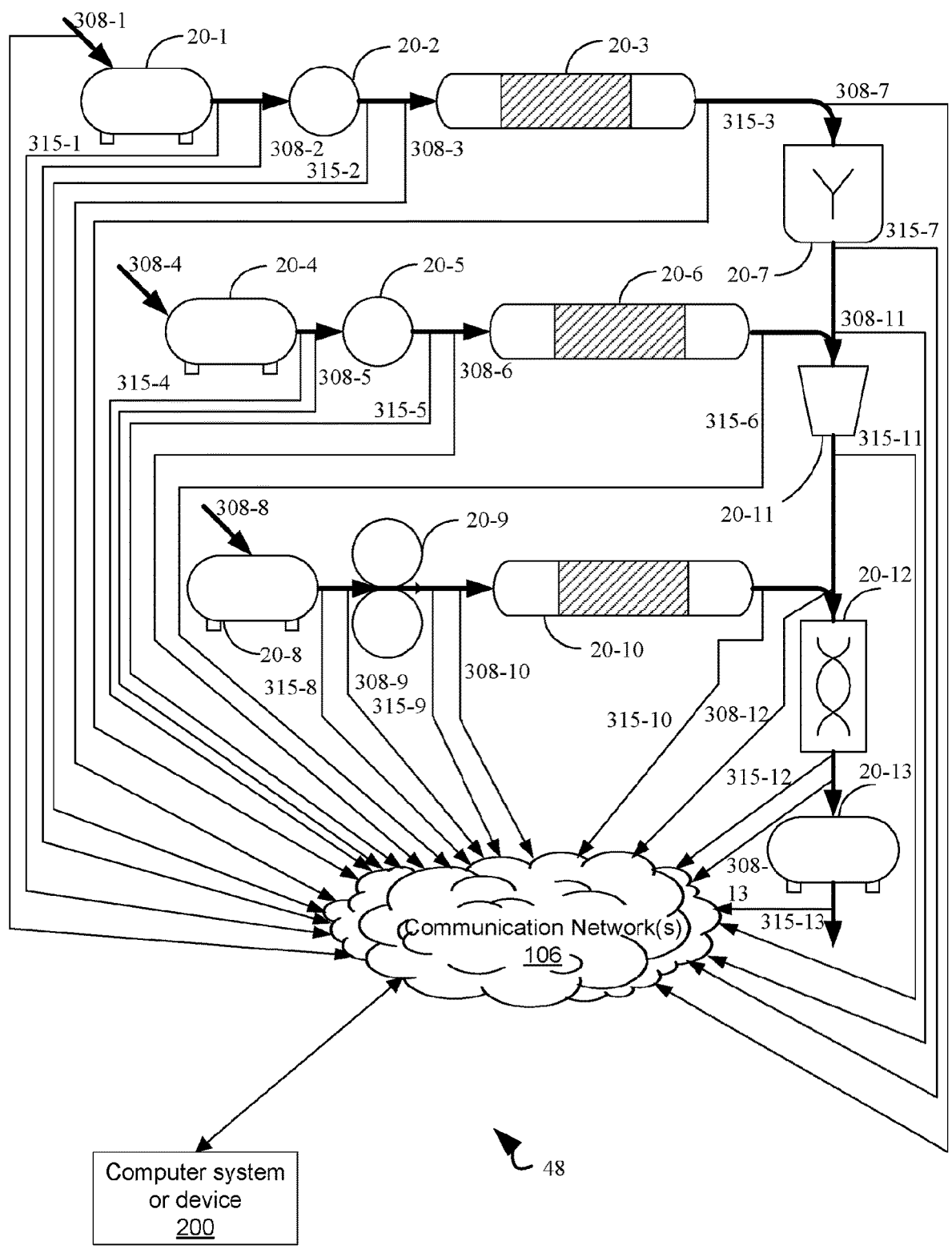
FIG. 1 illustrates an example system topology in accordance with the present disclosure that includes a device, namely a device 200, and a plurality of stages 20 of a process.

A detailed description of a system 48 for forming a data table 236 comprising a set of columns of data, where each column of data 238 includes a header 240 and one or more data values (value tokens) 242 in accordance with the present disclosure is described in conjunction with FIGS. 1 through 4. In particular, FIG. 1 illustrates a process or pipeline having a plurality of stages 20 for which the present disclosure may optionally be applied. Each respective stage 20 in FIG. 1 is illustrated by an exemplary reaction chamber to indicate that a form of material transformation takes place. However, there is no requirement that this material transformation take place in a reaction chamber. As further schematically illustrated in FIG. 1, each stage 20 includes a set of parameterized inputs 308 and a set of parameterized outputs 315. In some embodiments, as illustrated in FIG. 1, a description of these inputs 308 and outputs 315 is provided to computer system 200, or more generically a device 200, possibly over communications network 106 in the form of one or more data constructs 230. For instance, at stage 20-2, when a process completes this stage, a data construct 230 in the form of a file that includes the parameterized outputs of this stage is stored in a directory associated with this stage. Then, a sweeping or monitoring process takes this new file and sends it to computer system 200 where it is processed in accordance with the methods of the present disclosure into a data table 236 for a corresponding process run stored in the computer system 200. In more detail, in some embodiments, inputs 308 or outputs 315 are electronically measured by measuring devices. For instance, in some embodiments a software component such as a sync engine that runs as a background process (like Google Drive or Dropbox Sync) on any computer attached to an instrument or other component of a stage 20 monitors a synced folder. When new instrument data files are added to the folder, the software sends the data associated with the stage across the communications network 106 to the computer system 200 in the form of a data construct 230. This data construct 230 is then parsed into a data table 236 in accordance with the disclosed embodiments. In some embodiments, a hardware solution is used to communicate the set of inputs 308 and outputs 315 of the stages 20 of a process. In such an approach, data acquisition and transfer is performed by direct interface with instruments or other components of stages 20. For instance, in some embodiments a BeagleBone black microcontroller (http://beagleboard.org/BLACK) is used to transmit such data to the computer system 200 across the network 106. In some embodiments, data (e.g., values for a set of parameterized resource inputs 310 and/or values for a set of parameterized resource outputs 315 associated with a stage 20 of a process) is communicated from the respective stages 20 to the computer system via HTTPS port 443 via HTTP POSTs or representational state transfer.

Of course, other topologies of system 48 are possible, for instance, computer system 200 can in fact constitute several computers that are linked together in a network or be a virtual machine in a cloud computing context. As such, the exemplary topology shown in FIG. 1 merely serves to describe the features of an embodiment of the present disclosure in a manner that will be readily understood to one of skill in the art. Moreover, FIG. 1 shows just one example of how data constructs 230 may arise. In general, data constructs 230 may be formed in any number of ways and are not necessarily associated with the processes illustrated in FIG. 1. For instance, in some embodiments, a data construct is any set of tokens in a flat file, as described in more detail below.

Figure 2:
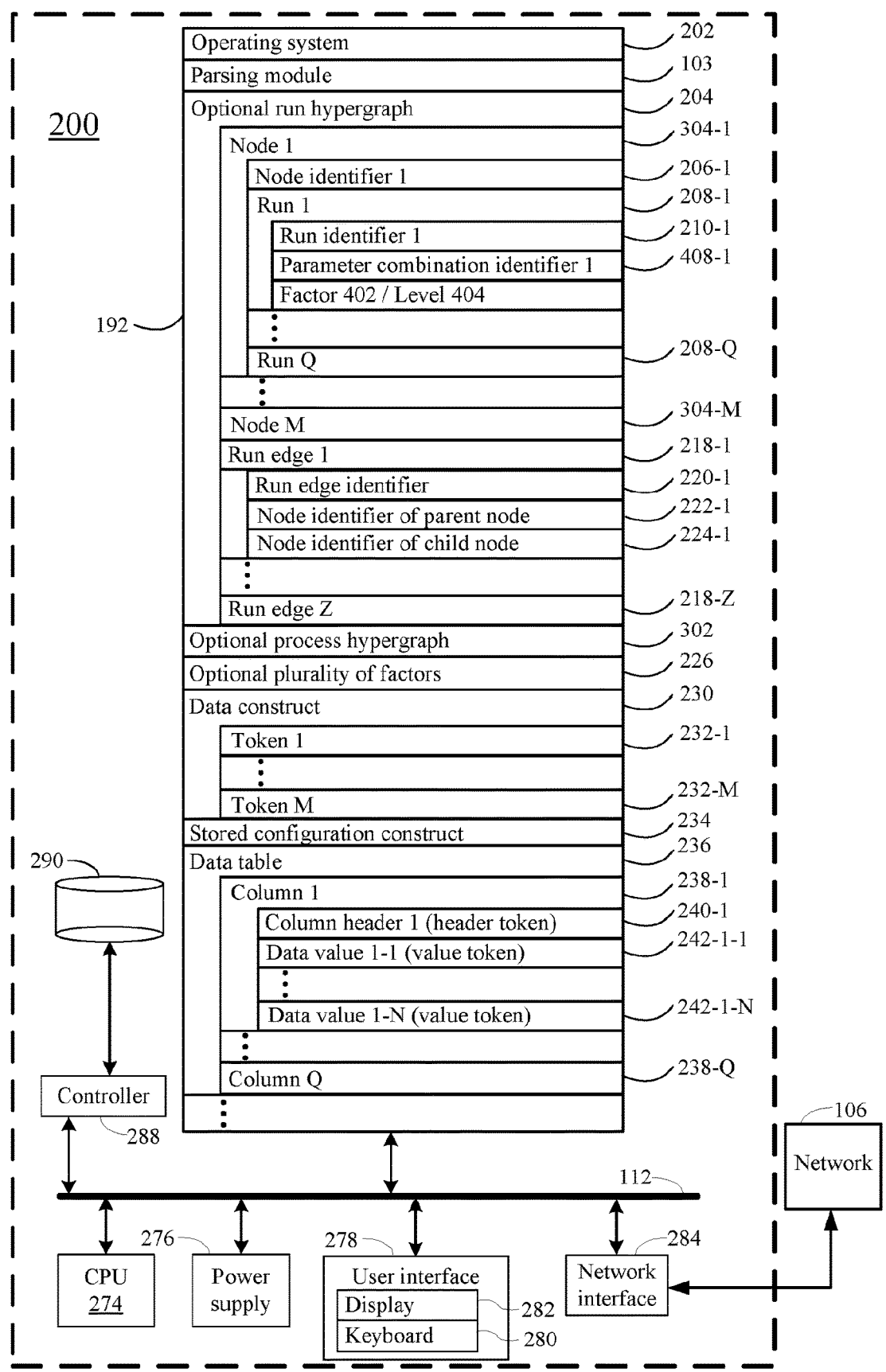
FIG. 2 illustrates a device in accordance with an embodiment of the present disclosure.

Referring to FIG. 2, in typical embodiments, a computer system 200 for forming a data table 236 comprising a set of columns of data, where each column of data 238 includes a header token 240 and one or more data values (value tokens) 242 comprises one or more computers. For purposes of illustration in FIG. 2, the computer system 200 is represented as a single computer that includes all of the functionality of the computer system 200. However, the disclosure is not so limited. The functionality of the computer system 200 may be spread across any number of networked computers and/or reside on each of several networked computers or other devices and/or by hosted on one or more virtual machines or other devices at one or more remote locations accessible across the communications network 106. One of skill in the art will appreciate that a wide array of different computer and/or device topologies are possible for the computer system 200 and all such topologies are within the scope of the present disclosure.

Turning to FIG. 2, a computer system 200 in accordance with one aspect of the present disclosure comprises one or more processing units (CPU's) 274, a network or other communications interface 284, a memory 192 (e.g., random access memory), one or more magnetic disk storage and/or persistent devices 290 optionally accessed by one or more controllers 288, one or more communication busses 112 for interconnecting the aforementioned components, and a power supply 276 for powering the aforementioned components. Data in memory 192 can be seamlessly shared with non-volatile memory 290 using known computing techniques such as caching. Memory 192 and/or memory 290 can include mass storage that is remotely located with respect to the central processing unit(s) 274. In other words, some data stored in memory 192 and/or memory 290 may in fact be hosted on computers that are external to computer system 200 but that can be electronically accessed by the computer system over an Internet, intranet, or other form of network or electronic cable (illustrated as element 106 in FIG. 2) using network interface 284. In some embodiments computer system 200 further includes a user interface 278 comprising a display 282 and a user keyboard 280.

The memory 192 of computer system 200 stores:
- an operating system 202 that includes procedures for handling various basic system services;
- a parsing module 103 for forming a data table comprising a set of columns of data, where each column of data includes a header and one or more data values;
- an optional run hypergraph 204, the optional run hypergraph comprising (i) a plurality of nodes 304, (ii) a plurality of runs, each run 208 in the plurality of runs being associated with a node 304 in the plurality of nodes, and (iii) a plurality of run edges 218.
- an optional process hypergraph 302, the optional process hypergraph comprising (i) the plurality of nodes of the run hypergraph 304 and (ii) a plurality of process edges, where each process edge joins a parent node to a daughter node in the plurality of nodes;
- an optional plurality of factors 226;
- one or more data constructs 230, each such data construct comprises a plurality of tokens 232;
- one or more stored configuration constructs 234 that are applied to a corresponding data construct 230; and
- one or more data tables 236, each respective data table 236 comprising a set of columns, and each respective column 238 in the set of columns comprising a column header 240 and one or more data values (value tokens) 242 that are obtained from tokens 232 in a corresponding data construct 230 by application of a corresponding stored configuration construct 234.

In some implementations, one or more of the above identified data elements or modules of the computer system 200 are stored in one or more of the previously mentioned memory devices, and correspond to a set of instructions for performing a function described above. The above identified data, modules or programs (e.g., sets of instructions) need not be implemented as separate software programs, procedures or modules, and thus various subsets of these modules may be combined or otherwise re-arranged in various implementations. In some implementations, the memory 192 and/or 290 optionally stores a subset of the modules and data structures identified above. Furthermore, in some embodiments the memory 192 and/or 290 stores additional modules and data structures not described above.

Figure 3:
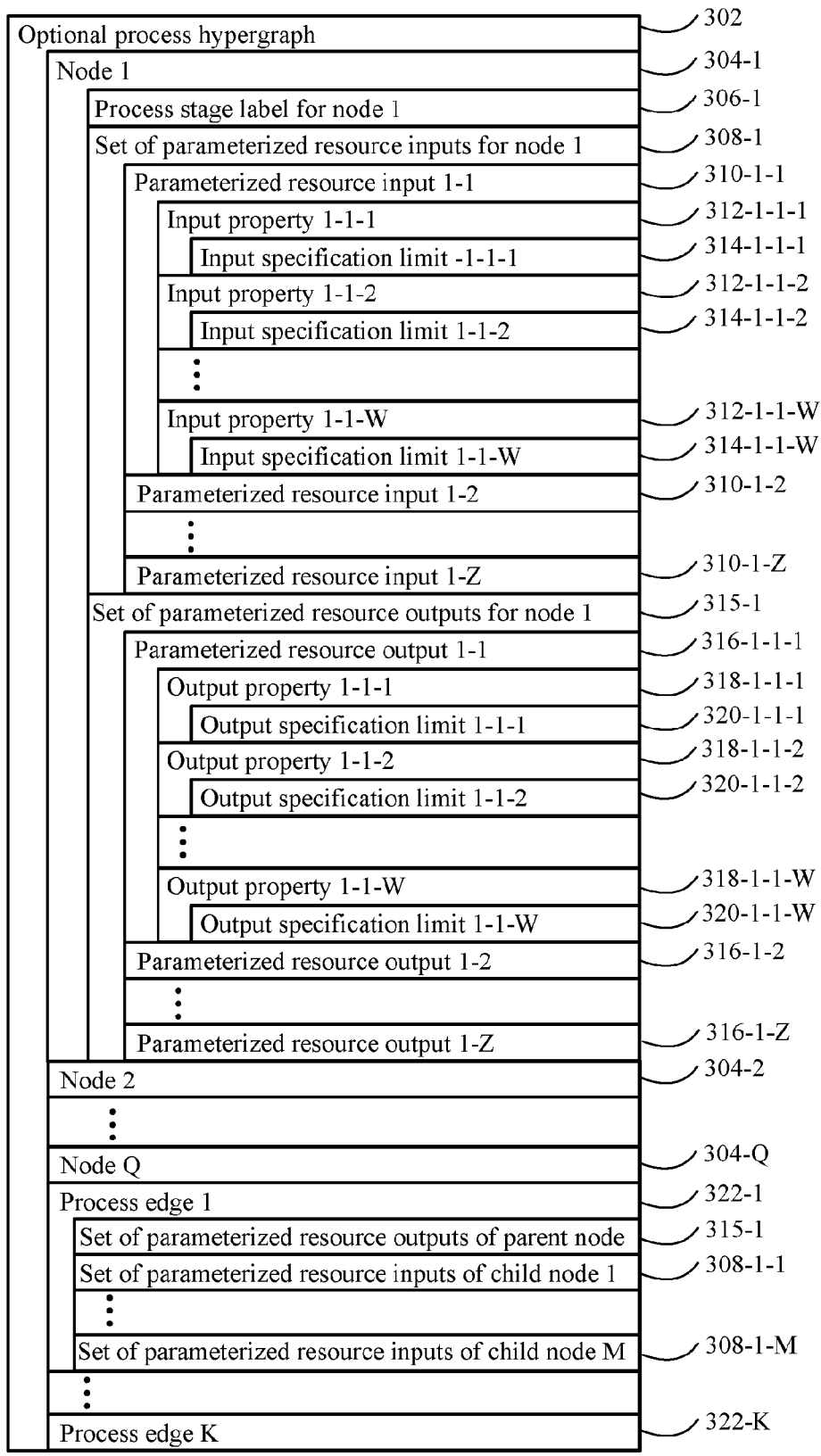
FIG. 3 illustrates a process hypergraph in accordance with an optional embodiment of the present disclosure.

Turning to FIG. 3, more details of an optional process hypergraph 302 are described. Further details of the optional process hypergraph 302 are found in International Patent Application No. PCT/US2016/039227, filed Jun. 24, 2016, entitled "Systems and Methods for Formulation of Experiments for Analysis of Process Performance," and International Patent Application No. PCT/US2015/042999, filed Jul. 30, 2015, entitled "Systems and Methods for Process Design and Analysis," each of which is hereby incorporated by reference. The optional process hypergraph 302 comprises a plurality of nodes 304, is directional, causal, and sequential based. For instance, each respective node 304 in the plurality of nodes is connected to at least one other node in the plurality of nodes by a process edge 322. Each respective node 304 in the plurality of nodes comprises a process stage label 306 representing a respective stage (node) in the corresponding process.

In some embodiments, a node 304 is a complete and self-contained description of a transformative event that can be used to build larger processes. A node 304 is sufficiently general to serve in a wide array of processes, such as chemical processes, life science processes, and food preparation processes. Advantageously, nodes 304 do not lose their meaning or utility when copied into other processes. As such, the definition of a node 304 does not depend on the definition of other nodes in a process hypergraph 302 in preferred embodiments.

Each respective node 304 in the plurality of nodes of a process hypergraph 304 is associated with a set of parameterized resource inputs 308 to the respective stage in the corresponding process. At least one parameterized resource input 310 in the set of parameterized resource inputs 308 is associated with one or more input properties 312, the one or more input properties including an input specification limit 314. Examples of input properties 312 are the attributes (e.g., measurements, quantities, etc.) of things such as people, equipment, materials, and data. There can be multiple input properties for a single parameterized resource input (e.g., temperature, flow rate, viscosity, pH, purity, etc.). In some embodiments, there is a single input property for a particular parameterized resource input.

Each respective node 304 in the plurality of nodes is also associated with a set of parameterized resource outputs 315 to the respective stage in the corresponding process. At least one parameterized resource output 316 in the set of parameterized resource outputs 315 is associated with one or more output properties 318, the one or more output properties including a corresponding output specification limit 320. Examples of output properties 318 include attributes (e.g., measurements, quantities, etc.) of things such as people, equipment, materials, and data. There can be multiple output properties for a single parameterized resource output. In some embodiments, there is a single output property for a particular parameterized resource output. Further discussion of such parameterized resource inputs and parameterized resource outputs is disclosed in PCT publication WO 2016/019188 A1 entitled "Systems and Methods for Process Design and Analysis," in particular the text describing FIGS. 17 and 18 of WO 2016/019188 A1, which is hereby incorporated by reference.

Returning to FIG. 3, each process hypergraph 302 includes a plurality of process edges. Each respective process edge 322 in the plurality of process edges specifies that the set of parameterized resource outputs 315 of a source node 304 in the plurality of nodes is included in the set of parameterized resource inputs 308 of at least one other destination node 304 in the plurality of nodes. In other words, a process edge specifies that the state of a material, equipment, people or other thing inputted into one node (destination node) in a given process is identical to the state of material, equipment, people, or other thing that has been outputted from another node (source node) in the hypergraph for that process. In some embodiments, a process edge 322 specifies that the state of a material, equipment, people or other thing inputted into a plurality of nodes (destination node) is identical in a given process to the state of material, equipment, people, or other thing that has been outputted from another node (source node) in the hypergraph for that process. Moreover, a destination node may be connected to two or more source nodes meaning that the input of the destination node includes material, equipment, people or other thing in the same state as it was in the output of the two or more source nodes for a given process.

As FIG. 3 illustrates, each node 304 in the process hypergraph 302 has inputs (set of parameterized resource inputs 308), and each of these parameterized resource inputs 310 has one or more input properties 312, and each these input properties has input specification limits 314. Further, each node 304 has one or more parameterized resource outputs (set of parameterized resource outputs 315), and each of these parameterized resource outputs 316 has one or more output properties 318. Moreover, each of these output properties has an output specification limit 320. The set of parameterized resource outputs 315 serves as the inputs to other nodes and such relationships are denoted by process edges 322. Moreover, the set of parameterized resource outputs 315 of a particular node can serve as the inputs to more than one node, thus the process edges 322 and nodes 304 constitute a process hypergraph 302. By defining a process in this way, it is possible to integrate data acquisition from disparate sources and devices, and query process runs to identify correlations, reduce experimental variance, and improve process reproducibility as disclosed in PCT publication WO 2016/019188 A1 entitled "Systems and Methods for Process Design and Analysis," in particular the text describing FIGS. 17 and 18 of WO 2016/019188 A1, which is hereby incorporated by reference.

In some instances, a destination node 304 of a process hypergraph 302 includes only a single process edge 322 from one source node 324. In such instances, the set of parameterized resource outputs 315 for the source node 324 constitutes the entire set of parameterized resource inputs 308 for the destination node 326.

To illustrate the concept of a node in a process represented by a process hypergraph 302, consider a node that is designed to measure the temperature of fermenter broth. The set of parameterized inputs 308 to this node include a description of the fermenter broth and the thermocouple that makes the temperature measurement. The thermocouple will include input properties that include its cleanliness state, calibration state and other properties of the thermocouple. The set of parameterized outputs 315 to this node 304 include the temperature of the fermenter broth, and output specification limits for this temperature (e.g., an acceptable range for the temperature). Another possible parameterized resource output 316 of the node 304 is the thermocouple itself along with properties 318 of the thermocouple after the temperature has been taken, such as its cleanliness state and calibration state. For each of these output properties 318 there is again a corresponding output specification limit 320.

In some instances, a destination node of a process hypergraph 302 includes multiple process edges 322, each such edge from a different source node. In such instances, the set of parameterized resource outputs 315 for each such source node collectively constitute the set of parameterized resource inputs 308 for the destination node.

Figure 4:
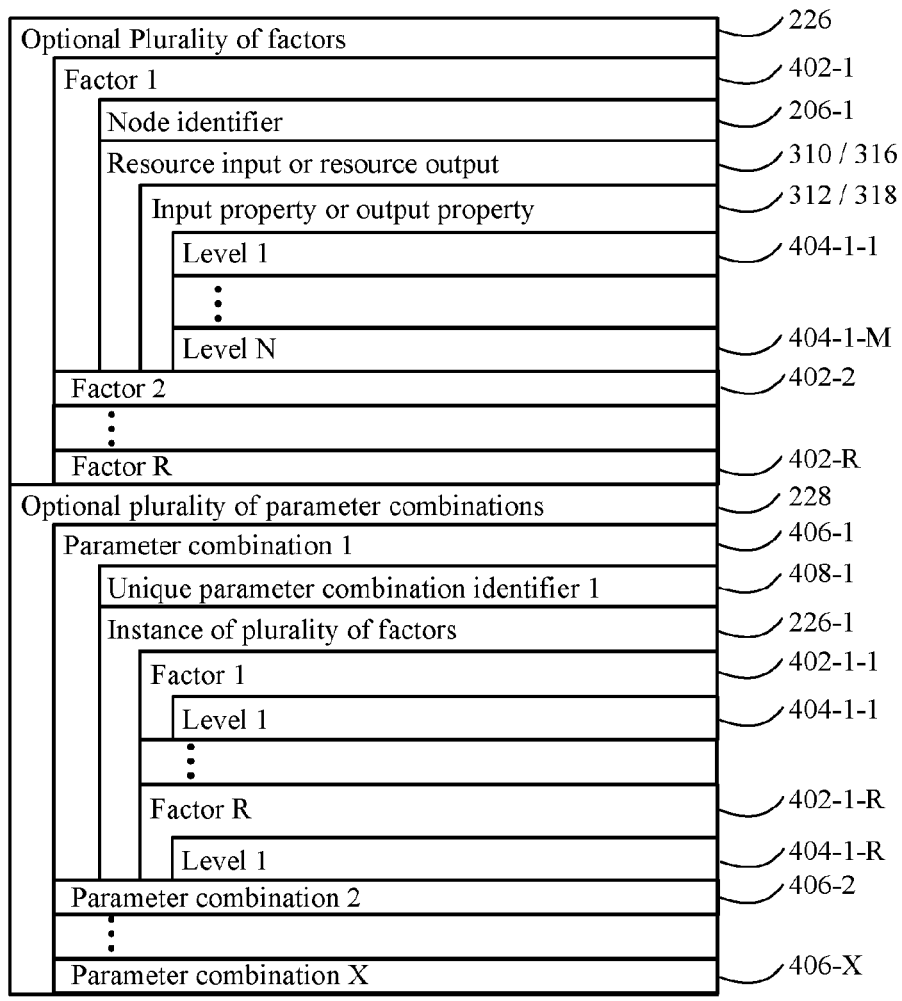
FIG. 4 provides further details of an optional data structure for a plurality of factors and an optional data structure for a plurality of parameter combinations in accordance with optional embodiments of the present disclosure.

FIG. 4 provides an example data structure for a plurality of factors 226. As illustrated in FIG. 4, each respective factor 402 in the plurality of factors is associated with a node identifier 206 of a node 304 and either (i) an input property 312 in the one or more input properties of a resource input 310 in the set of parameterized resource inputs 308 of the node 304 in the plurality of nodes identified by the node identifier 206, or (ii) an output property 318 in the one or more output properties of a resource output 316 in the set of parameterized resource outputs 315 of the node 304 in the plurality of nodes identified by the node identifier 206. Further, for each respective factor 402 in the plurality of factors, there is a number of levels 404 for the input property 312 or output property 318 associated with the respective factor 402. For instance, consider the case where an input property 312 is designated for a particular factor 402 and this input property is a purity value. In this instance, examples of levels 404 for the purity value, and thus the respective factor 402, would be 90 percent pure, 95 percent pure, 99 percent pure, and so forth. As another example, consider the case where an output property 318 is designated for a particular factor 402 and this output property is a temperature value. In this instance, examples of levels 404 for the temperature value, and thus the respective factor 402, would be 45 degrees Celsius, 46 degrees Celsius, 47 degrees Celsius, and so forth.

FIG. 4 also provides an example data structure for a plurality of parameter combinations 228. As illustrated in FIG. 4, each respective parameter combination 406 in the plurality of parameter combinations 228 includes (i) a unique parameter combination identifier 408 from a plurality of unique parameter combinations identifiers, and (ii) an instance of each factor 402 in the plurality of factors 226, where each respective factor in the instance of the plurality of factors is set to a level 404 in the number of levels of the input property 312 or output property 318 associated with the respective factor.

As an example, consider the case where a plurality of factors 226 consists of 10 factors, with each of the 10 factors having one of two possible levels. A first parameter combination 406-1 in the plurality of parameter combinations 228 will contain a first instance of the plurality of factors 226-1 (10 factors), with each respective factor 402 in the first instance of the plurality of factors 226-1 independently assigned to one of the two possible levels 404 for the respective factor, a second parameter combination 406-2 in the plurality of parameter combinations 228 will contain a second instance of the plurality of factors 226-2 (10 factors), with each respective factor 402 in the second instance of the plurality of factors 226-1 independently assigned to one of the two possible levels 404 for the respective factor, and so forth.

As another example, consider the case where a plurality of factors 226 consists of 5 factors, with each of the five factors having one of a plurality of possible levels. A first parameter combination 406-1 in the plurality of parameter combinations 228 will contain a first instance of the plurality of factors 226-1 (5 factors), with each respective factor 402 in the first instance of the plurality of factors 226-1 independently assigned to one of the plurality of possible levels 404 for the respective factor, a second parameter combination 406-2 in the plurality of parameter combinations 228 will contain a second instance of the plurality of factors 226-2 (5 factors), with each respective factor 402 in the second instance of the plurality of factors 226-1 independently assigned to one of the plurality of possible levels 404 for the respective factor, and so forth.

Now that details of a system 48 for forming a data table 236 comprising a set of columns of data, where each column of data 238 includes a header token 240 and one or more data values (value tokens) 242, have been disclosed, details regarding how a parsing module 103 of the system 48 builds data table 236 in accordance with an embodiment of the present disclosure are disclosed with reference to FIG. 5.

Referring to block 502, a method for forming a data table 236 comprising a set of columns of data (in standard or transposed orientation), where each column of data 238 includes a header token 240 and one or more data values (value tokens) 242 is described. The method comprises, at a computer system comprising a memory and a processor, obtaining a data construct 230 that comprises a plurality of tokens 232. In some embodiments, the data construct 230 is in a flat file format (block 504). In some embodiments, the data construct 230 is in a flat file format such as comma- and tab-separated value files. In some embodiments, the data construct 230 is in a fixed-width file format (e.g., from databases or certain EDI-like formats). In some embodiments, the data construct 230 is in a tagged file format containing multiple row types within a single data stream.

In some embodiments, each token 232 in the plurality of tokens is a string, an integer number, a floating point number, a binary number, a null value, a data object or a cell (block 506).

Figure 21:
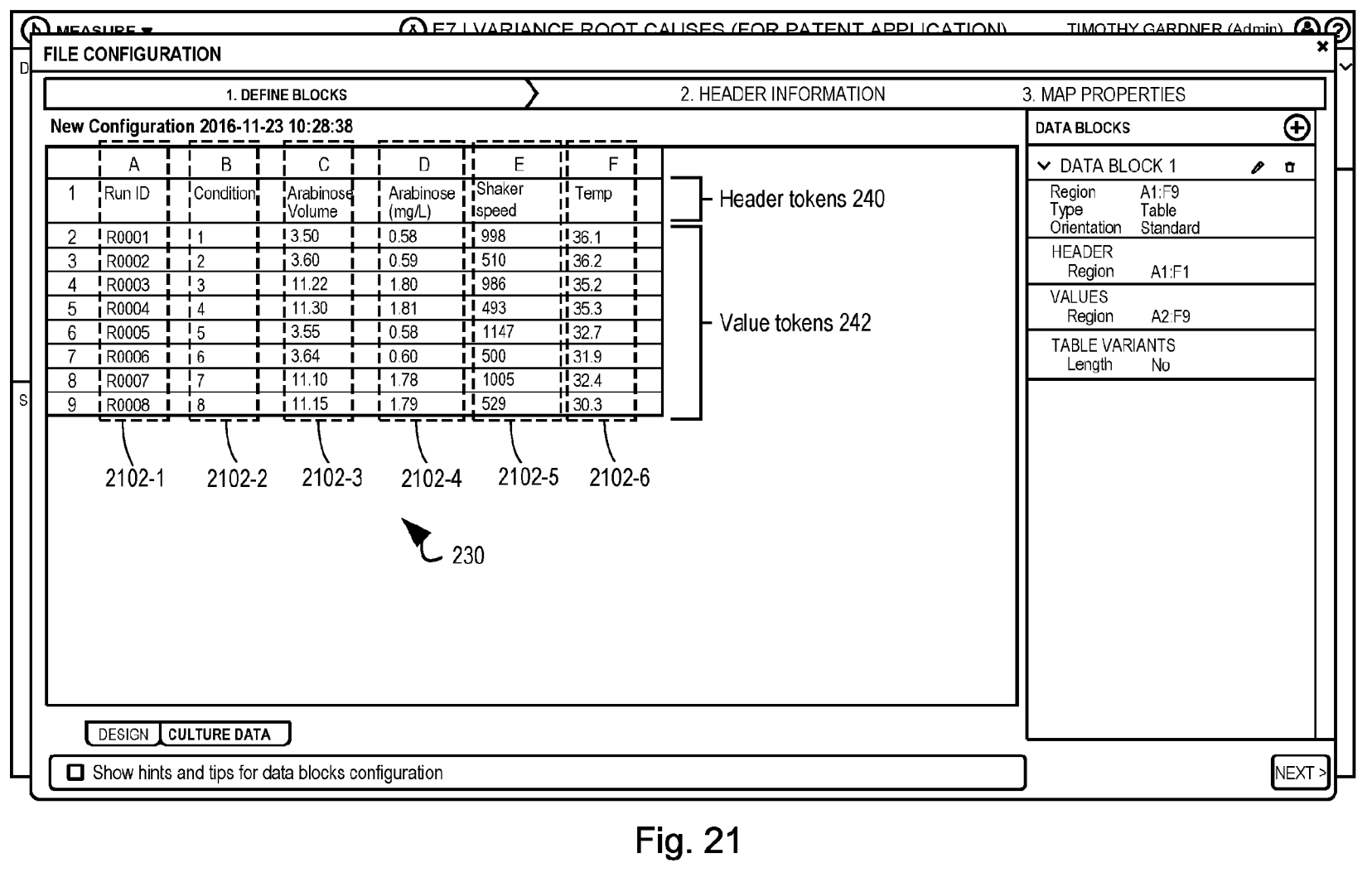

Block 508. Referring to block 508 of FIG. 5A, the method continues with the application of a stored configuration construct 234 to the plurality of tokens 232. The applying comprises labeling a first subset of tokens in the plurality of tokens as header tokens 240 based on the position of each respective token 232 in the first subset of tokens in the data construct 230. The applying further comprises labeling a second subset of tokens in the plurality of tokens as value tokens 242 based on the position of each respective token in the second subset of tokens in the data construct 230. For example, in FIG. 21 illustrates how the tokens of a data construct are labels as value tokens 242 or header tokens 240. FIG. 32 illustrates exemplary properties of value tokens 242 and header tokens 240 in accordance with some embodiments of the present disclosure.

Moreover, continuing to refer to block 508, the applying associates tokens in the first subset to tokens in the second subset as a function of (a) the relative or absolute position of tokens in the first subset to tokens in the second subset in the data construct 230 or (b) a presence of a delimiter specified in the configuration construct 234 and that is present in the data construct 230 between a token in the first subset and a token in the second subset. The associating is on a one-to-one basis, a one-to-many basis, or a many-to-one basis that is specified by the stored configuration construct 234, thereby transforming the data construct into the data table in which each token in the first subset is a header and each token in the second subset is a data value in a single column in the set of columns of the data table.

Figure 18:
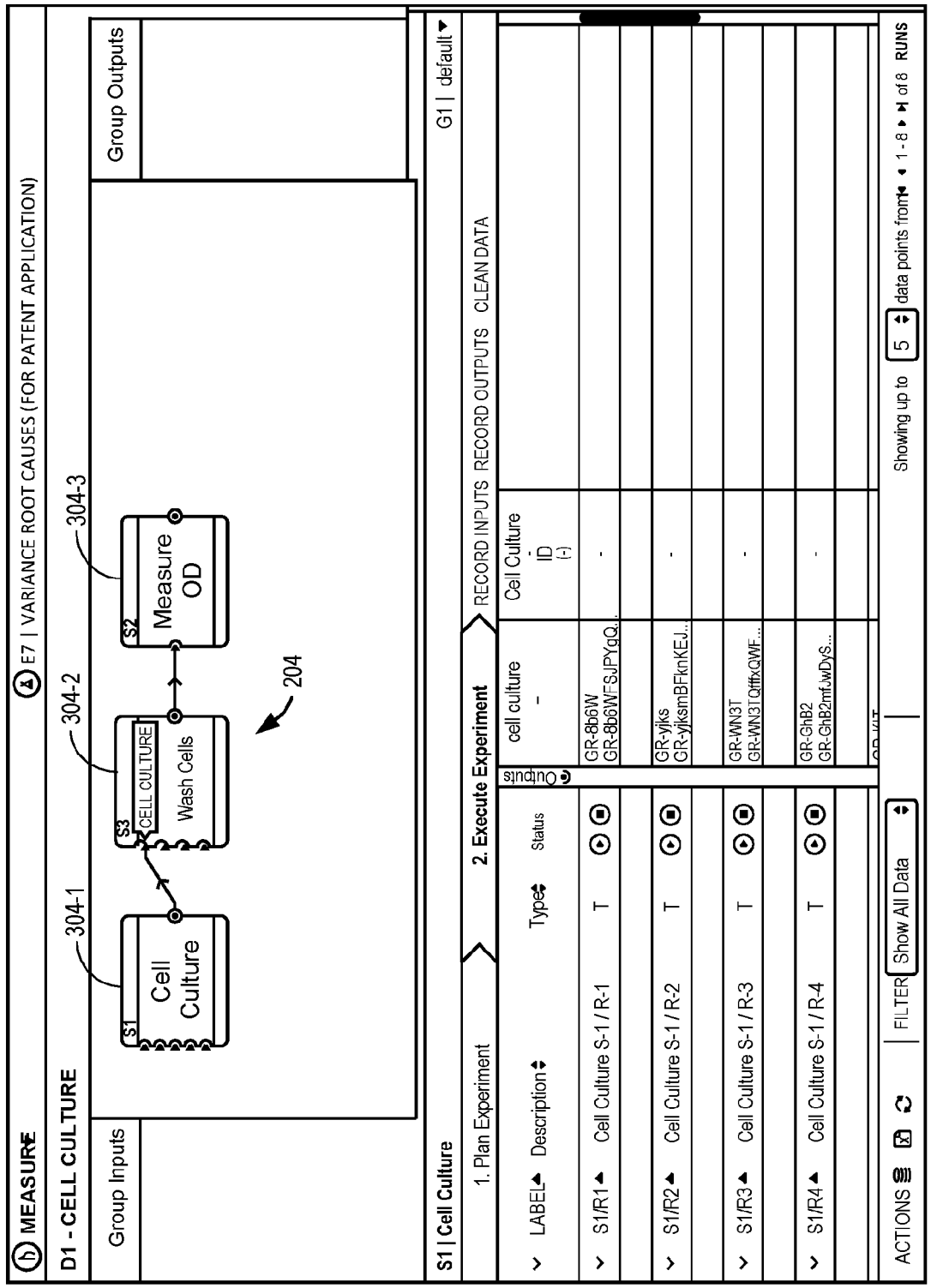
FIG. 18 illustrates a run hypergraph 204 that includes nodes 304-1 through 304-3 in accordance with an embodiment of the present disclosure.
Figure 19:
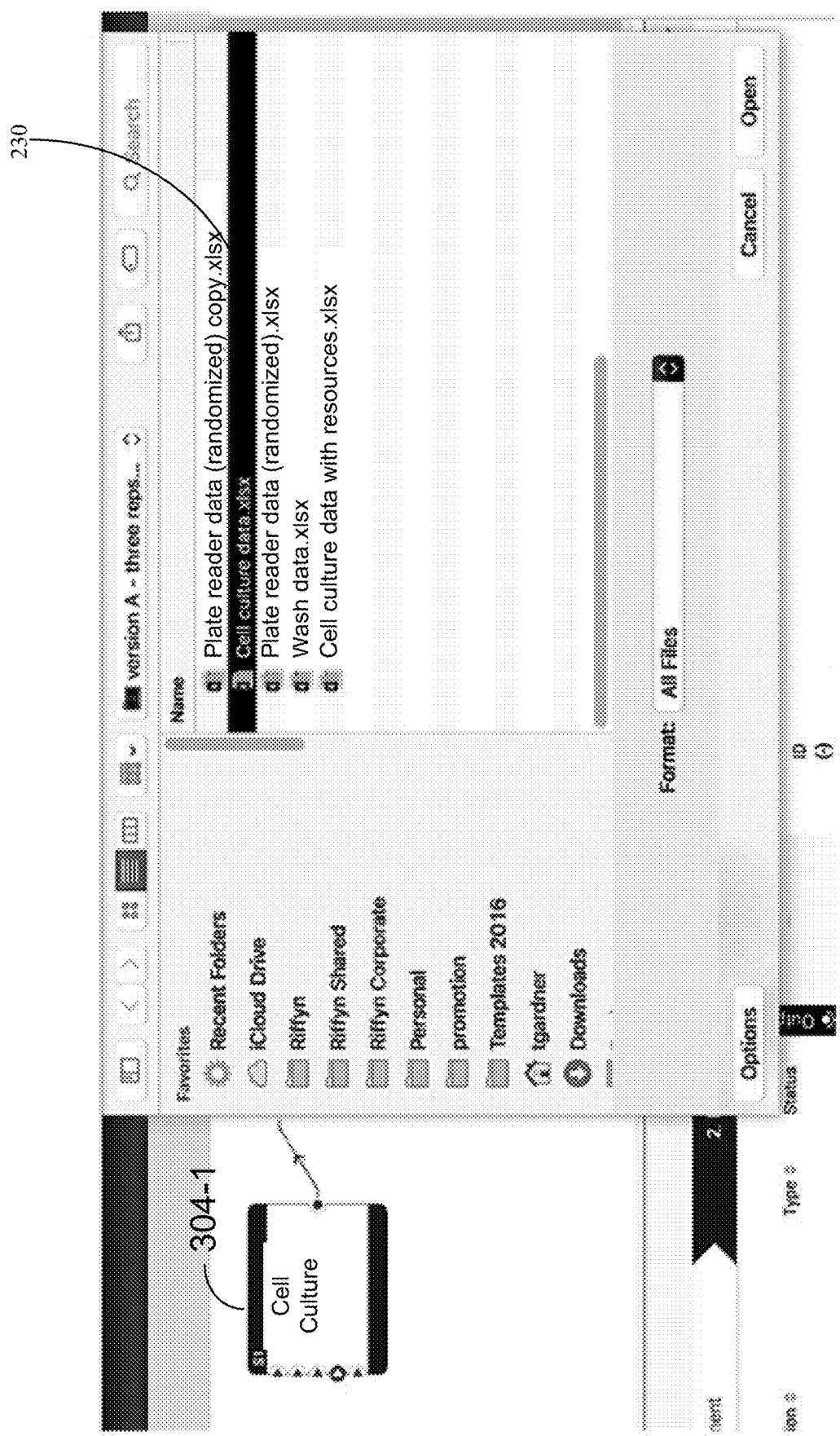
FIG. 19 illustrates how a data construct 230 in the form of a file is selected and loaded onto node 304-1 in accordance with an embodiment of the present disclosure.
Figure 20:
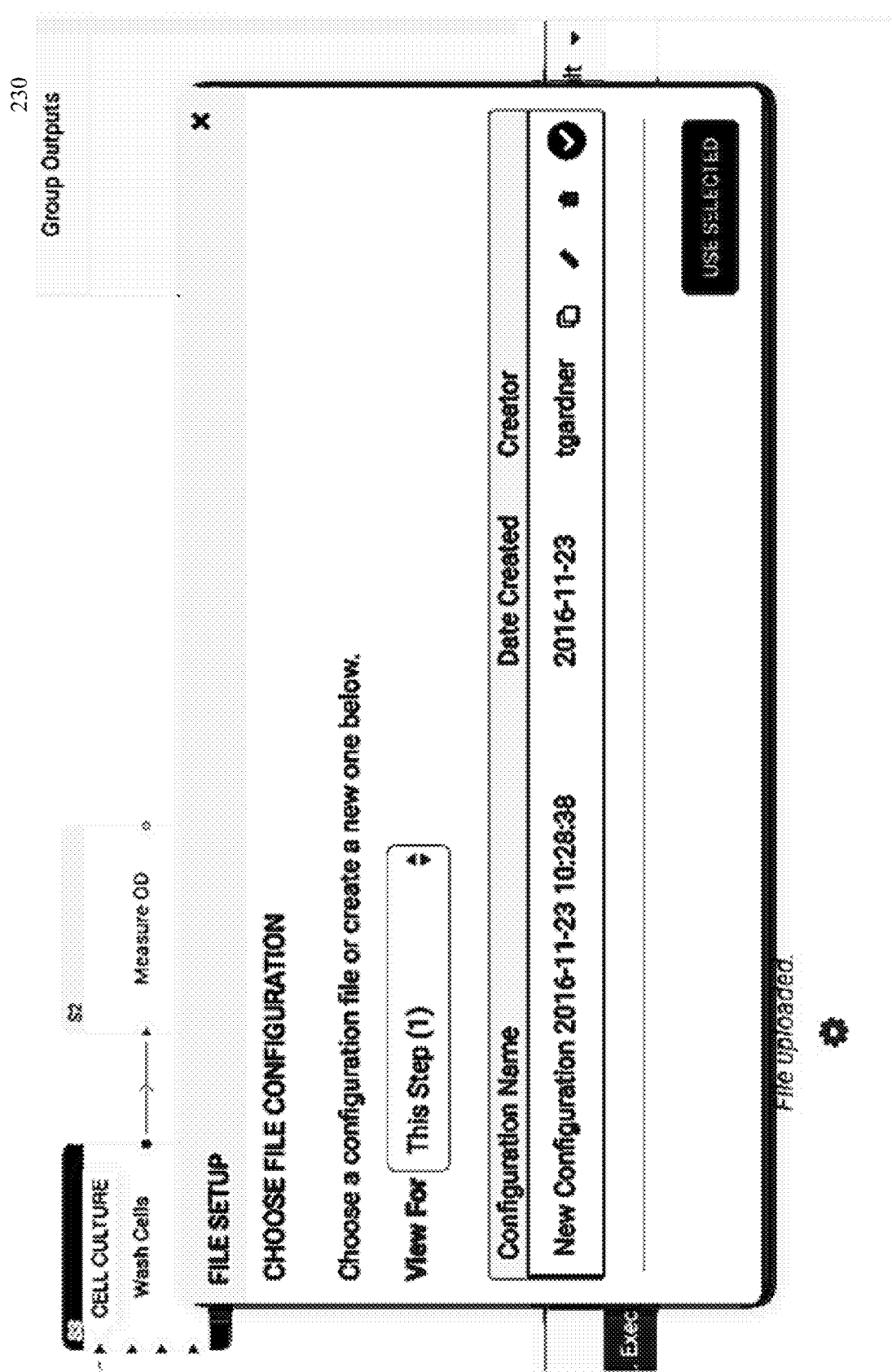
FIG. 20 illustrates how, once the data construct 230 is selected and loaded onto node 304, a configuration construct 234 is obtained or created in accordance with an embodiment of the present disclosure.
Figure 22:
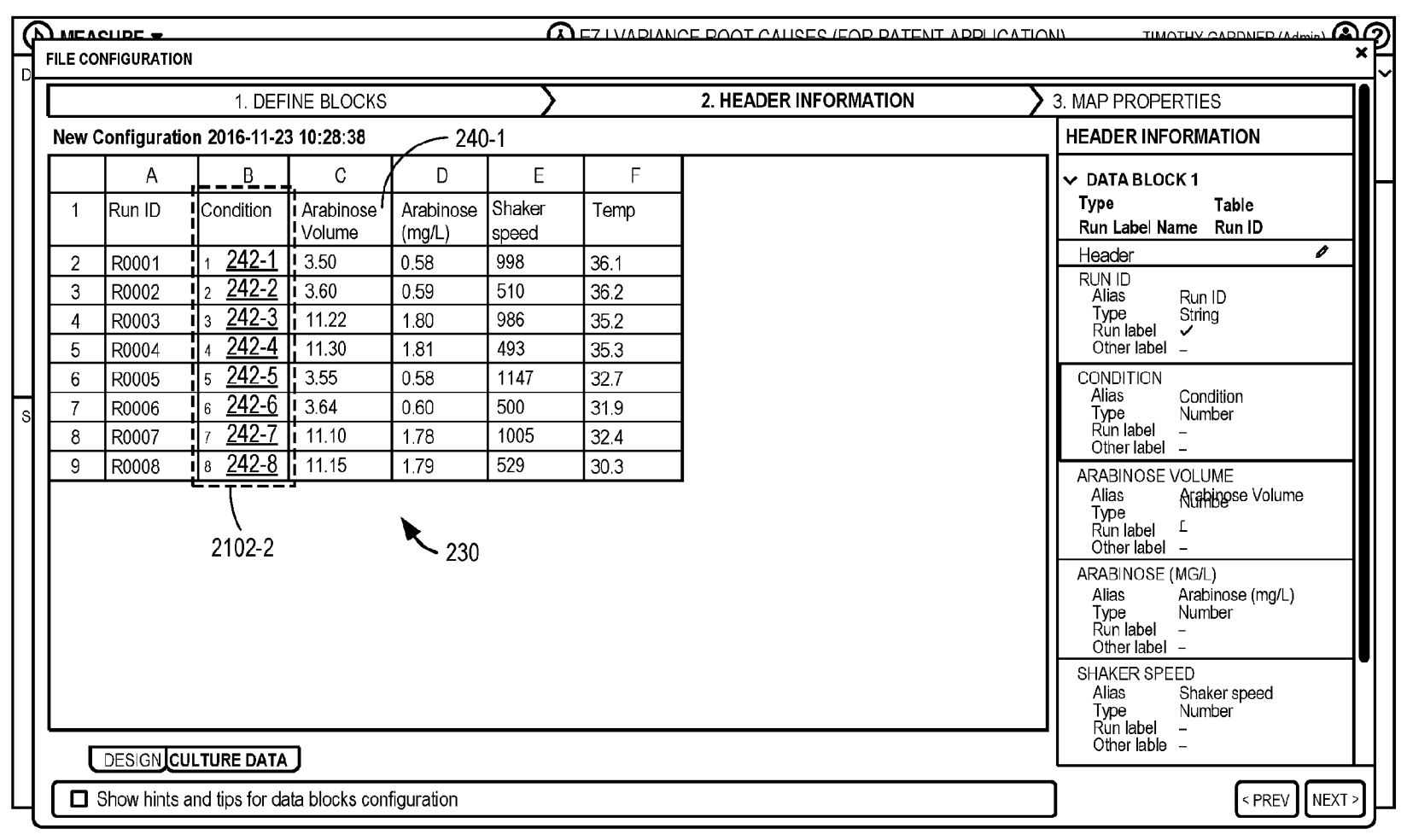
Figure 24:
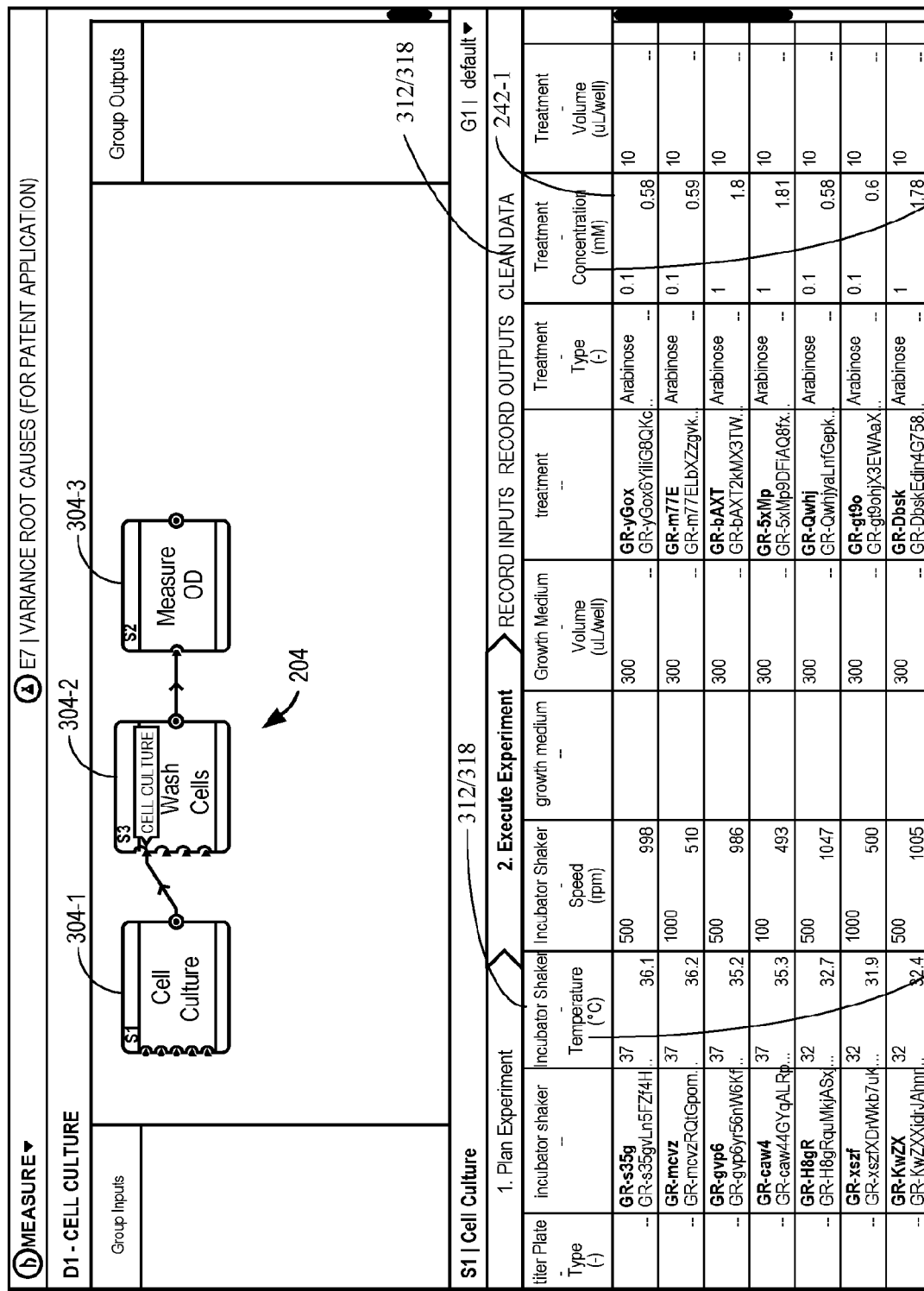
FIG. 24 illustrates how after parsing is complete header token 240 data and associated value token data 242 is saved to the properties 312/318 in accordance with an embodiment of the present disclosure.

FIGS. 18 through 24 illustrate. FIG. 18 illustrates a run hypergraph 204 that includes nodes 304-1 through 304-3. FIG. 19 illustrates how a data construct 230 in the form of a file is selected and loaded onto node 304-1. FIG. 20 illustrates how, once the data construct 230 is selected and loaded onto node 304, a configuration construct 234 is obtained or created. FIG. 21 illustrates how the selected data construct 230 of FIG. 19 includes table data in the form of a compound block composed of six data blocks 2102, each with a header token 240 and a number of value tokens 242. FIG. 22 highlights the "condition" data block 2102-2 within the compound block and shows how it is composed of a token that is a header token 240 and eight tokens that are value tokens 242. FIG. 23 illustrates how the header token 240 from each data block 2102 in the compound block of FIGS. 21-22 is presented to a user to associate with the input 312 or output 318 properties of a respective parameterized resource input 310 or parameterized resource output 316 of a node 304 of a run hypergraph 204. FIG. 24 illustrates how after parsing is complete, using the defined configuration construct 234, the header token 240 data and associated value token data 242 is saved to the properties 312/318 in accordance with an embodiment of the present disclosure. In some embodiments, the delimiter between tokens 232 in a data construct 230 is an alphanumeric character, a numeric character, a symbolic character, a computer-readable character, or a combination thereof (block 510). In some embodiments, the delimiter between tokens 232 in a data construct 230 is a combination of alphanumeric characters, a combination of numeric characters, a combination of symbolic characters, a combination of computer-readable characters, or a combination thereof (block 512).

In some embodiments, complex blocks or superblocks such as those illustrated FIGS. 34-37 and discussed in greater details below get further processed and combined by the applying step to form the single data table 236 by through one or more Cartesian joins, inner or outer joins.

Blocks 514-530 {Parsing a Data Block}.

Reference is now made to blocks 514-530 where embodiments in which a data block within a data construct 230 are parsed by application of the configuration construct 234 of the data construct 230. In such embodiments the stored configuration construct 234 specifies (or is made to specify by instruction by the user when creating the configuration construct dynamically as illustrated in FIGS. 18-24), that a first token in the first subset of tokens and one or more second tokens in the second subset of tokens form a first data block. FIG. 33 illustrates the properties of a data block in accordance with some embodiments.

FIG. 21 illustrates six data blocks 2102 adjacent to each other. The applying explicitly labels each second token in the one or more second tokens with the first token. FIG. 38 illustrates the data construct 230 of FIG. 21 in higher resolution. FIG. 39 is a JSON data object that describes the structure of the configuration construct 234 that is applied to the data construct 230 of FIG. 38.

In some embodiments, the one or more second tokens comprises two or more second tokens, and the two or more second tokens are in a contiguous region of the data construct 230 (block 516). Such an embodiment is illustrated in FIG. 21 as block 2102.

In some embodiments, the stored configuration construct 234 specifies that the first token in the first subset of tokens and the one or more second tokens in the second subset of tokens form the data block by the presence, in the data construct 230, of a delimiter between the first token in the first subset and a second token in the one or more second tokens in the second subset (block 518).

In some such embodiments, the stored configuration construct 234 specifies that the one or more second tokens in the second subset of tokens are separated from each other in the data construct 230 by one or more delimiters (block 520).

In some such embodiments, the stored configuration construct 234 specifies that the first token and the one or more second tokens form the data block by the relative or absolute position, in the data construct 230, of the first token to the one or more second tokens in the second subset (block 522).

In some such embodiments, the first token is displaced by one or more tokens or blanks spaces from the one or more second tokens in the first data block (block 524). In some embodiments, a second token, in the one or more second tokens, is a null value (block 526). In some embodiments, the first token is absent in the data construct 230 and is provided by the configuration construct 234 (block 528).

In some embodiments, as illustrated in FIG. 32, the first token is a name, an alias, a run identifier, or a sample identifier, and each second token in the one or more second tokens is in the form of a string value, a floating point number, an integer, a date, or is in an undetermined form (block 530).

Blocks 532-540 {Key/Value Pairs}.

Figure 5A:
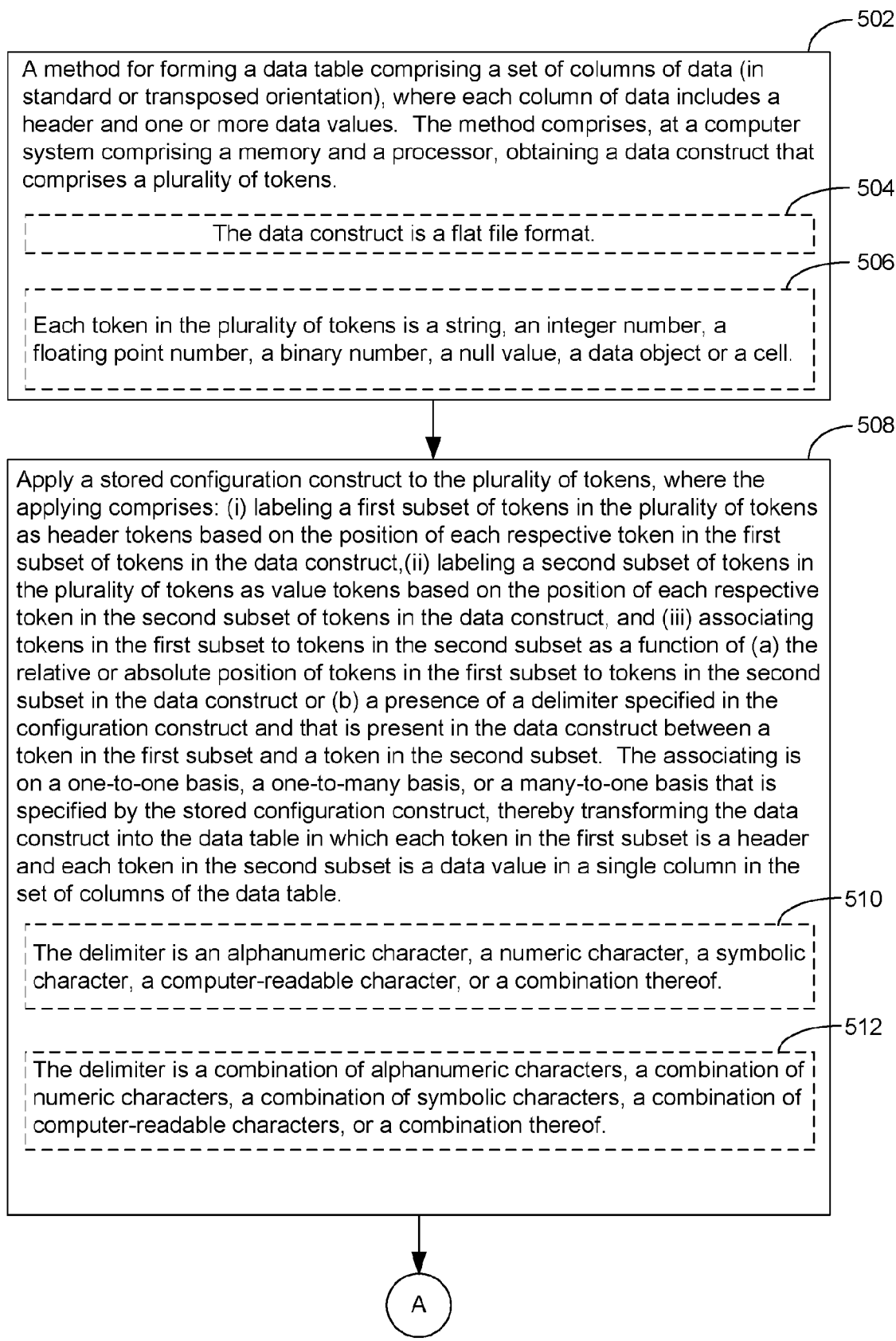
Figure 5B:
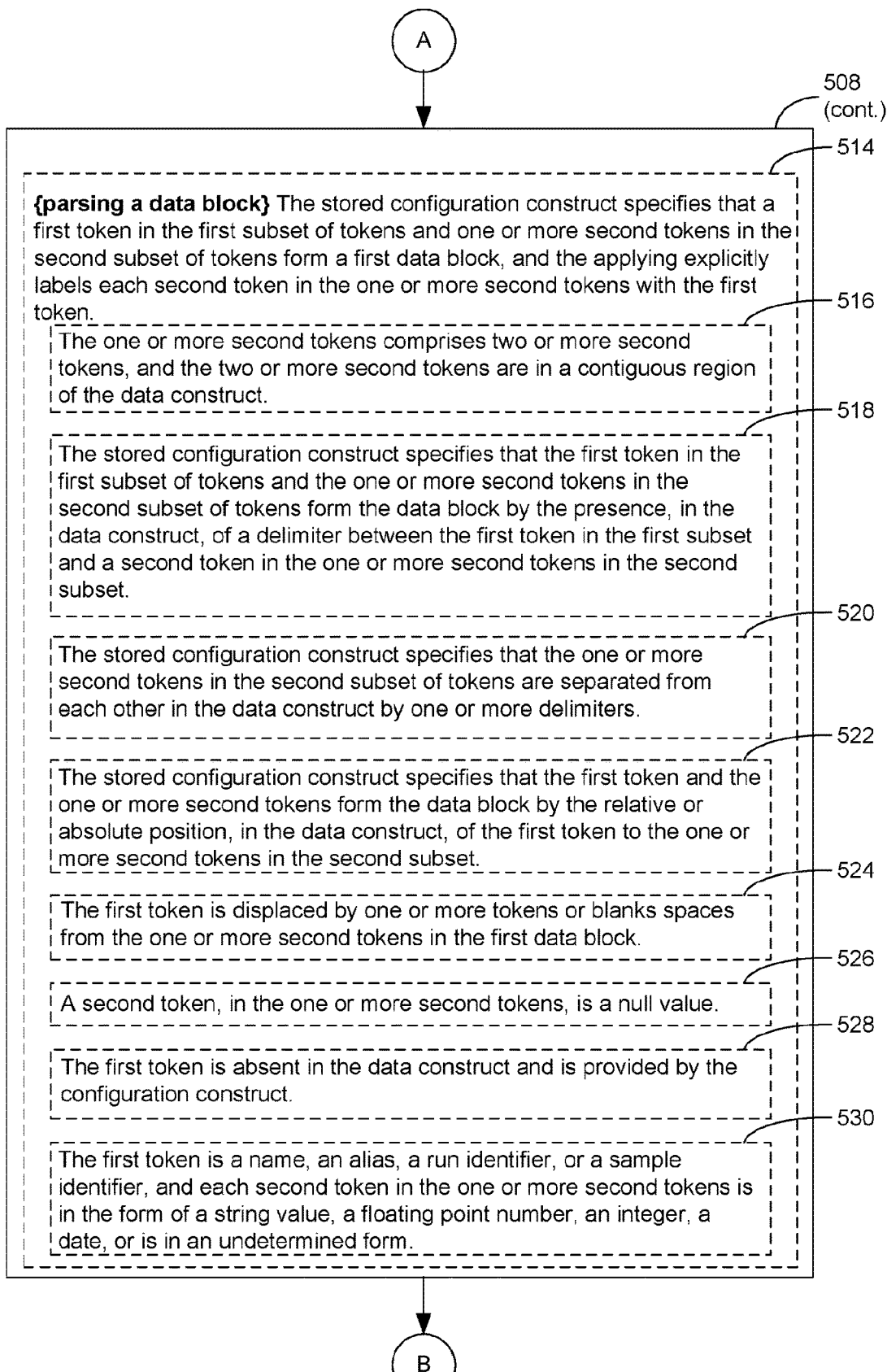
Figure 5C:
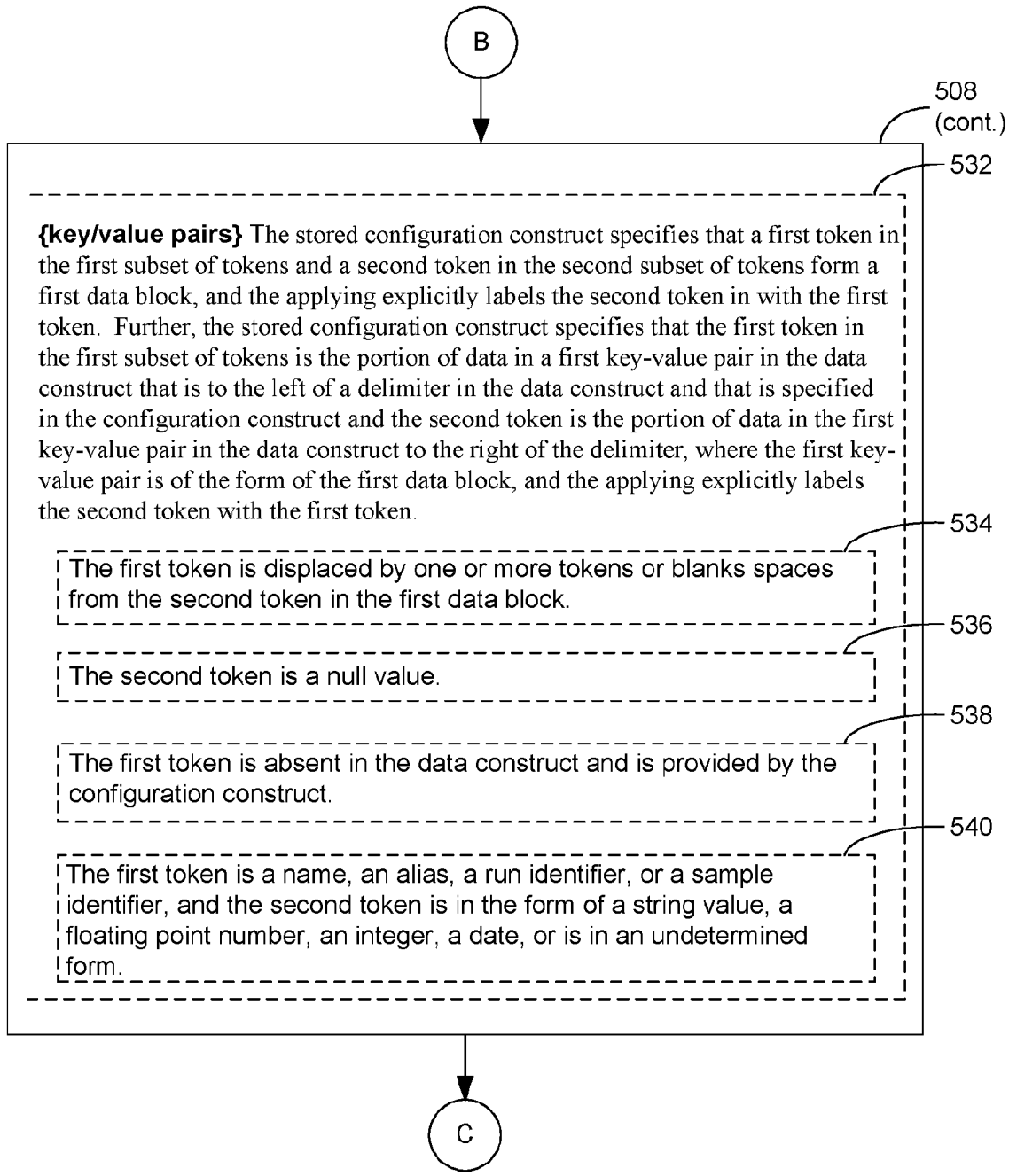
Figure 25:
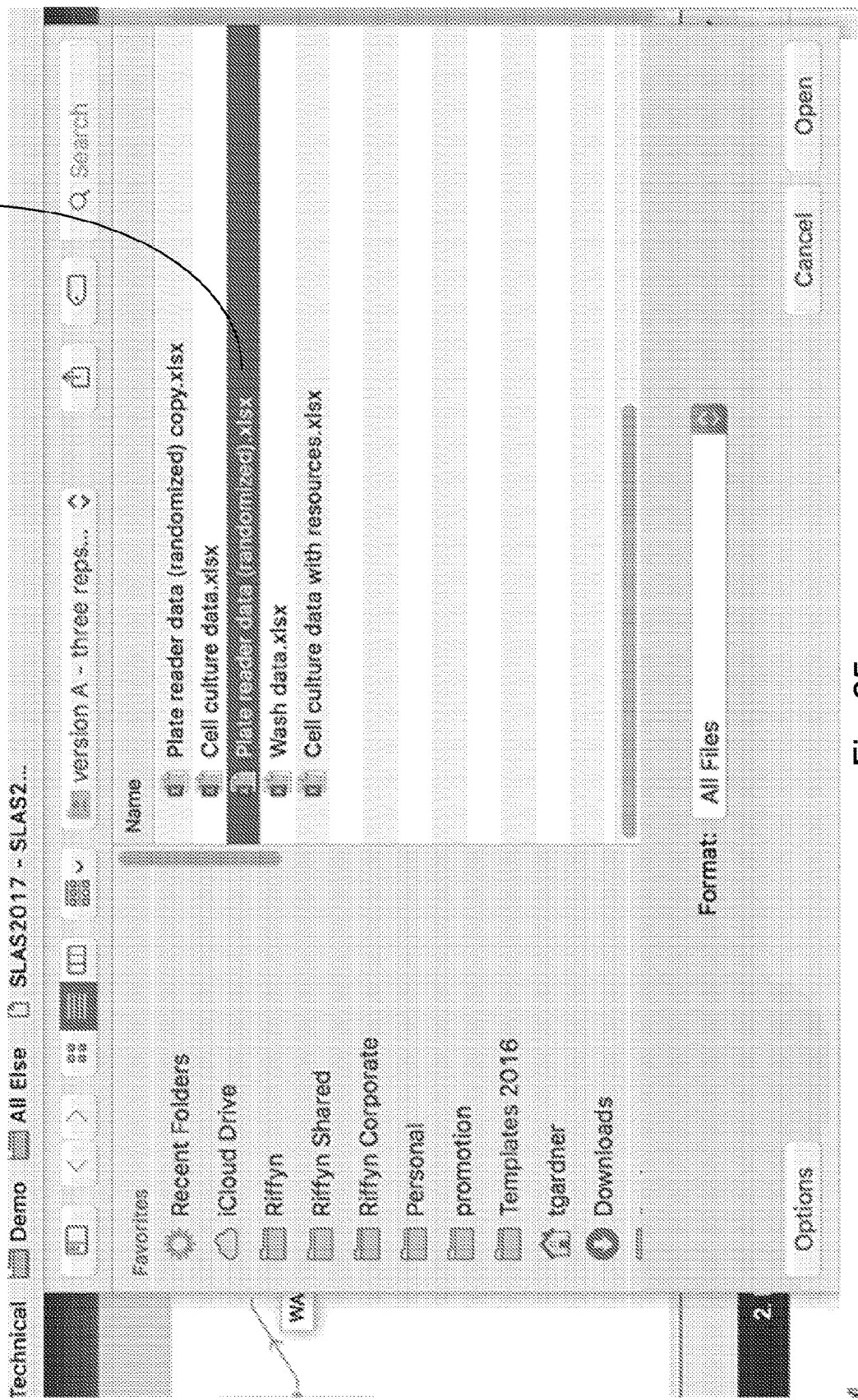
FIG. 25 illustrates how another data construct 230 that includes key:value pairs and matrix elements in a compound block is obtained in the form of a file in accordance with an embodiment of the present disclosure.
Figure 30:
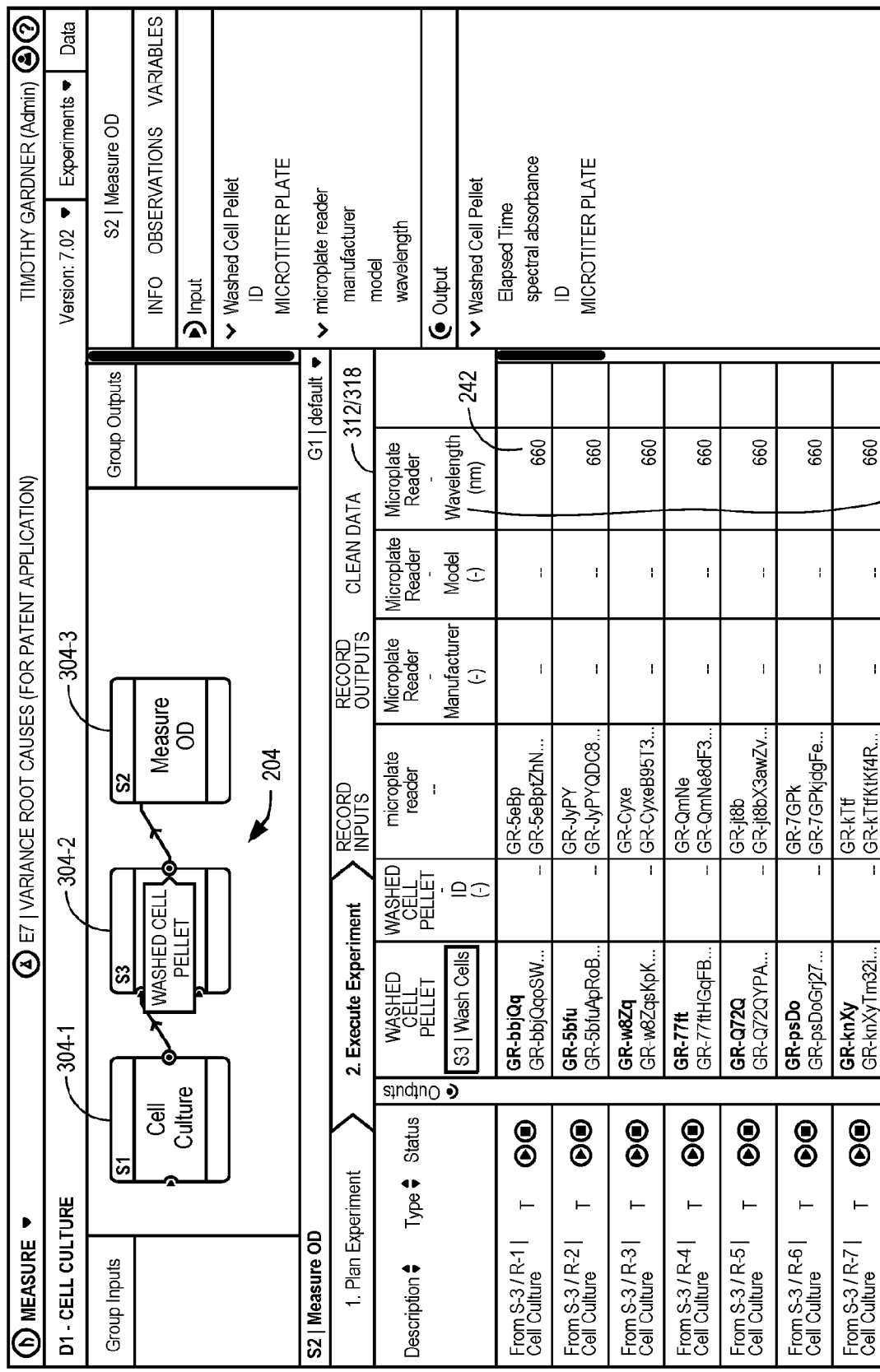
FIGS. 30 and 31 illustrates how data from both compound blocks within the super block of FIG. 29 is loaded onto the input properties 312 and output properties 318 of node 304-3 (Data from "INSTRUMENT" Compound Block) in accordance with an embodiment of the present disclosure.
Figure 31:
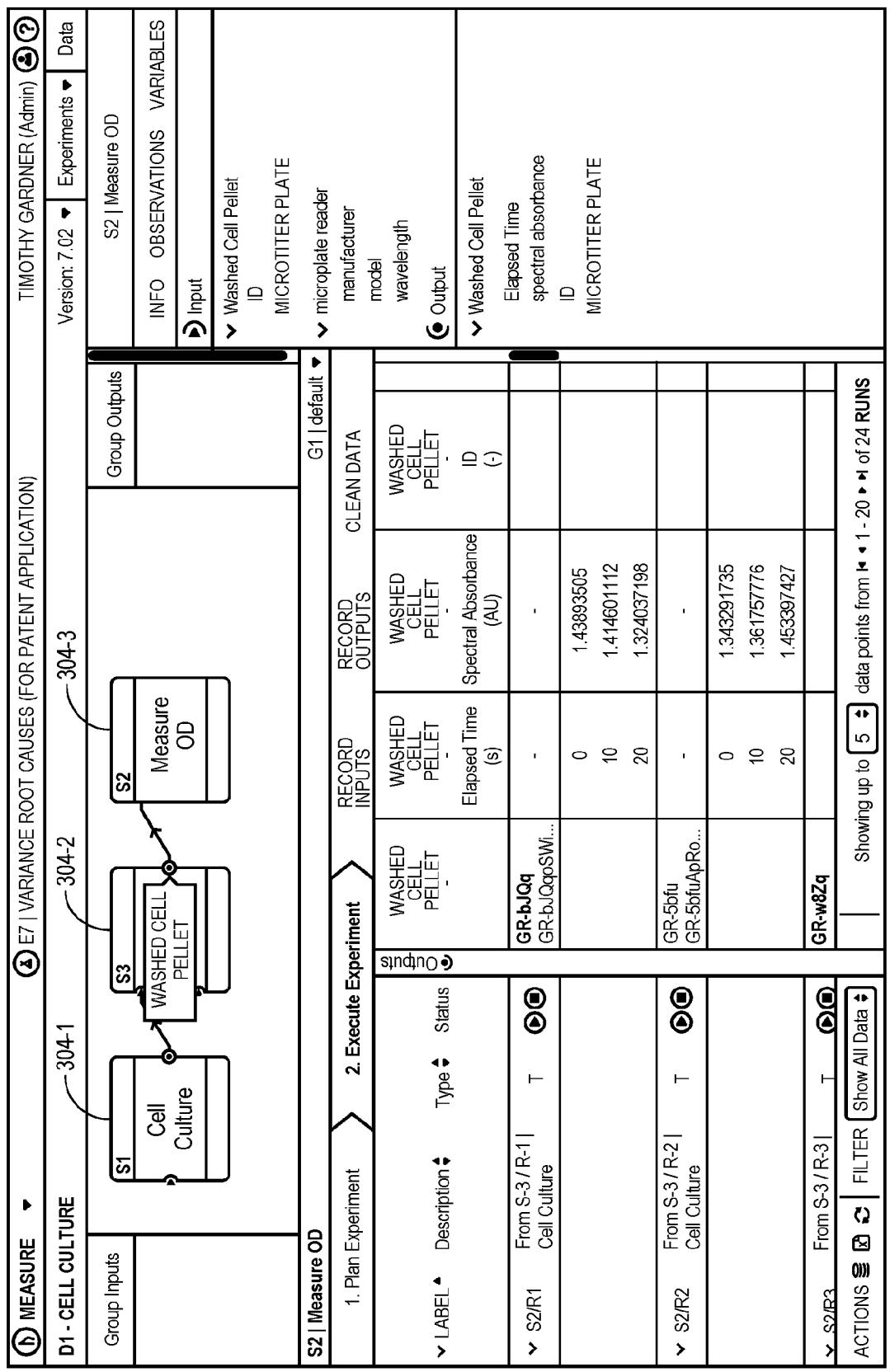

Referring to block 532 of FIG. 5C, in some embodiments, the stored configuration construct 234 specifies that a first token in the first subset of tokens and a second token in the second subset of tokens form a first data block, and the applying explicitly labels the second token with the first token. Further, the stored configuration construct 234 specifies that the first token in the first subset of tokens is the portion of data in a first key-value pair in the data construct 230 that is to the left of a delimiter in the data construct 230 and that is specified in the configuration construct 234 and the second token is the portion of data in the first key-value pair in the data construct 230 to the right of the delimiter, where the first key-value pair is of the form of the first data block. The applying explicitly labels the second token with the first token. Example properties of a such a key-value pair are illustrated in FIG. 36. Also, FIG. 25 illustrates five key:value pairs 2604.

In some embodiments, the first token is displaced by one or more tokens or blanks spaces from the second token in the first data block (block 534). In some embodiments, the second token is a null value (block 536). In some embodiments, the first token is absent in the data construct 230 and is provided by the configuration construct 234 (block 538). In some embodiments, the first token is a name, an alias, a run identifier, or a sample identifier, and the second token is in the form of a string value, a floating point number, an integer, a date, or is in an undetermined form (block 540).

Blocks 542-548 {Compound Block—Table}.

Figure 5D:
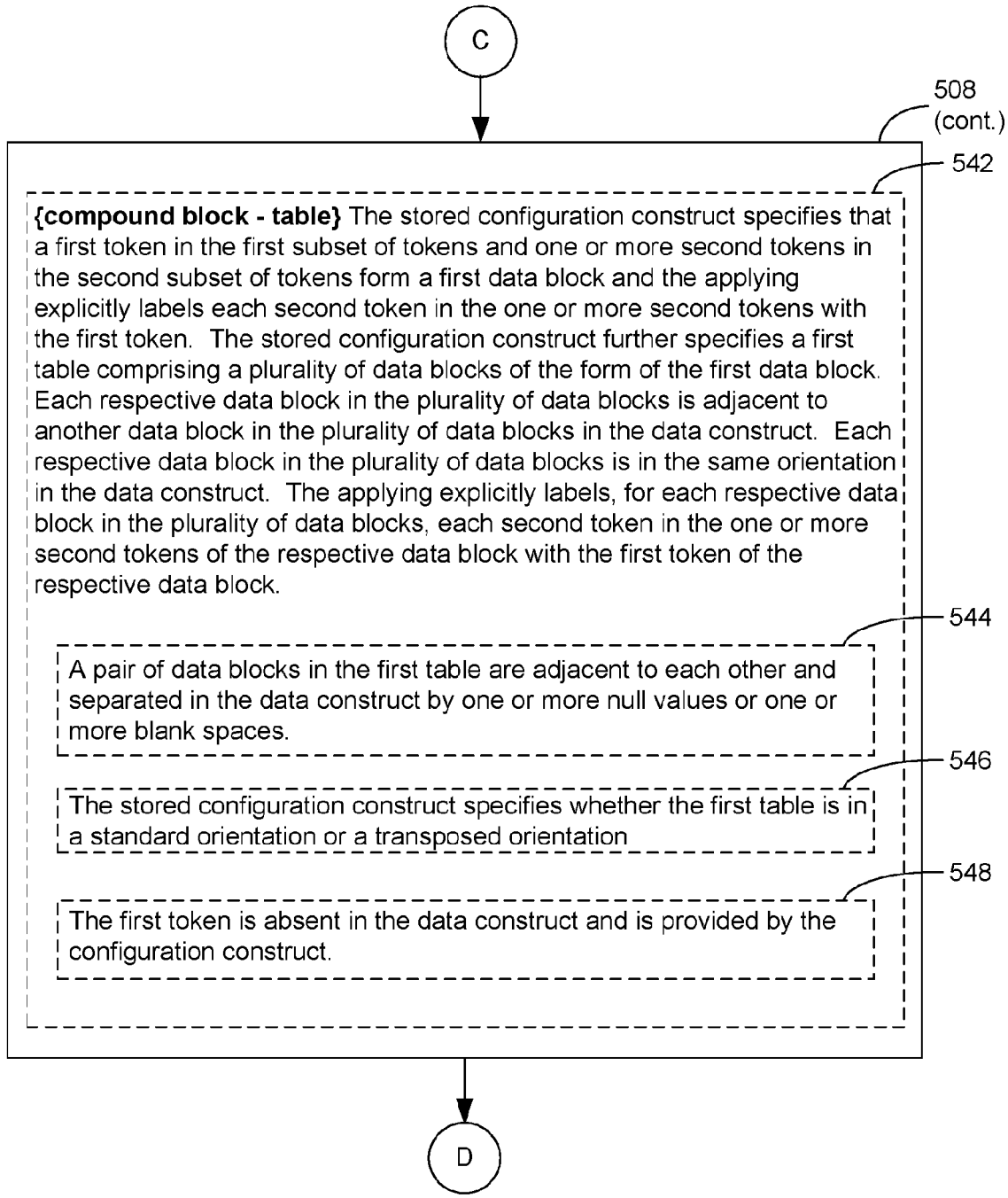
Figure 5E:
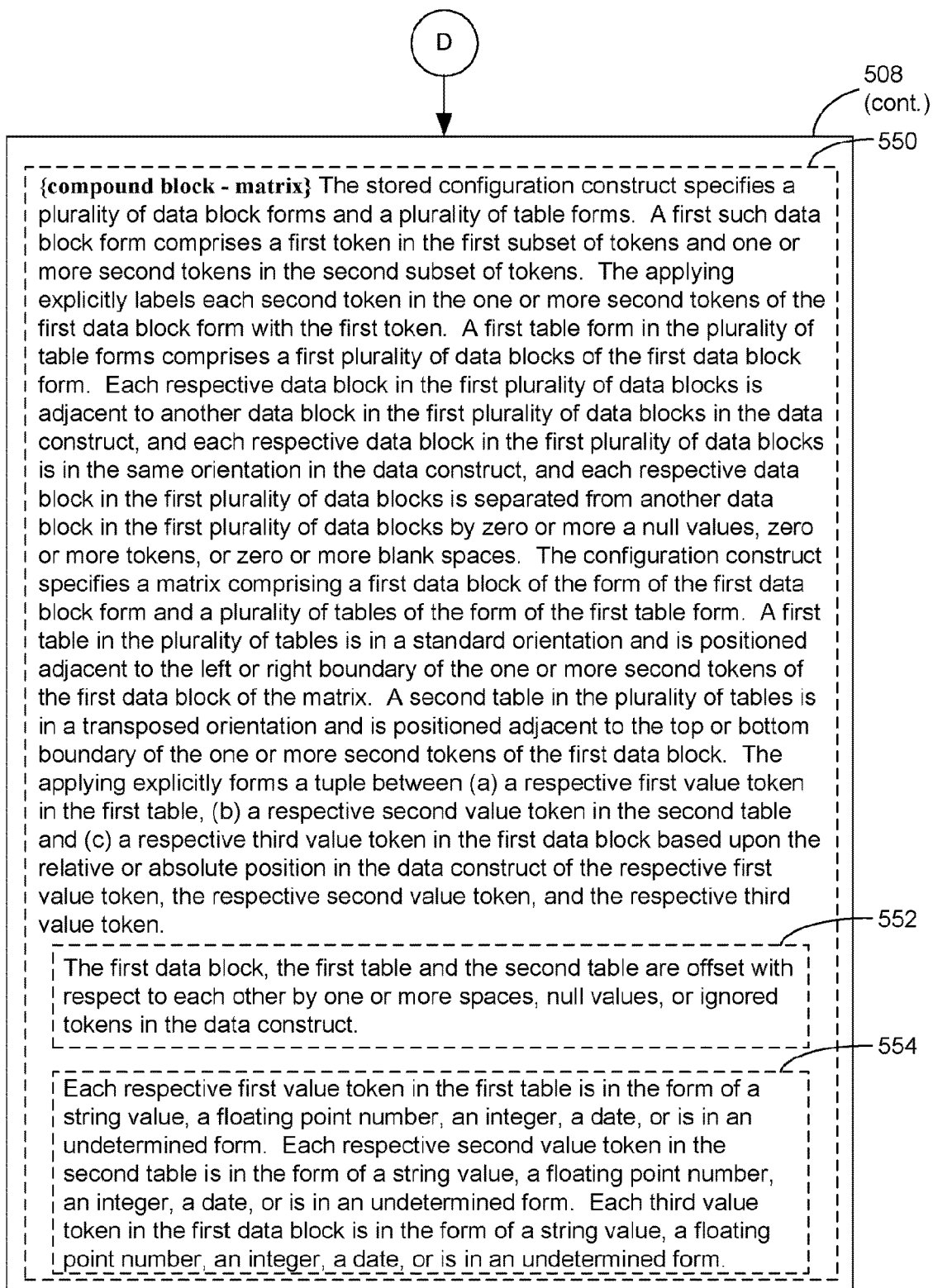

Referring to block 542 of FIG. 5D, in some embodiments, the stored configuration construct 234 specifies that a first token in the first subset of tokens and one or more second tokens in the second subset of tokens form a first data block and the applying explicitly labels each second token in the one or more second tokens with the first token. The stored configuration construct 234 further specifies a first table comprising a plurality of data blocks of the form of the first data block. Each respective data block in the plurality of data blocks is adjacent to another data block in the plurality of data blocks in the data construct 230. Each respective data block in the plurality of data blocks is in the same orientation in the data construct 230. FIG. 21 illustrates compound block table composed of six data blocks 2102. Continuing to refer to block 542, the applying explicitly labels, for each respective data block (e.g., in FIG. 21, block 2102) in the plurality of data blocks, each second token (e.g. value tokens 242) in the one or more second tokens of the respective data block with the first token (e.g., header token 240) of the respective data block. FIG. 34 illustrates example properties of a compound block—table in accordance with an embodiment of the present disclosure.

In some embodiments, a pair of data blocks in the first table are adjacent to each other and separated in the data construct 230 by one or more null values or one or more blank spaces (block 544). In some embodiments, the stored configuration construct 234 specifies whether the first table is in a standard orientation or a transposed orientation (block 546). In some embodiments, the first token is absent in the data construct 230 and is provided by the configuration construct 234 (block 548).

Blocks 550-562 {Compound Block—Matrix}.

Figure 28:
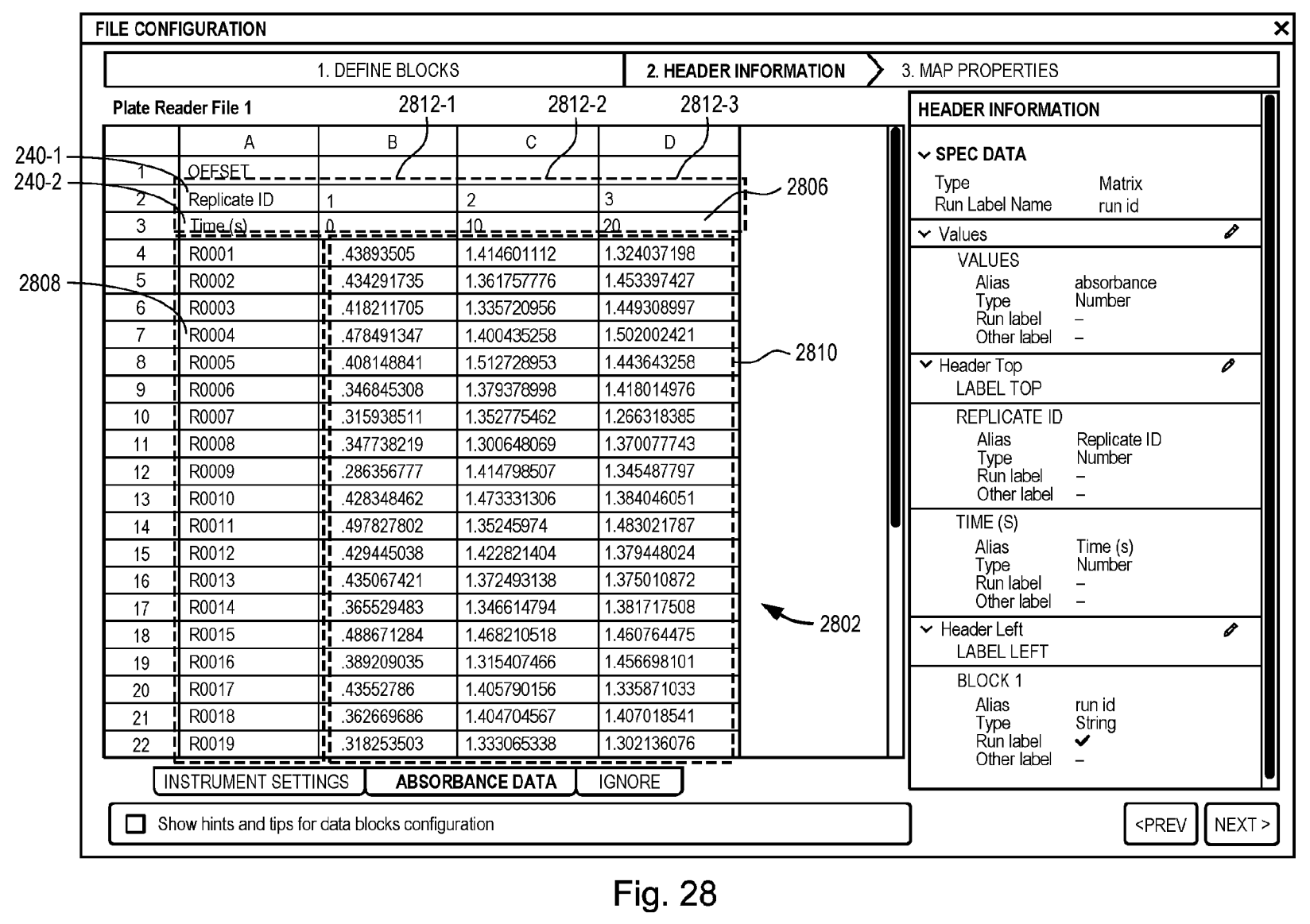
Figure 35:
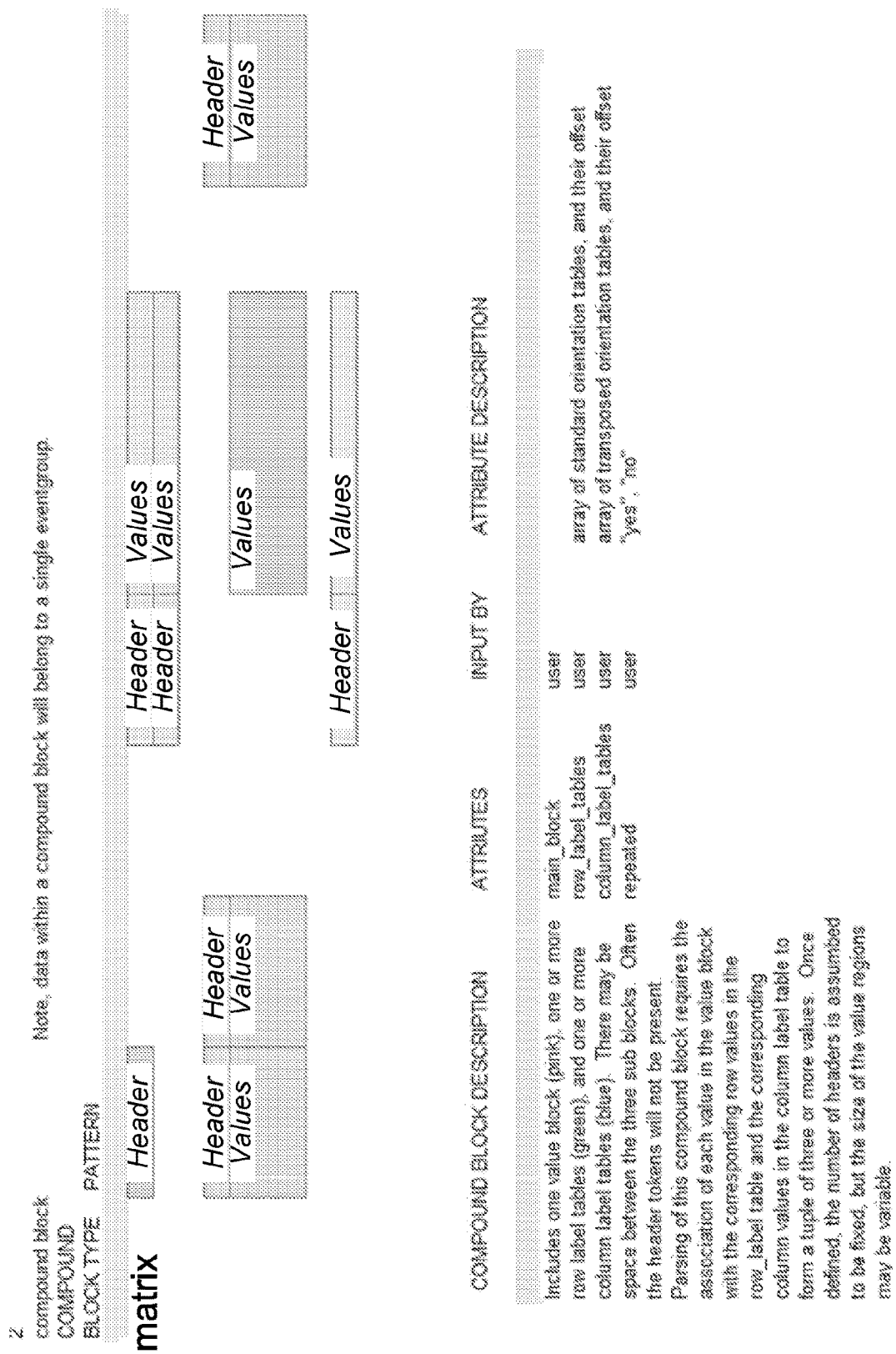
FIG. 35 illustrates example properties of a compound block—matrix in accordance with an embodiment of the present disclosure.

FIG. 28 illustrates a compound block of the matrix type 2802 that has the name "SPEC DATA" 2804. FIG. 35 illustrates example properties of a compound block—matrix in accordance with an embodiment of the present disclosure. Referring to block 550 of FIG. 5E, in some embodiments, the stored configuration construct 234 specifies a plurality of data block forms and a plurality of table forms.

A first such data block form comprises a first token in the first subset of tokens and one or more second tokens in the second subset of tokens. In such embodiments, the applying explicitly labels each second token in the one or more second tokens of the first data block form with the first token.

A first table form in the plurality of table forms comprises a first plurality of data blocks of the first data block form. Each respective data block in the first plurality of data blocks is adjacent to another data block in the first plurality of data blocks in the data construct 230, and each respective data block in the first plurality of data blocks is in the same orientation in the data construct 230, and each respective data block in the first plurality of data blocks is separated from another data block in the first plurality of data blocks by zero or more a null values, zero or more tokens, or zero or more blank spaces.

The configuration construct 234 specifies a matrix (e.g., matrix 2802 of FIG. 28) comprising a first data block of the form of the first data block form and a plurality of tables of the form of the first table form. An example of the data block of the form of the first data block form is block 2810 of FIG. 28.

A first table in the plurality of tables is in a standard orientation and is positioned adjacent to the left or right boundary of the one or more second tokens of the first data block of the matrix. An example such a table is Table 2808 of FIG. 28.

A second table in the plurality of tables is in a transposed orientation and is positioned adjacent to the top or bottom boundary of the one or more second tokens of the first data block. An example such a table is Table 2806 of FIG. 28.

The applying explicitly forms a tuple between (a) a respective first value token in the first table (e.g., Table 2808 of FIG. 28), (b) a respective second value token in the second table (e.g., Table 2806 of FIG. 28) and (c) a respective third value token in the first data block (e.g., element 2810 of FIG. 28) based upon the relative or absolute position in the data construct 230 of the respective first value token, the respective second value token, and the respective third value token (e.g., as specified by the configuration construct 234 being applied).

In some embodiments, the first data block, the first table and the second table are offset with respect to each other by one or more spaces, null values, or ignored tokens in the data construct 230 (block 552).

In some embodiments, each respective first value token in the first table is in the form of a string value, a floating point number, an integer, a date, or is in an undetermined form. Each respective second value token in the second table is in the form of a string value, a floating point number, an integer, a date, or is in an undetermined form. Each third value token in the first data block is in the form of a string value, a floating point number, an integer, a date, or is in an undetermined form (block 554).

In some embodiments, the one or more second tokens of the first data block form comprises two or more second tokens that are in a contiguous region of the data construct 230 (block 556).

In some embodiments, the stored configuration construct 234 specifies that the first token in the first subset of tokens and the one or more second tokens of the first data block form define the data block by the presence, in the data construct 230, of a delimiter between the first token in the first subset and a second token in the one or more second tokens in the second subset (block 558).

In some embodiments, the stored configuration construct 234 specifies that the one or more second tokens in the first data block form are separated from each other in the data construct 230 by one or more delimiters (block 560).

In some embodiments, the stored configuration construct 234 specifies that the first token in the first data block form and the one or more second tokens in the first data block form define the first data block form by the relative or absolute position, in the data construct 230, of the first token to the one or more second tokens in the second subset (block 562).

Block 564 {Compound Block-Key:Value}.

Figure 26:
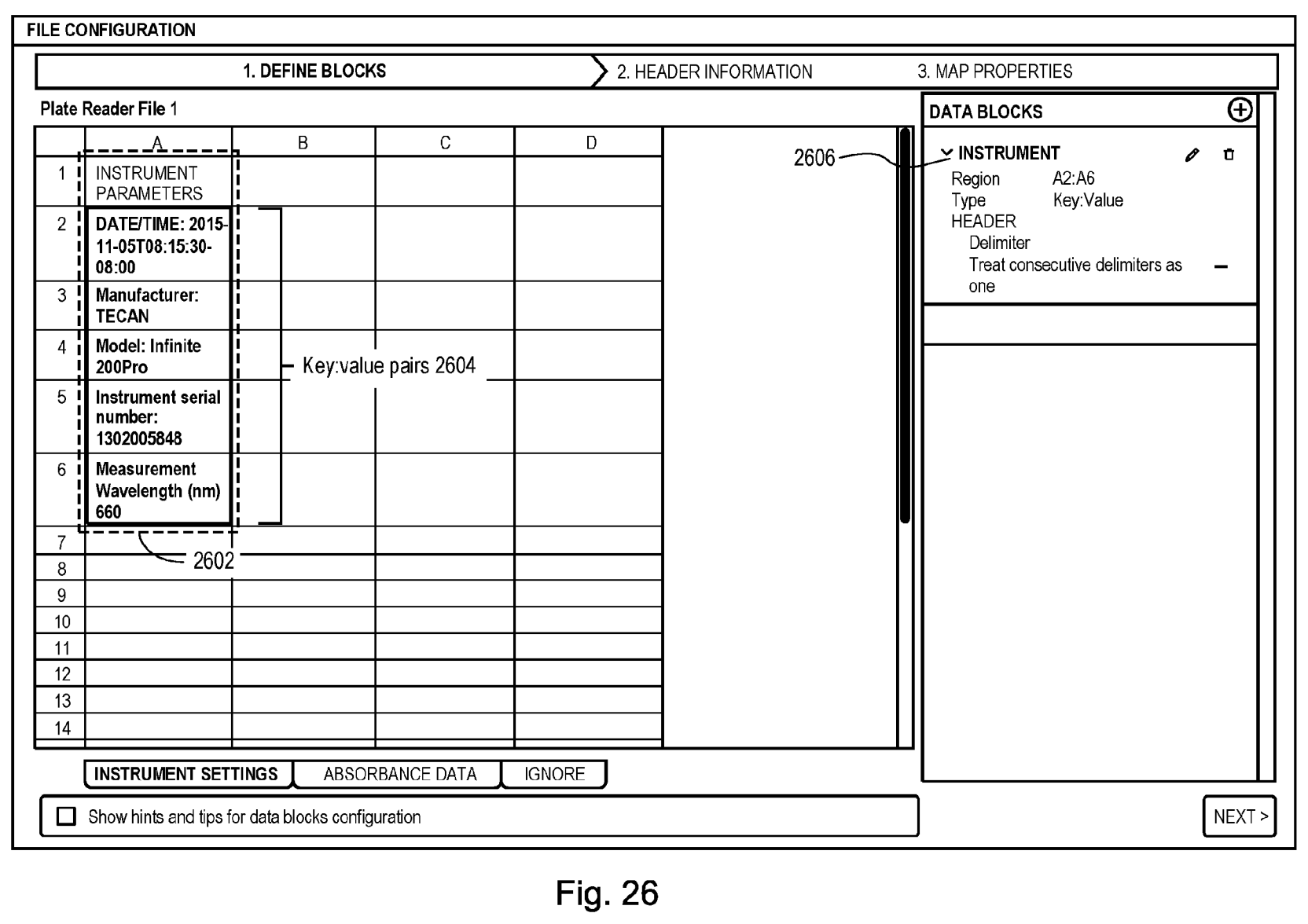

FIG. 26 illustrates a compound block of the key:value pair type 2602 that has the name "INSTRUMENT" 2606. FIG. 36 illustrates example properties of a compound block—key:value in accordance with an embodiment of the present disclosure.

Referring to block 564 of FIG. 5F, in some embodiments, the stored configuration construct 234 specifies that a first token in the first subset of tokens and a second token in the second subset of tokens form a first data block. The applying explicitly labels the second token with the first token. The stored configuration construct 234 specifies that the first token in the first subset of tokens is the portion of data in a first key-value pair in the data construct 230 that is to the left of a delimiter in the data construct 230 and that is specified in the configuration construct 234 and the second token is the portion of data in the first key-value pair in the data construct 230 to the right of the delimiter, where the first key-value pair is of the form of the first data block. The stored configuration construct 234 further specifies a first key-value block comprising a plurality of key-value pairs of the form of the first key-value pair and the applying explicitly labels, for each respective key-value pair in the plurality of key-value pairs, the second token of the respective key-value pair with the first token of the respective key-value pair.

Block 566 {Superblock}.

Figure 37:
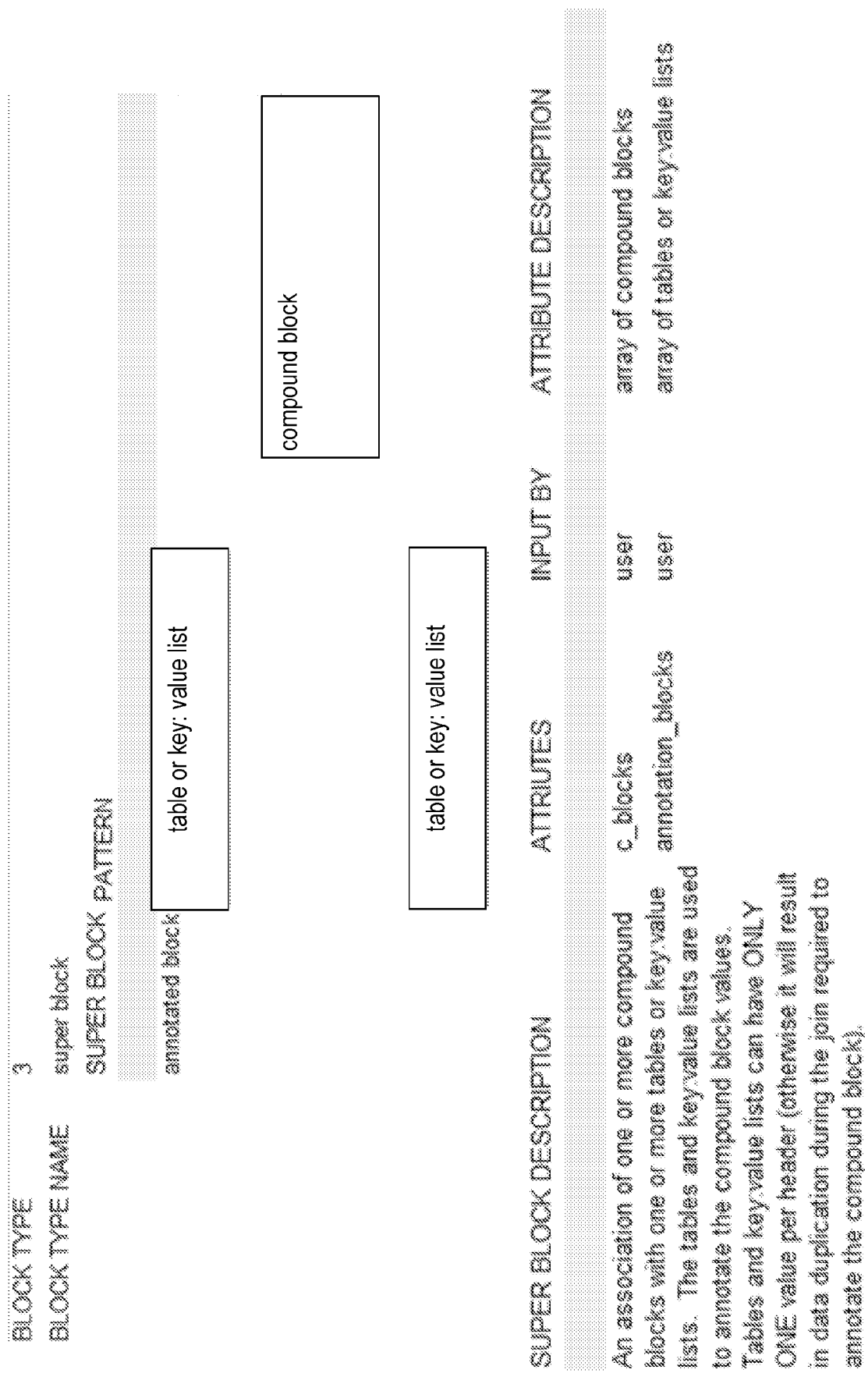
FIG. 37 illustrates example properties of a superblock in accordance with an embodiment of the present disclosure.

FIG. 37 illustrates example properties of a superblock in accordance with an embodiment of the present disclosure. Referring to block 566 of FIG. 5H, in some embodiments, the configuration construct 234 specifies a first token in the first subset of tokens and one or more second tokens in the second subset of tokens form a first data block. The applying labels each such second token with the first token. The configuration construct 234 further specifies a first superblock comprising one or more compound blocks each of the form of a table, a matrix or a key:value block. The applying explicitly labels each compound block with an identifier unique to superblock. That is, the superblock can have zero or more tables, zero or matrices, and zero or more key:value blocks.

Each compound block that is a table comprises a first table form comprising a first plurality of data blocks of the form of the first data block. Each data block in the first plurality of data blocks of the table (i) is adjacent to another data block in the first plurality of data blocks in the data construct 230 (ii) is in the same orientation in the data construct 230, and (iii) separated from another data block by zero or more a null values, zero or more tokens, or zero or more blank spaces. In such instances, the applying explicitly labels, for each data block in the first plurality of data blocks, each second token in the one or more second tokens with the first token of the respective data block.

Each respective compound block that is a matrix comprises a second data block of the form of the first data block and a plurality of tables of the form of the first table form. A first table in the plurality of tables is in a standard orientation and is positioned adjacent to the left or right boundary of the one or more second tokens of the second data block of the matrix, and a second table in the plurality of tables is in a transposed orientation and is positioned adjacent to the top or bottom boundary of the one or more second tokens of the second data block. In such instances, the applying explicitly forms a tuple between (i) a respective first value token in the first table, (ii) a respective second value token in the second table and (iii) a respective third value token in the second data block based upon the relative or absolute position in the data construct 230 of the respective first value token, the respective second value token, and the respective third value token.

Each compound block that is a key-value block comprises a plurality of key-value pairs of the form of a first key-value pair in the stored configuration construct 234, in which the one or more second tokens is a single second token, where the first key-value pair specifies that a first token in the first subset of tokens is the portion of data in the first key-value pair in the data construct 230 that is to the left of a delimiter in the data construct 230 and that is specified in the configuration construct 234 and the second token is the portion of data in the first key-value pair in the data construct 230 to the right of the delimiter. In such instances, the applying explicitly labels, for each respective key-value pair in the plurality of key-value pairs, each second token in the second token of the respective key-value pair with the first token of the respective key-value pair.

Block 568.

In some embodiments, the configuration construct 234 is built at a time prior to the applying. The building comprises (i) displaying all or a portion of the data construct 230; (ii) receiving a first user selection of the first subset of tokens from the displayed data construct 230, (iii) receiving a second user selection of the second subset of tokens from the displayed data construct 230, (iv) computing the relative or absolute position between a first token in the first subset of tokens to a second token in the second subset of tokens in the data construct 230, and (v) including the relative or absolute position between the first token and the second token in the configuration construct 234. The configuration construct 234 is then stored (Block 568). This is illustrated, for example, in FIGS. 18-30.

Block 570.

Figure 5H:
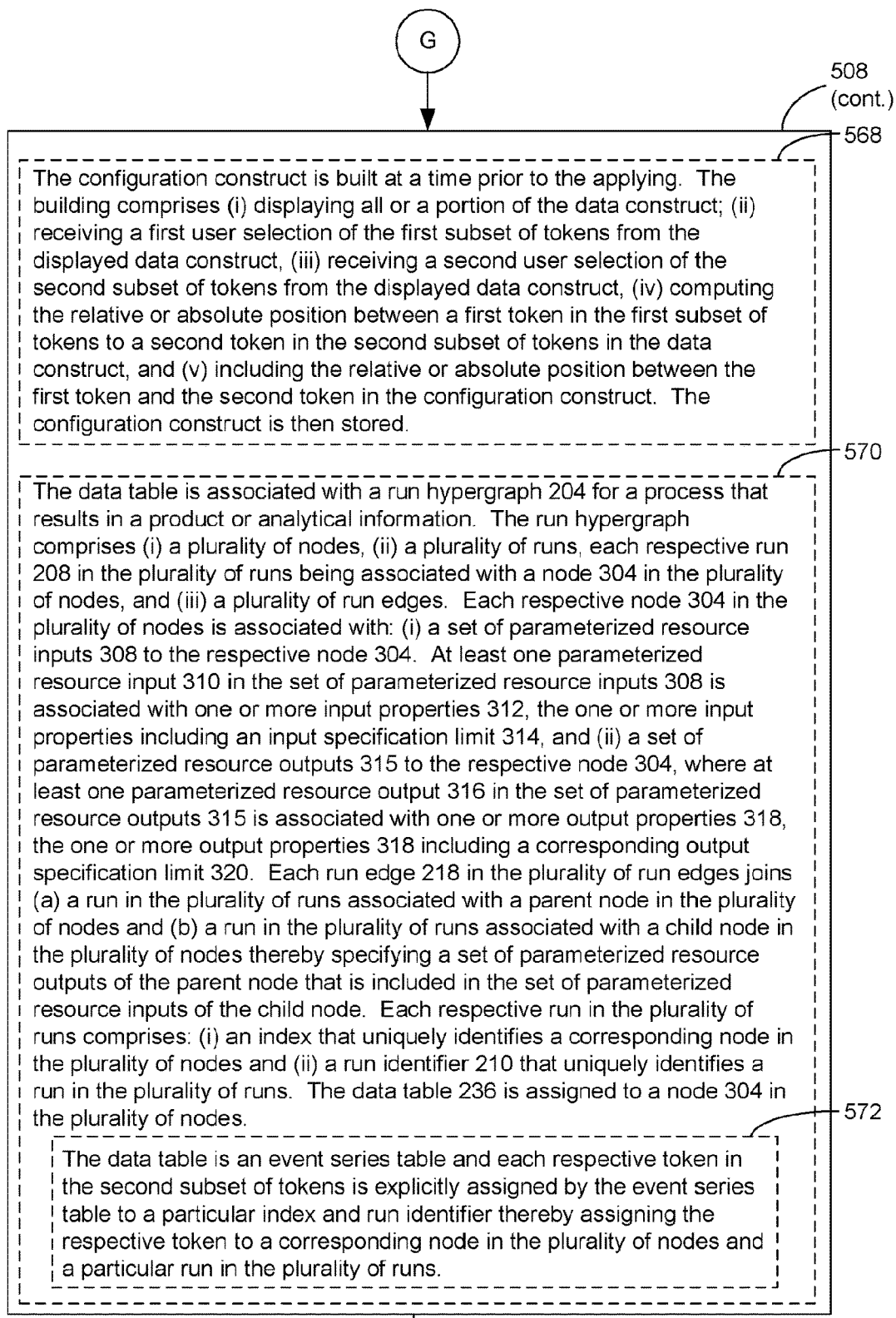

Referring to block 570 of FIG. 5H, in some embodiments the data table 236 is associated with a run hypergraph 204 for a process that results in a product or analytical information. As illustrated in FIG. 2, the run hypergraph 204 comprises (i) a plurality of nodes, (ii) a plurality of runs, each respective run 208 in the plurality of runs being associated with a node 304 in the plurality of nodes, and (iii) a plurality of run edges. Each respective node 304 in the plurality of nodes is associated with: (i) a set of parameterized resource inputs 308 to the respective node 304. At least one parameterized resource input 310 in the set of parameterized resource inputs 308 is associated with one or more input properties 312, the one or more input properties including an input specification limit 314, and (ii) a set of parameterized resource outputs 315 to the respective node 304, where at least one parameterized resource output 316 in the set of parameterized resource outputs 315 is associated with one or more output properties 318, the one or more output properties including a corresponding output specification limit 320. Each run edge 218 in the plurality of run edges joins (a) a run 208 in the plurality of runs associated with a parent node in the plurality of nodes and (b) a run 208 in the plurality of runs associated with a child node in the plurality of nodes thereby specifying a set of parameterized resource outputs of the parent node that is included in the set of parameterized resource inputs of the child node. Each respective run 208 in the plurality of runs comprises: (i) an index 306 that uniquely identifies a corresponding node in the plurality of nodes and (ii) a run identifier 210 that uniquely identifies a run 208 in the plurality of runs. In some such embodiments, the data table 236 is uniquely assigned to a single node 304 in the plurality of nodes of a run hypergraph 204. In some such embodiments, the data table 236 is uniquely assigned to a run 208 in the plurality of runs of a run hypergraph 204.

In some embodiments, an optimal run hypergraph 204 is determined using a process hypergraph 302 using the techniques disclosed in International Patent Application No. PCT/US2016/039227, filed Jun. 24, 2016, entitled "Systems and Methods for Formulation of Experiments for Analysis of Process Performance," which is hereby incorporated by reference. The process hypergraph 302 comprise a plurality of nodes 304 connected by process edges 322 in a plurality of process edges. Each respective node 304 in the plurality of nodes comprises a process stage label representing a respective stage in the corresponding process.

Figure 6:
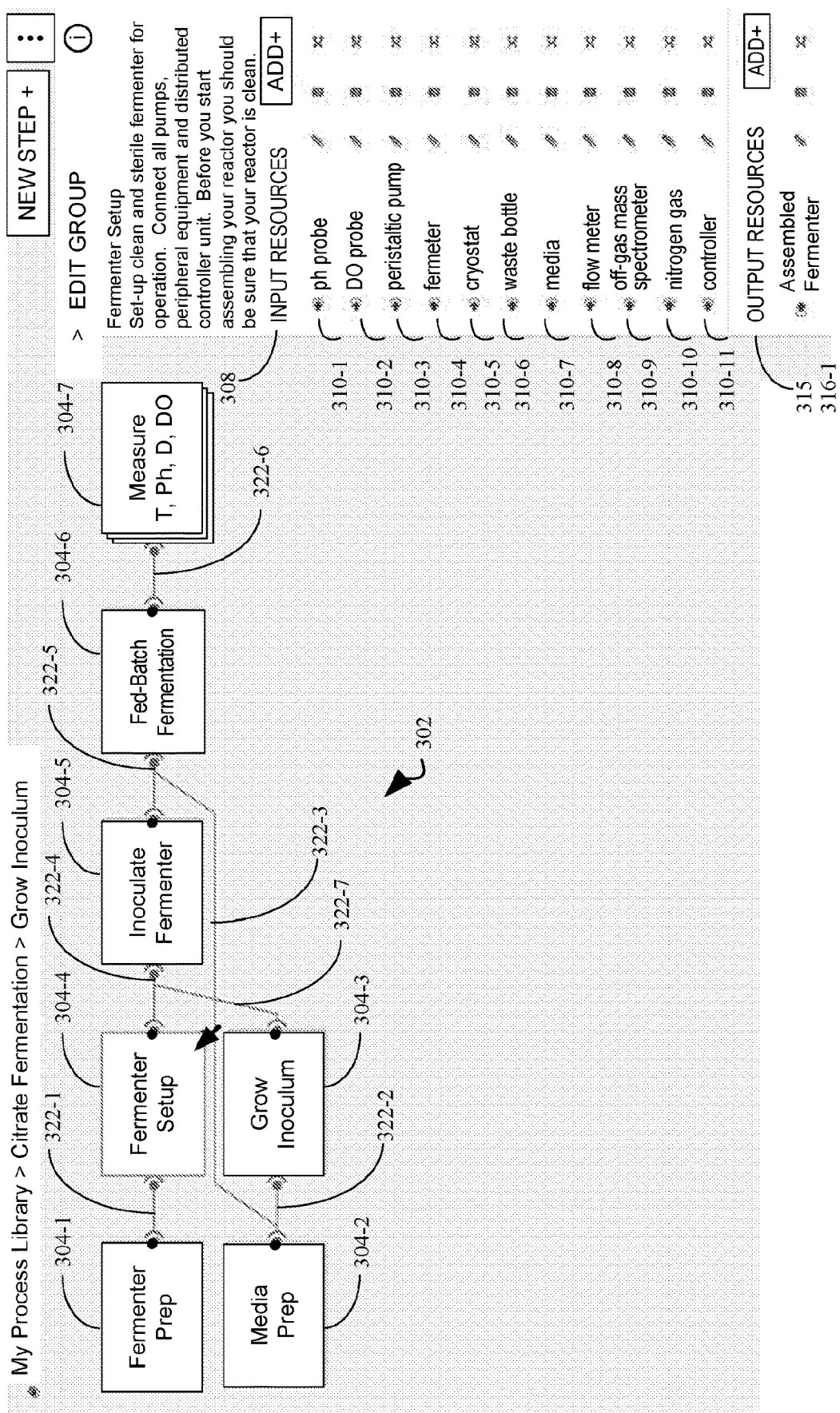
FIG. 6 illustrates a process hypergraph comprising a plurality of nodes connected by process edges in which a fermenter setup stage is highlighted in accordance with an embodiment of the present disclosure.

FIG. 6 illustrates a process hypergraph 302 that includes a plurality of nodes 304 corresponding to respective stages of a process (e.g., "Fermenter Prep," "Fermenter Setup," "Media Prep," "Grow Inoculum," "Inoculate Fermenter," "Fed-Batch Fermentation," and "Measure T, Ph, D, DO"). In some embodiments, concurrency is supported. That is, multiple users, each operating at a different client computer in communication with computer system 200, can view an instance of the process version displayed in FIG. 6, make changes to it, and view and analyze data from process runs that make use of it.

Figure 7:
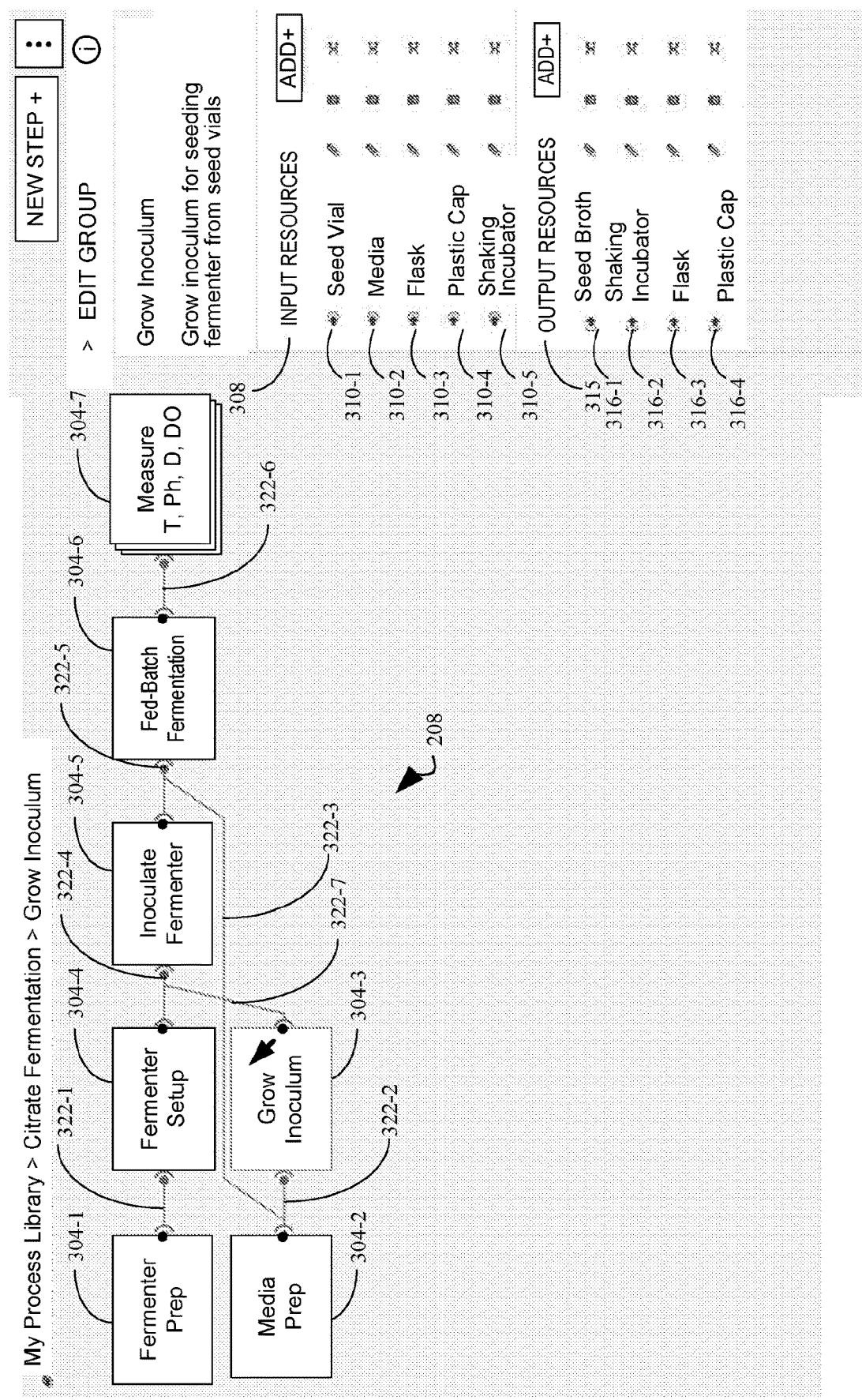
FIG. 7 illustrates the process hypergraph of FIG. 6 in which a grow inoculum stage (node) is highlighted in accordance with an embodiment of the present disclosure.
Figure 8:
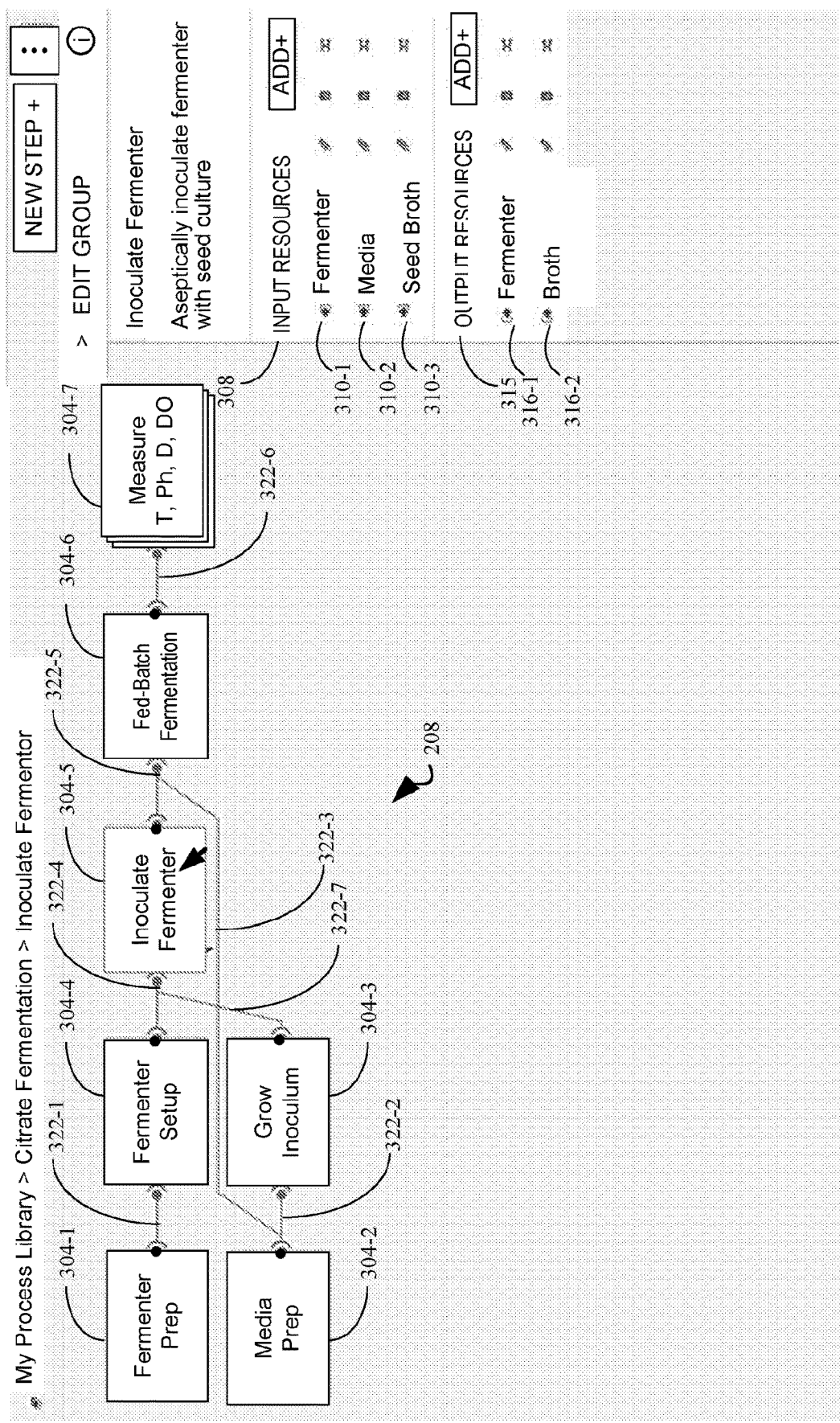
FIG. 8 illustrates the process hypergraph of FIG. 6 in which an inoculate fermenter stage is highlighted in accordance with an embodiment of the present disclosure.
Figure 9:
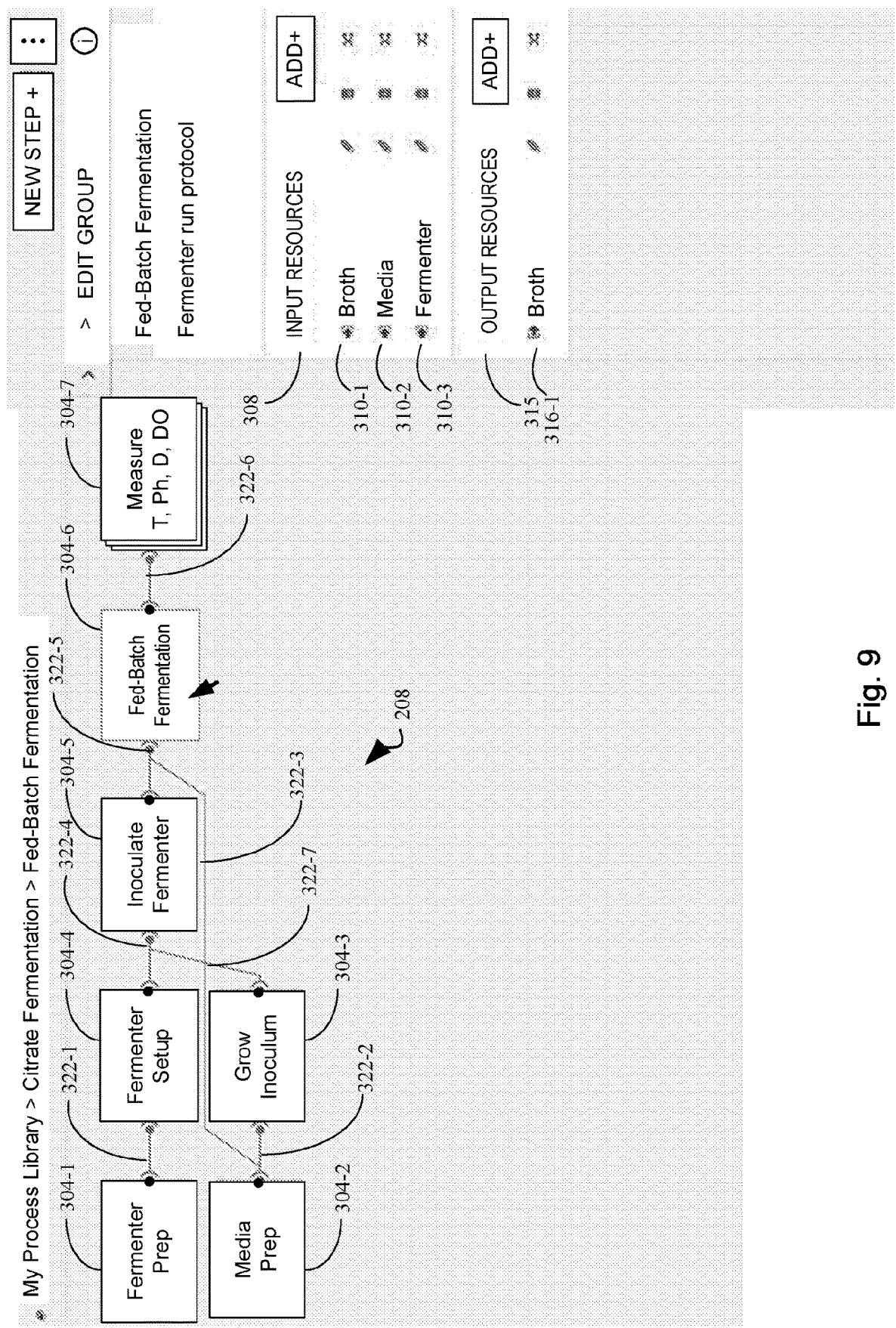
FIG. 9 illustrates the process hypergraph of FIG. 6 in which a fed-batch fermentation stage (node) is highlighted in accordance with an embodiment of the present disclosure.

Each node 304 is associated with a set of parameterized resource inputs 308 to the respective stage in the corresponding process. At least one parameterized resource input 310 in the set of parameterized resource inputs 308 is associated with one or more input properties 312. The one or more input properties include an input specification limit 314. Each node 304 is also associated with a set of parameterized resource outputs 315 to the respective stage in the corresponding process. At least one parameterized resource output 316 in the set of parameterized resource outputs is associated with one or more output properties. The one or more output properties include a corresponding output specification limit. FIG. 6 illustrates the set of parameterized resource inputs 308 and the set of parameterized resource outputs 315 for the node 304-4 "Fermenter Setup." FIG. 7 illustrates the set of parameterized resource inputs 308 and the set of parameterized resource outputs 315 for the node 304-3 "Grow Inoculum." FIG. 8 illustrates the set of parameterized resource inputs 308 and the set of parameterized resource outputs 315 for the node 304-5 "Inoculate Fermenter." FIG. 9 illustrates the set of parameterized resource inputs 308 and the set of parameterized resource outputs 315 for the node 304-6 "Fed-Batch Fermentation." In some embodiments, a user can simply click on a node 304 to see their inputs and outputs. Moreover, unstructured data in the form of videos, pictures, or comments can be added to nodes 304. For example, a video showing the proper way to perform a procedure associated with a node can be linked to a node by simply dragging an icon link to the video onto the representation of node 304. For example, a video on the proper way perform a fermenter setup can be dragged onto the "Fermenter Setup" node 304-4 of FIG. 6. Thereafter, when a user clicks on node 304-4, the video is played.

Each respective process edge 322 in the plurality of process edges specifies that the set of parameterized resource outputs of a node in the plurality of nodes is included in the set of parameterized resource inputs of at least one other node in the plurality of nodes. Thus, turning to FIG. 6 to illustrate, the set of parameterized resource inputs for node 304-6 "Fed-Batch Fermentation" consists of the set of parameterized resource outputs for nodes 304-5 "Inoculate Fermenter" and 304-2 "Media Prep."

Figure 10:
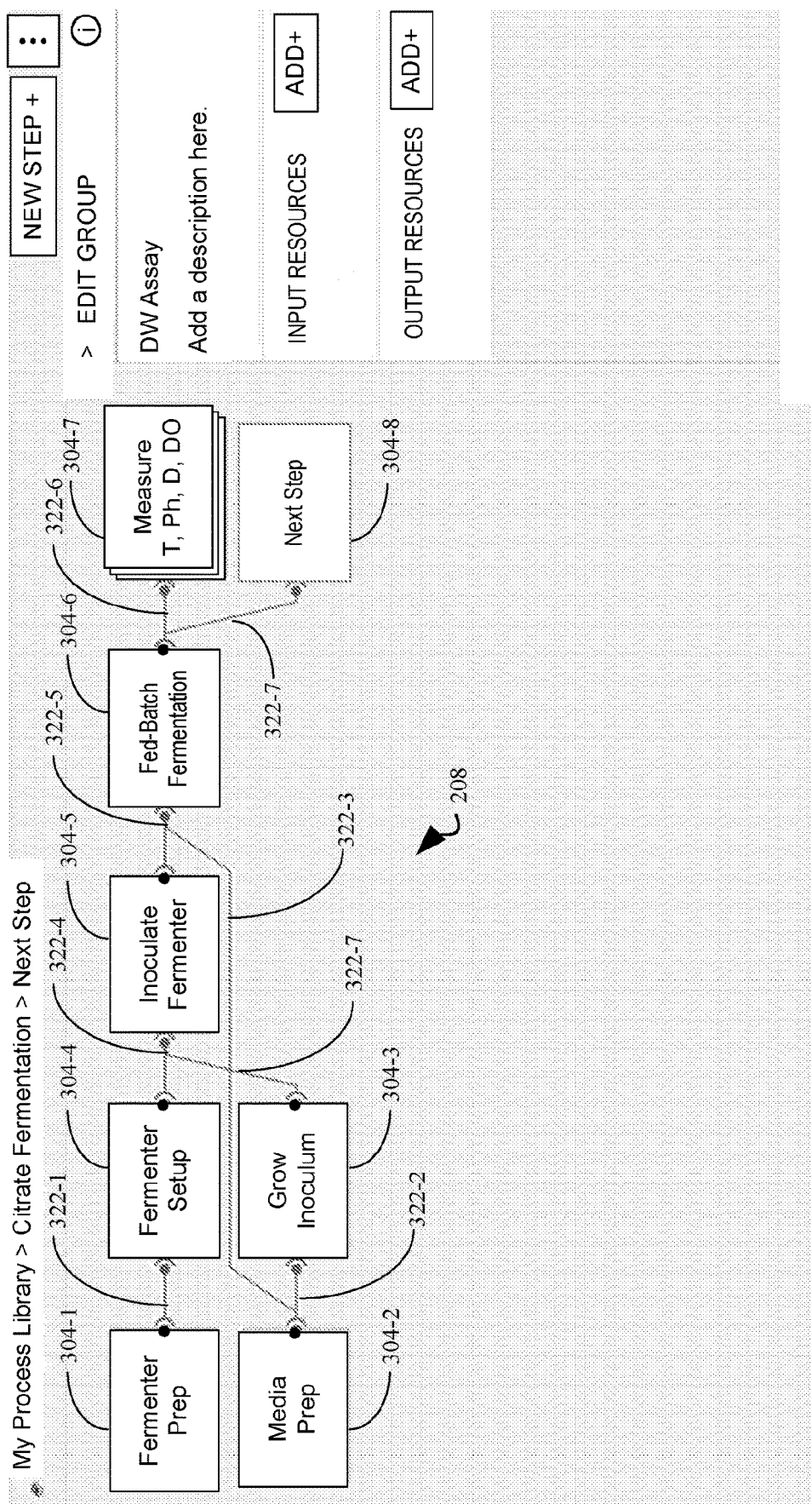
FIG. 10 illustrates the process hypergraph of FIG. 6 in which a new stage (node) is being added to the process hypergraph of FIG. 6 in accordance with an embodiment of the present disclosure.
Figure 11:
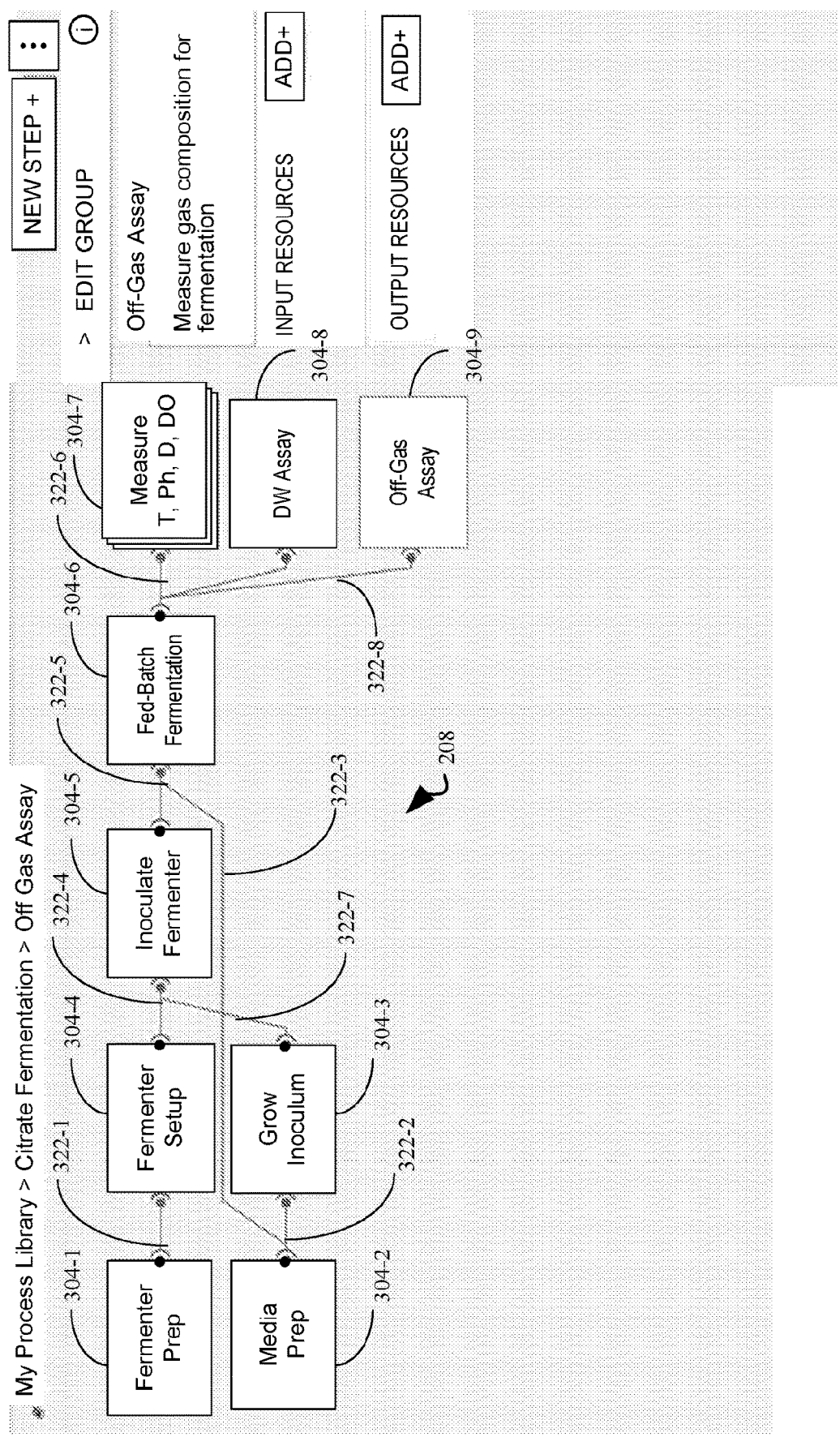
FIG. 11 illustrates the process hypergraph of FIG. 10 in which a DW Assay stage (node) and an Off-Gas Assay stage (node) are added to the process hypergraph of FIG. 6 in accordance with an embodiment of the present disclosure.
Figure 12:
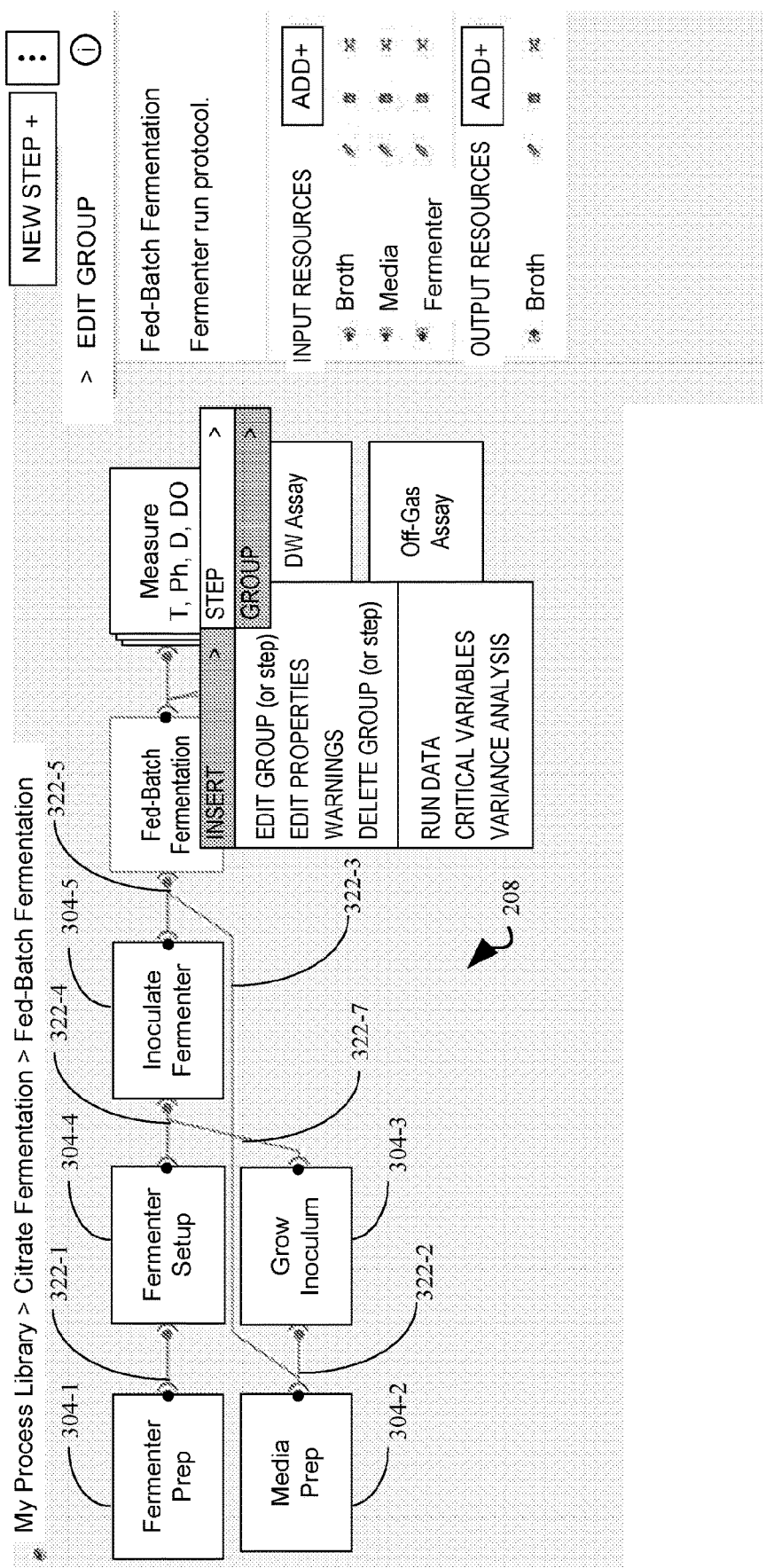
FIG. 12 illustrates the process hypergraph of FIG. 11 in which a new group of stages (nodes) is added to the process hypergraph of FIG. 6 in accordance with an embodiment of the present disclosure.
Figure 13:
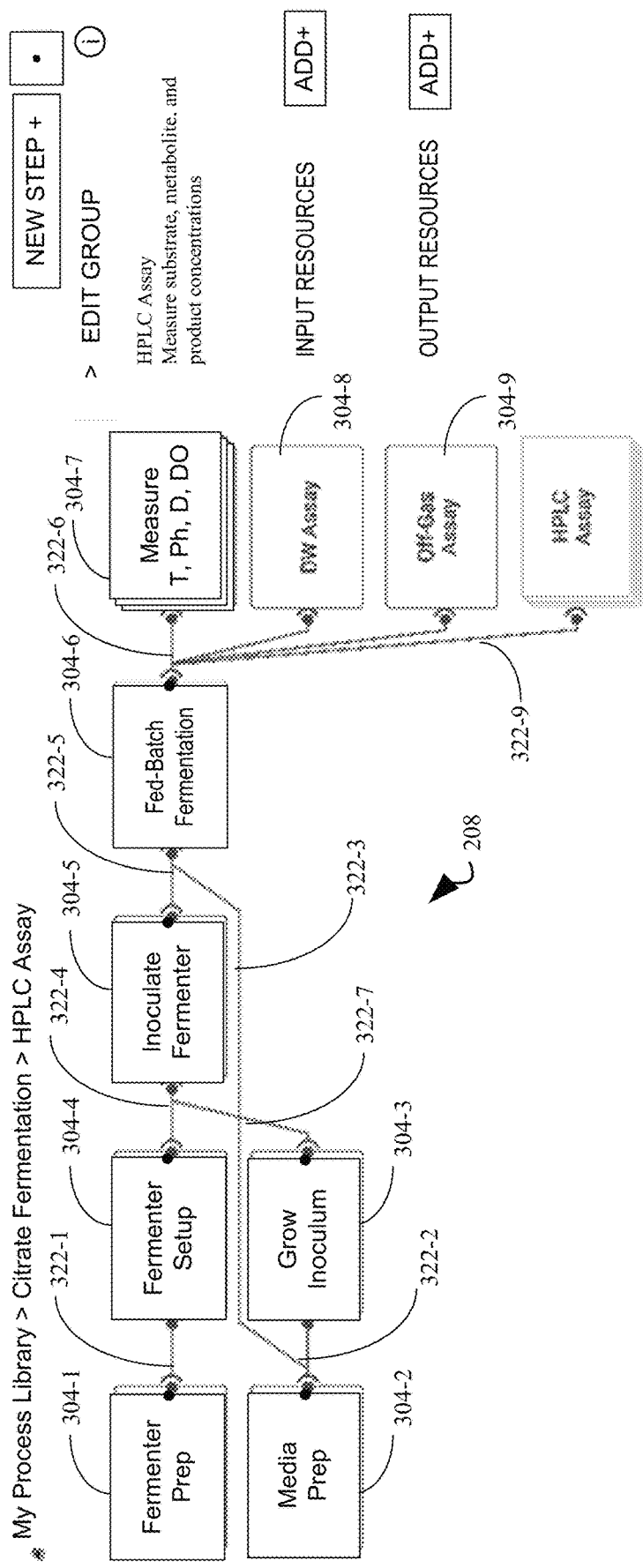
FIG. 13 illustrates the process hypergraph of FIG. 12 in which the new group of stages (nodes) is defined in accordance with an embodiment of the present disclosure.
Figure 14:
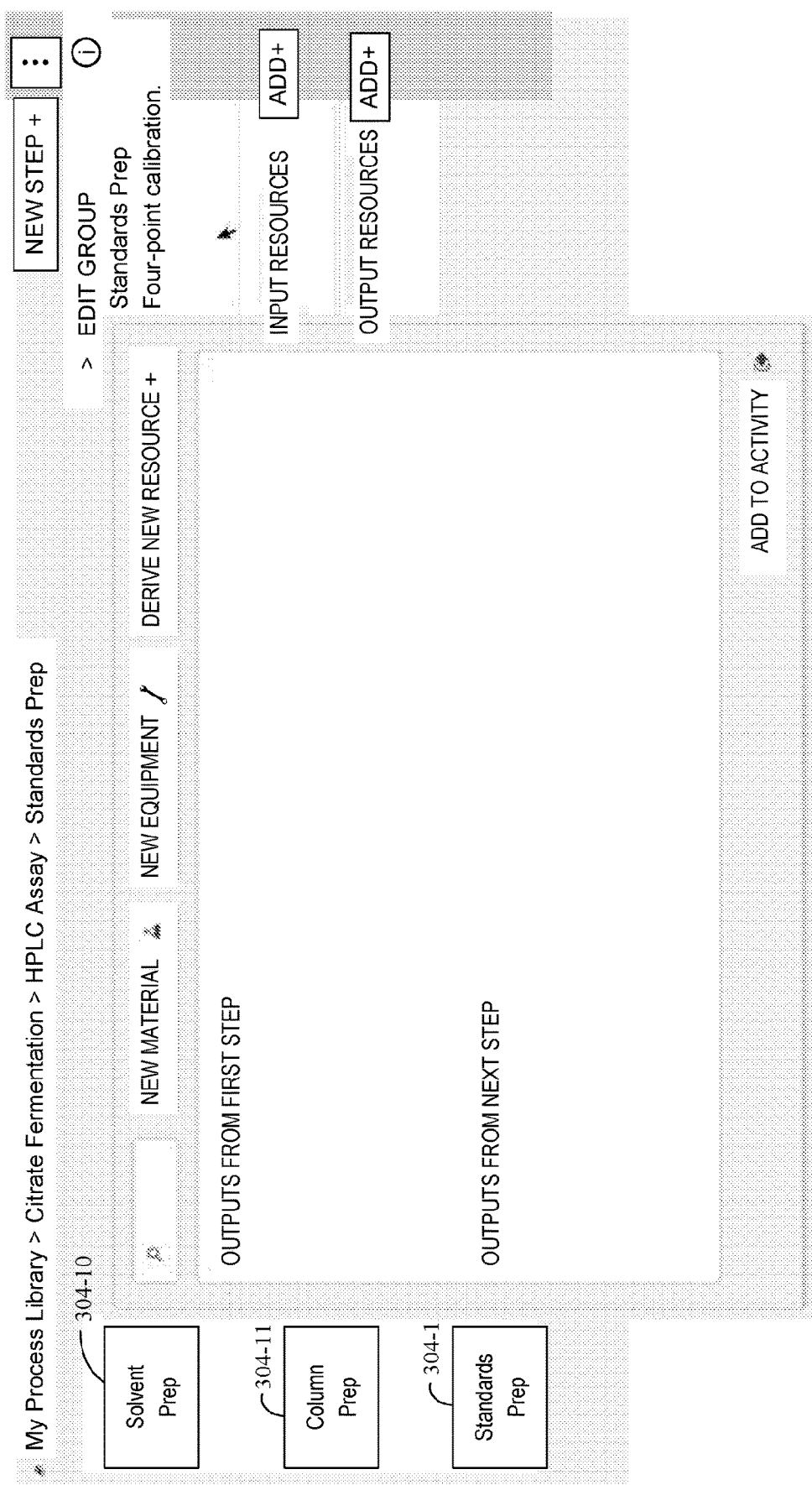
FIG. 14 illustrates how the new group of stages (nodes), defined in the process hypergraph of FIGS. 12 and 13, is defined in accordance with an embodiment of the present disclosure.
Figure 15:
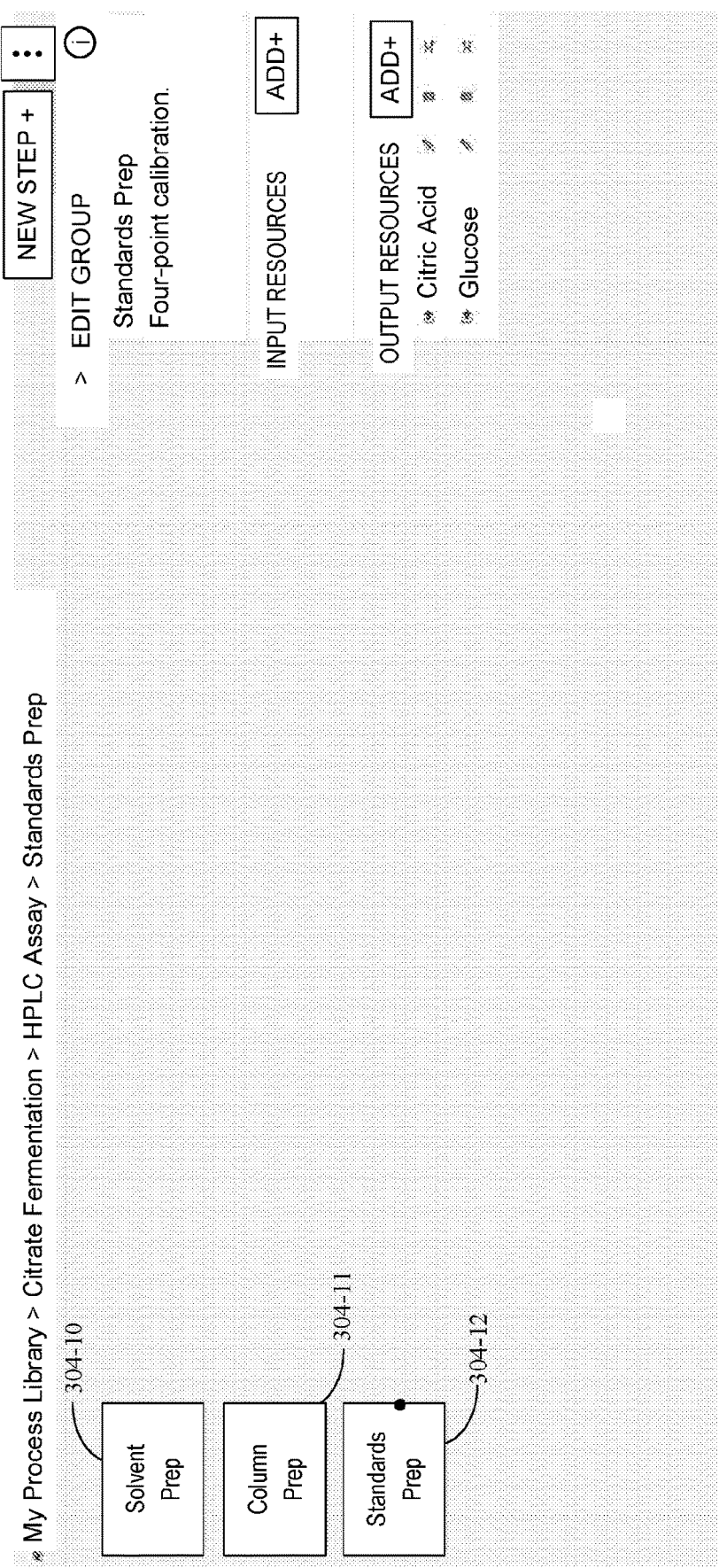
FIG. 15 illustrates how the new standards prep stage in the new group of stages (node) defined in the process hypergraph of FIGS. 12 and 13 is defined in accordance with an embodiment of the present disclosure.

FIGS. 10 and 11 illustrate adding new nodes 304-8 "DW Assay" and 304-9 "Off-Gas Assay" to an existing hypergraph and FIGS. 12 and 13 illustrate adding a group of nodes entitled "HPLC Assay" to the hypergraph. The HPLC Assay group is an extension of the existing hypergraph of FIG. 6 and includes nodes and process edges of this extension. Referring to FIGS. 13 and 14, HPLC Assay begins with three initial nodes, node 304-10 "Solvent Prep," node 304-11 "Column Prep," and node 304-12 "Standards Prep." In some embodiments, the names of nodes are chosen by a user from a database of allowed node names in order to ensure conformity in node names. In some embodiments, the names of node inputs 310 and outputs 316 are also chosen by a user from a database of allowed node input and output names in order to ensure conformity in node input and output names. In some embodiments, the names of node input properties 312 and node output properties 318 are also chosen by a user from a database of allowed node input property names and node output property names in order to ensure their conformity.

Block 572.

Referring to block 572 of FIG. 5H, in some such embodiments, the data table 236 is an event series table and each respective token 232 in the second subset of tokens is explicitly assigned by the event series table to a particular index (e.g. node identifier) and run identifier 210 thereby assigning the respective token 232 to a corresponding node 304 in the plurality of nodes and a particular run 208 in the plurality of runs of the run hypergraph 204.

Block 574.

Figure 5I:
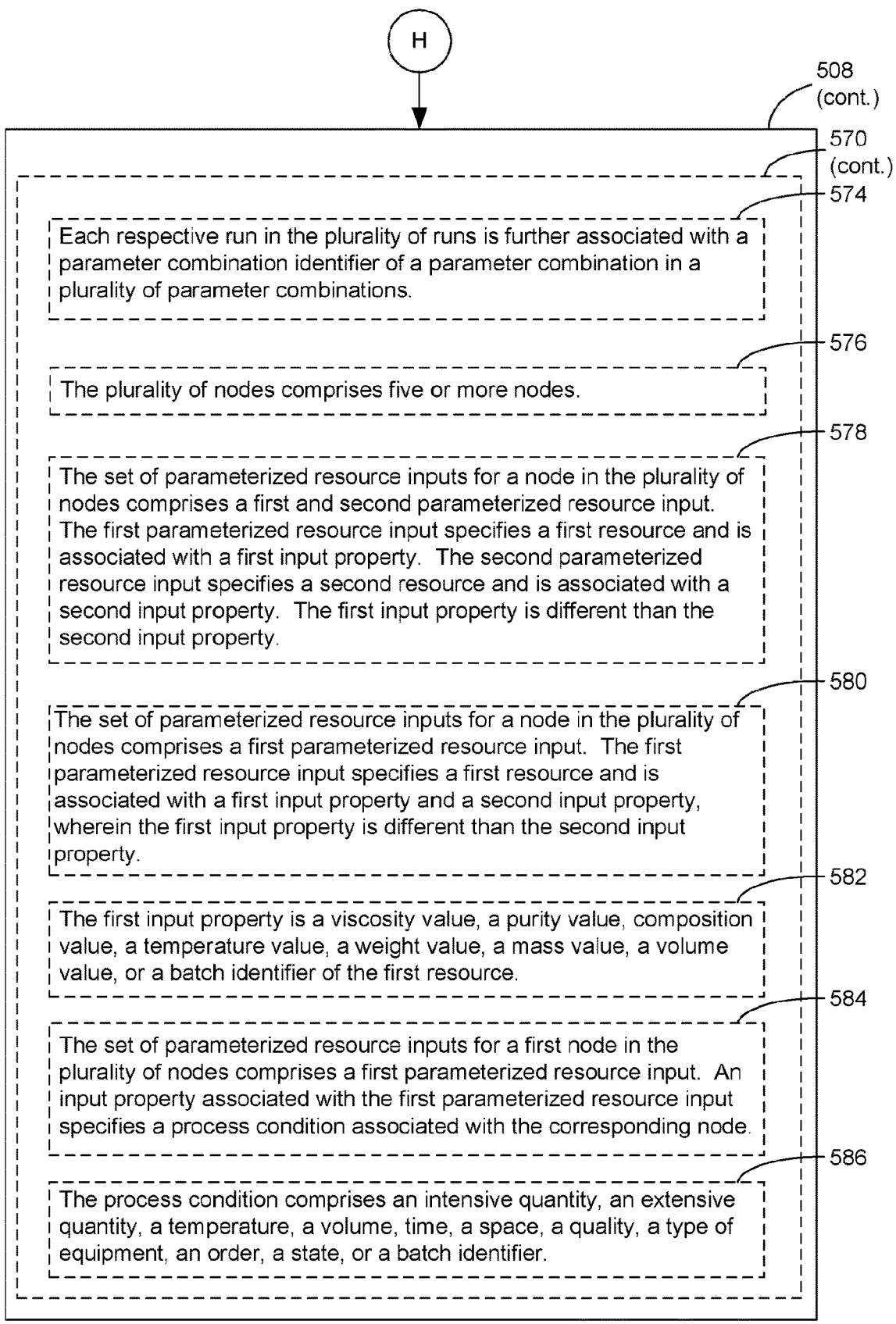

Referring to block 574 of FIG. 5I, in some embodiments, each respective run 210 in the plurality of runs is further associated with a parameter combination identifier 408 of a parameter combination in a plurality of parameter combinations.

Block 576.

Referring to block 576 of FIG. 5I, in some embodiments, the plurality of nodes comprises five or more nodes, 10 or more nodes, 15 or more nodes, or 100, or more nodes.

Block 578.

Referring to block 578 of FIG. 5I, in some such embodiments, the set of parameterized resource inputs 308 for a node 304 in the plurality of nodes comprises a first and second parameterized resource input 310. The first parameterized resource input 310 specifies a first resource and is associated with a first input property 312. The second parameterized resource input specifies a second resource and is associated with a second input property. The first input property is different than the second input property.

Block 580.

Referring to block 580 of FIG. 5I, in some such embodiments, the set of parameterized resource inputs 308 for a node 304 in the plurality of nodes comprises a first parameterized resource input 310. The first parameterized resource input 310 specifies a first resource and is associated with a first input property 312 and a second input property 312, wherein the first input property is different than the second input property.

Block 582.

Referring to block 582 of FIG. 5I, in some such embodiments, the first input property is a viscosity value, a purity value, composition value, a temperature value, a weight value, a mass value, a volume value, or a batch identifier of the first resource.

Block 584.

The set of parameterized resource inputs 308 for a first node 304 in the plurality of nodes comprises a first parameterized resource input 310. An input property 312 associated with the first parameterized resource input specifies a process condition associated with the corresponding node. FIG. 6 illustrates. Node 304-4 "Fermenter Setup" includes in its associated set of parameterized resource inputs 308 a fermenter 310-4 and a waste bottle 310-6 among other resource inputs. Although not shown in FIG. 6, the fermenter 310-4 is associated with a first input property, such as a size of the fermenter or a fermenter make/model number. Furthermore, the waste bottle 310-6 is associated with a second input property, such as a size of the waste bottle 310-6 or a waste bottle 310-6 make and model number.

Block 586.

In some embodiments, the set of parameterized resource inputs 308 for a first node 304 in the plurality of nodes of a process hypergraph 302 comprises a first parameterized resource input 310 and this first parameterized resource input specifies a process condition associated with the corresponding stage of the process associated with the first node 304. In some such embodiments, the process condition comprises an intensive quantity, an extensive quantity, a temperature, a volume, time, a space, a quality, a type of equipment, an order, a state, or a batch identifier.

In some embodiments a resource input 310 is a single resource. For instance, in FIG. 6, resources 310-1 through 310-11 are all examples of single resources. In some embodiments, a resource input 310 is a composite resource. Examples of composite resources include, but are not limited, to mixtures of compositions (e.g., media, broth, etc.) and multi-component equipment.

As noted above in some embodiments, for a given node, at least one of the parameterized resource outputs in the set of parameterized resource outputs for the node is associated with one or more output properties, and in some such embodiments the one or more output properties includes a corresponding output specification limit. In some embodiments, this corresponding output specification limit comprises a nominal value, an upper limit, and/or a lower limit for the corresponding parameterized resource output. To illustrate, an example of an output property is pH of a composition. In such an example, the output specification limit specifies the allowed upper limit for the pH of the composition and the allowed lower limit for the pH of the composition. In alternative embodiments, this corresponding output specification limit comprises an enumerated list of allowable types. To illustrate, an example of an output property is a crystallographic orientation of a material. In such an example, the output specification limit specifies an enumerated list of allowed crystallographic orientations for material.

Figure 16:
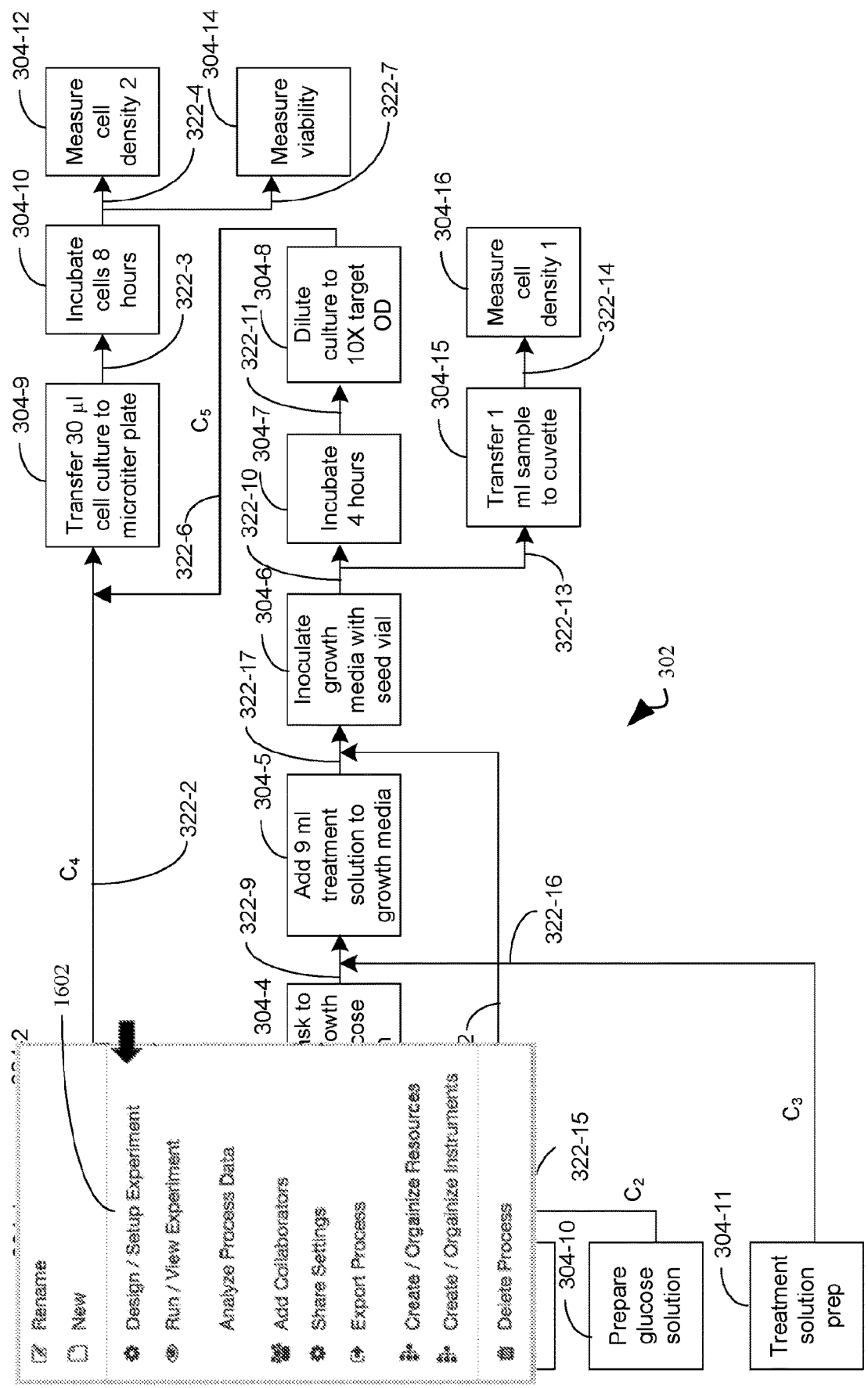
FIG. 16 illustrates the initiation of a process for building a run hypergraph from a plurality of parameter combinations for a process subject to a plurality of run constraints for the process in accordance with an embodiment of the present disclosure.
Figure 17:
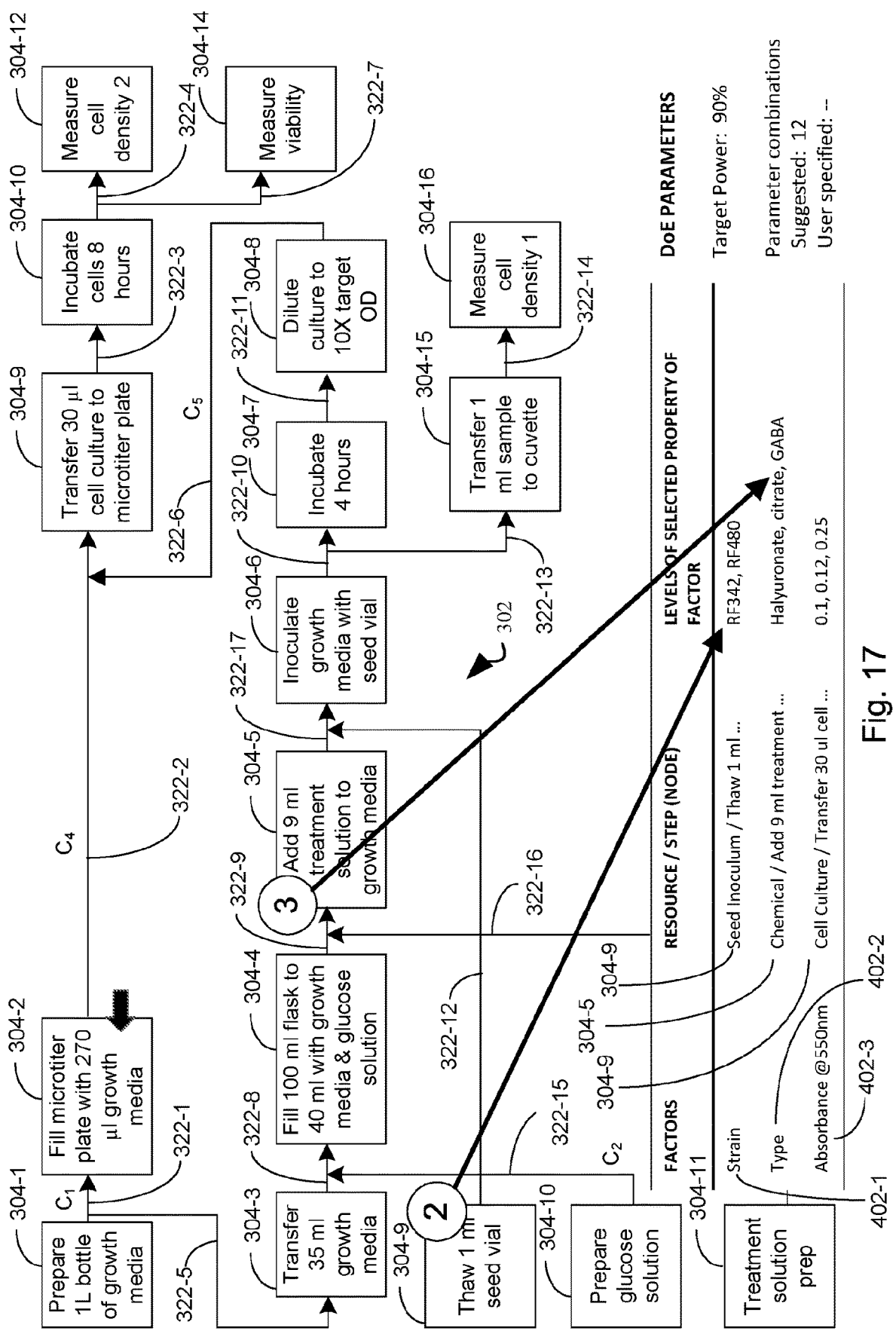
FIG. 17 illustrates identifying a plurality of factors, where each respective factor in the plurality of factors is associated with: (i) an input property in one or more input properties of a resource input in a set of parameterized resource inputs of a corresponding node in a plurality of nodes, or (ii) an output property in the one or more output properties of a resource output in a set of parameterized resource outputs of a corresponding node in a plurality of nodes as well as identifying, for each respective factor in a plurality of factors, a number of levels for the input property or output property associated with the respective factor, in accordance with an embodiment of the present disclosure.

In some embodiments, each respective factor 402 in the plurality of factors 226 is associated with: (i) an input property 312 in the one or more input properties of a resource input 310 in the set of parameterized resource inputs 308 of a corresponding node 304 in the plurality of nodes, or (ii) an output property 318 in the one or more output properties of a resource output 316 in the set of parameterized resource outputs 315 of a corresponding node in the plurality of nodes. FIGS. 16 and 17 illustrate. In FIG. 16, the menu option Design/Setup experiment 1602 is selected by a user or is autonomously initiated. FIG. 16 illustrates a process hypergraph comprising a plurality of nodes 304 and a plurality of process edges. Each respective process edge in the plurality of process edges specifies the set of parameterized resource outputs of a node (parent node) in the plurality of nodes that is included in the set of parameterized resource inputs of at least one other node (child node) in the plurality of nodes and identifies the at least one other node. In FIG. 17, three factors, "strain" 402-1, "type" 402-2, and "absorbance @550 nm" 402-3 are selected. As illustrated in FIG. 17, each of these three factors is associated with a corresponding node 304 and specifies (i) an input property 312 in the one or more input properties of a resource input 310 in the set of parameterized resource inputs 308 of the corresponding node or (ii) an output property 318 in the one or more output properties of a resource output 316 in the set of parameterized resource outputs 315 of the corresponding node. Thus, in FIG. 17, the factor 402-1 specifies the output property 318 "strain" of the corresponding node 304-9 "Thaw 1 ml seed vial." The factor 402-2 specifies the output property 318 "type" of the corresponding node 304-5 "Add 9 ml treatment solution to growth media." The factor 402-3 specifies the output property 318 "absorbance @550 nm" of the corresponding node 304-9 "Thaw 1 ml seed vial."

For each respective factor 402 in the plurality of factors, a number of levels 404 for the input property 312 or output property 318 associated with the respective factor. FIG. 17 illustrates. Levels "RF342" and "RF480" are identified for the output property 318 "strain" specified by factor 402-1. Levels "Halyronate," "citrate," and "GABA" are identified for the output property 318 "type" specified by the factor 402-2. Levels "0.1," "0.12" and 0.25" are specified for the output property 318 "absorbance @550 nm" specified by the factor 402-3.

In some embodiments, a factor 402 in the plurality of factors is a continuous factor, a discrete numeric factor, or a categorical factor. For instance, referring to FIG. 17, levels "RF342" and "RF480" are identified for the output property 318 "strain" specified by factor 402-1 and thus factor 402-1 is a categorical factor. Levels "0.1," "0.12" and 0.25" are specified for the output property 318 "absorbance @550 nm" specified by the factor 402-3 and thus the factor 402-3 is a discrete numeric factor. An example of a factor that is a continuous factor would be one where the input property or output property specified by the factor is associated with a range of levels such as any number in the range 0 to 100.

In some embodiments, a run hypergraph 204 is built using the process hypergraph 306 as disclosed in International Patent Application No. PCT/US2016/039227, filed Jun. 24, 2016, entitled "Systems and Methods for Formulation of Experiments for Analysis of Process Performance," and International Patent Application No. PCT/US2015/042999, filed Jul. 30, 2015, entitled "Systems and Methods for Process Design and Analysis," each of which is hereby incorporated by reference. Each respective run 208 in the plurality of runs for the run hypergraph comprises: (i) an index 206 to a corresponding node in the plurality of nodes, (ii) a run identifier 210, and (iii) a parameter combination identifier 408 of a parameter combination 406 in the plurality of parameter combinations 228.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIGS. 1, 2, 3, and/or 4. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method for forming a data table comprising a set of columns of data, wherein each column of data includes a header and one or more data values, the method comprising:
at a computer system comprising a memory and a processor:
obtaining a data construct that comprises a plurality of tokens; and
applying a stored configuration construct to the plurality of tokens, wherein the applying comprises:
(i) labeling a first subset of tokens in the plurality of tokens as header tokens based on the position of each respective token in the first subset of tokens in the data construct,
(ii) labeling a second subset of tokens in the plurality of tokens as value tokens based on the position of each respective token in the second subset of tokens in the data construct, and
(iii) associating tokens in the first subset to tokens in the second subset as a function of (a) the relative or absolute position of tokens in the first subset to tokens in the second subset in the data construct or (b) a presence of a delimiter specified in the configuration construct and that is present in the data construct between a token in the first subset and a token in the second subset, wherein the associating is on a one-to-one basis, a one-to-many basis, or a many-to-one basis that is specified by the stored configuration construct, thereby transforming the data construct into the data table in which each token in the first subset is a header and each token in the second subset is a data value in a single column in the set of columns of the data table;
wherein the stored configuration construct specifies that a first token in the first subset of tokens and one or more second tokens in the second subset of tokens form a first data block, and the applying explicitly labels each second token in the one or more second tokens with the first token;
wherein the stored configuration construct specifies a first superblock comprising one or more compound blocks, wherein each compound block is a table, a matrix or a key:value block, and the applying explicitly labels each compound block with an identifier that is unique to the first superblock, and wherein each respective compound block that is a table comprises a first table form comprising a first plurality of data blocks of the form of the first data block, each respective data block in the first plurality of data blocks of the table is adjacent to another data block in the first plurality of data blocks in the data construct, each respective data block in the first plurality of data blocks of the table being in the same orientation in the data construct, and each respective data block in the first plurality of data blocks being separated from another data block in the first plurality of data blocks by zero or more a null values, zero or more tokens, or zero or more blank spaces, and wherein the applying explicitly labels, for each respective data block in the first plurality of data blocks of the table, each second token in the one or more second tokens of the respective data block with the first token of the respective data block, each respective compound block that is a matrix comprises a second data block of the form of the first data block and a plurality of tables of the form of the first table form, wherein a first table in the plurality of tables is in a standard orientation and is positioned adjacent to the left or right boundary of the one or more second tokens of the second data block of the matrix, and a second table in the plurality of tables is in a transposed orientation and is positioned adjacent to the top or bottom boundary of the one or more second tokens of the second data block, and wherein the applying explicitly forms a tuple between (i) a respective first value token in the first table, (ii) a respective second value token in the second table and (iii) a respective third value token in the second data block based upon the relative or absolute position in the data construct of the respective first value token, the respective second value token, and the respective third value token, and each respective compound block that is a key-value block comprises a plurality of key-value pairs of the form of a first key-value pair in the stored configuration construct, in which the one or more second tokens is a single second token, and wherein the first key-value pair specifies that a first token in the first subset of tokens is the portion of data in the first key-value pair in the data construct that is to the left of a delimiter in the data construct and that is specified in the configuration construct and the second token is the portion of data in the first key-value pair in the data construct to the right of the delimiter, and the applying explicitly labels, for each respective key-value pair in the plurality of key-value pairs, the second token of the respective key-value pair with the first token of the respective key-value pair.

2. The method of claim 1, wherein the data construct is a flat file format.

3. The method of claim 1, wherein the delimiter is an alphanumeric character, a numeric character, a symbolic character, a computer-readable character, or a combination thereof.

4. The method of claim 1, wherein the delimiter is a combination of alphanumeric characters, a combination of numeric characters, a combination of symbolic characters, a combination of computer-readable characters, or a combination thereof.

5. The method of claim 1, wherein the one or more second tokens comprises two or more second tokens, and the two or more second tokens are in a contiguous region of the data construct.

6. The method of claim 1, wherein the stored configuration construct specifies that the first token in the first subset of tokens and the one or more second tokens in the second subset of tokens form the data block by the presence, in the data construct, of a delimiter between the first token in the first subset and a second token in the one or more second tokens in the second subset.

7. The method of claim 1, wherein the stored configuration construct specifies that the one or more second tokens in the second subset of tokens are separated from each other in the data construct by one or more delimiters.

8. The method of claim 1, wherein the stored configuration construct specifies that the first token in the first subset of tokens and the one or more second tokens in the second subset of tokens form the data block by the relative or absolute position, in the data construct, of the first token in the first subset to the one or more second tokens in the second subset.

9. The method of claim 1, wherein the one or more second tokens is a single second token, the stored configuration construct specifies that the first token in the first subset of tokens is the portion of data in a first key-value pair in the data construct that is to the left of a delimiter in the data construct and that is specified in the configuration construct and the second token is the portion of data in the first key-value pair in the data construct to the right of the delimiter, wherein the first key-value pair is of the form of the first data block, and the applying explicitly labels the second token with the first token.

10. The method of claim 9, wherein
the stored configuration construct specifies a first key-value block comprising a plurality of key-value pairs of the form of the first key-value pair, and
the applying explicitly labels, for each respective key-value pair in the plurality of key-value pairs, each second token in the one second token of the respective key-value pair with the first token of the respective key-value pair.

11. The method of claim 1, wherein the first token is displaced by one or more tokens or blanks spaces from the one or more second tokens in the first data block.

12. The method of claim 1, wherein a second token, in the one or more second tokens, is a null value.

13. The method of claim 1, wherein the first token is absent in the data construct and is provided by the configuration construct.

14. The method of claim 1, wherein the first token is a name, an alias, a run identifier, or a sample identifier, and each token in the one or more second tokens is in the form of a string value, a floating point number, an integer, a date, or is in an undetermined form.

15. The method of claim 1, wherein the stored configuration construct specifies a first table comprising a plurality of data blocks of the form of the first data block, each respective data block in the plurality of data blocks is adjacent to another data block in the plurality of data blocks in the data construct, each respective data block in the plurality of data blocks is in the same orientation in the data construct, and the applying explicitly labels, for each respective data block in the plurality of data blocks, each second token in the one or more second tokens of the respective data block with the first token of the respective data block.

16. The method of claim 15, wherein a pair of data blocks in the first table are adjacent to each other and separated in the data construct by one or more null values or one or more blank spaces.

17. The method of claim 15, wherein the stored configuration construct specifies whether the first table is in a standard orientation or a transposed orientation.

18. The method of claim 1, wherein the stored configuration construct specifies a plurality of data block forms and a plurality of table forms comprising:
   (i) a first data block form comprising a first token in the first subset of tokens and one or more second tokens in the second subset of tokens, wherein the applying explicitly labels each second token in the one or more second tokens of the first data block form with the first token,
   (ii) a first table form comprising a first plurality of data blocks of the first data block form, wherein each respective data block in the first plurality of data blocks is adjacent to another data block in the first plurality of data blocks in the data construct, and each respective data block in the first plurality of data blocks is in the same orientation in the data construct, and each respective data block in the first plurality of data blocks is separated from another data block in the first plurality of data blocks by zero or more a null values, zero or more tokens, or zero or more blank spaces, and
   (iii) a matrix comprising a first data block of the form of the first data block form and a plurality of tables of the form of the first table form, wherein
      a first table in the plurality of tables is in a standard orientation and is positioned adjacent to the left or right boundary of the one or more second tokens of the first data block of the matrix, and
      a second table in the plurality of tables is in a transposed orientation and is positioned adjacent to the top or bottom boundary of the one or more second tokens of the first data block, and wherein
   the applying explicitly forms a tuple between (a) a respective first value token in the first table, (b) a respective second value token in the second table and (c) a respective third value token in the first data block based upon the relative or absolute position in the data construct of the respective first value token, the respective second value token, and the respective third value token.

19. The method of claim 18, wherein the first data block, the first table and the second table are offset with respect to each other by one or more spaces, null values, or ignored tokens in the data construct.

20. The method of claim 18, wherein
   each respective first value token in the first table is in the form of a string value, a floating point number, an integer, a date, or is in an undetermined form,
   each respective second value token in the second table is in the form of a string value, a floating point number, an integer, a date, or is in an undetermined form, and
   each third value token in the first data block is in the form of a string value, a floating point number, an integer, a date, or is in an undetermined form.

21. The method of claim 18, wherein the one or more second tokens of the first data block form comprises two or more second tokens that are in a contiguous region of the data construct.

22. The method of claim 18, wherein the stored configuration construct specifies that the first token in the first subset of tokens and the one or more second tokens of the first data block form define the data block by the presence, in the data construct, of a delimiter between the first token in the first subset and a second token in the one or more second tokens in the second subset.

23. The method of claim 18, wherein the stored configuration construct specifies that the one or more second tokens in the first data block form are separated from each other in the data construct by one or more delimiters.

24. The method of claim 18, wherein the stored configuration construct specifies that the first token in the first data block form and the one or more second tokens in the first data block form define the first data block form by the relative or absolute position, in the data construct, of the first token to the one or more second tokens in the second subset.

25. The method of claim 1, wherein each token in the plurality of tokens is a string, an integer number, a floating point number, a binary number, a null value, a data object or a cell.

26. The method of claim 1, wherein the method further comprises:
   (A) building the configuration construct at a time prior to the applying, wherein the building comprises:
      (i) displaying all or a portion of the data construct;
      (ii) receiving a first user selection of the first subset of tokens from the displayed data construct,
      (iii) receiving a second user selection of the second subset of tokens from the displayed data construct,
      (iv) computing the relative or absolute position between a first token in the first subset of tokens to a second token in the second subset of tokens in the data construct, and
      (v) including the relative or absolute position between the first token and the second token in the configuration construct; and
   (B) storing the configuration construct.

27. The method of claim 1, the method further comprising associating the data table with a run hypergraph for a process that results in a product or analytical information, wherein
   the run hypergraph comprises (i) a plurality of nodes, (ii) a plurality of runs, each respective run in the plurality of runs being associated with a node in the plurality of nodes, and (iii) a plurality of run edges,
   each respective node in the plurality of nodes is associated with:
      (i) a set of parameterized resource inputs to the respective node, wherein at least one parameterized resource input in the set of parameterized resource inputs is associated with one or more input properties, the one or more input properties including an input specification limit, and
      (ii) a set of parameterized resource outputs to the respective node, wherein at least one parameterized resource output in the set of parameterized resource outputs is associated with one or more output properties, the one or more output properties including a corresponding output specification limit, and
   each run edge in the plurality of run edges joins (a) a run in the plurality of runs associated with a parent node in the plurality of nodes and (b) a run in the plurality of runs associated with a child node in the plurality of nodes thereby specifying a set of parameterized resource outputs of the parent node that is included in the set of parameterized resource inputs of the child node; and each respective run in the plurality of runs comprises: (i) an index that uniquely identifies a corresponding node in the plurality of nodes and (ii) a run identifier that uniquely identifies a run in the plurality of runs,
wherein the method further comprises assigning the data table to a node in the plurality of nodes.

28. The method of claim 27, wherein the data table is an event series table and each respective token in the second subset of tokens is explicitly assigned by the event series table to a particular index and run identifier thereby assigning the respective token to a corresponding node in the plurality of nodes and a particular run in the plurality of runs.

29. The method of claim 27, wherein each respective run in the plurality of runs is further associated with a parameter combination identifier of a parameter combination in a plurality of parameter combinations.

30. The method of claim 27, wherein the plurality of nodes comprises five or more nodes.

31. The method of claim 27, wherein the set of parameterized resource inputs for a node in the plurality of nodes comprises a first and second parameterized resource input,
the first parameterized resource input specifies a first resource and is associated with a first input property,
the second parameterized resource input specifies a second resource and is associated with a second input property, and
the first input property is different than the second input property.

32. The method of claim 31, wherein the first input property is a viscosity value, a purity value, composition value, a temperature value, a weight value, a mass value, a volume value, or a batch identifier of the first resource.

33. The method of claim 27, wherein the set of parameterized resource inputs for a node in the plurality of nodes comprises a first parameterized resource input,
the first parameterized resource input specifies a first resource and is associated with a first input property and a second input property, wherein the first input property is different than the second input property.

34. The method of claim 27, wherein
the set of parameterized resource inputs for a first node in the plurality of nodes comprises a first parameterized resource input, and
an input property associated with the first parameterized resource input specifies a process condition associated with the corresponding node.

35. The method of claim 34, wherein the process condition comprises an intensive quantity, an extensive quantity, a temperature, a volume, time, a space, a quality, a type of equipment, an order, a state, or a batch identifier.

36. The method of claim 1, wherein the data table is in standard or transposed orientation.

37. A computer system, comprising:
one or more processors;
memory; and
one or more programs for forming a data table comprising a set of columns of data, wherein the one or more programs are stored in the memory for execution by the one or more processors comprise instructions for:
obtaining a data construct that comprises a plurality of tokens; and
applying a stored configuration construct to the plurality of tokens, wherein the applying comprises:
(i) labeling a first subset of tokens in the plurality of tokens as header tokens based on the position of each respective token in the first subset of tokens in the data construct,
(ii) labeling a second subset of tokens in the plurality of tokens as value tokens based on the position of each respective token in the second subset of tokens in the data construct, and
(iii) associating tokens in the first subset to tokens in the second subset as a function of (a) the relative or absolute position of tokens in the first subset to tokens in the second subset in the data construct or (b) a presence of a delimiter specified in the configuration construct and that is present in the data construct between a token in the first subset and a token in the second subset, wherein the associating is on a one-to-one basis, a one-to-many basis, or a many-to-one basis that is specified by the stored configuration construct, thereby transforming the data construct into the data table in which each token in the first subset is a header and each token in the second subset is a data value in a single column in the set of columns of the data table;
wherein the stored configuration construct specifies that a first token in the first subset of tokens and one or more second tokens in the second subset of tokens form a first data block, and the applying explicitly labels each second token in the one or more second tokens with the first token;
wherein the stored configuration construct specifies a first superblock comprising one or more compound blocks, wherein each compound block is a table, a matrix or a key:value block, and the applying explicitly labels each compound block with an identifier that is unique to the first superblock, and wherein each respective compound block that is a table comprises a first table form comprising a first plurality of data blocks of the form of the first data block, each respective data block in the first plurality of data blocks of the table is adjacent to another data block in the first plurality of data blocks in the data construct, each respective data block in the first plurality of data blocks of the table being in the same orientation in the data construct, and each respective data block in the first plurality of data blocks being separated from another data block in the first plurality of data blocks by zero or more a null values, zero or more tokens, or zero or more blank spaces, and wherein the applying explicitly labels, for each respective data block in the first plurality of data blocks of the table, each second token in the one or more second tokens of the respective data block with the first token of the respective data block, each respective compound block that is a matrix comprises a second data block of the form of the first data block and a plurality of tables of the form of the first table form, wherein a first table in the plurality of tables is in a standard orientation and is positioned adjacent to the left or right boundary of the one or more second tokens of the second data block of the matrix, and a second table in the plurality of tables is in a transposed orientation and is positioned adjacent to the top or bottom boundary of the one or more second tokens of the second data block, and wherein the applying explicitly forms a tuple between (i) a respective first value token in the first table, (ii) a respective second value token in the second table and (iii) a respective third value token in the second data block based upon the relative or absolute position in the data construct of the respective first value token, the respective second value token, and the respective third value token, and each respective compound block that is a key-value block comprises a plurality of key-value pairs of the form of a first key-value pair in the stored configuration construct, in which the one or more second tokens is a single second token, and wherein the first key-value pair specifies that a first token in the first subset of tokens is the portion of data in the first key-value pair in the data construct that is to the left of a delimiter in the data construct and that is specified in the configuration construct and the second token is the portion of data in the first key-value pair in the data construct to the right of the delimiter, and the applying explicitly labels, for each respective key-value pair in the plurality of key-value pairs, the second token of the respective key-value pair with the first token of the respective key-value pair.

* * * * *